(12) United States Patent
Bhargava et al.

(10) Patent No.: US 10,123,268 B2
(45) Date of Patent: *Nov. 6, 2018

(54) WIRELESS COMMUNICATION METHODS, SYSTEMS, AND COMPUTER PROGRAM PRODUCTS

(71) Applicant: Board of Regents, The University of Texas System, Austin, TX (US)

(72) Inventors: Vidur Bhargava, Austin, TX (US); Sriram Vishwanath, Austin, TX (US); Jubin Jose, Austin, TX (US)

(73) Assignee: Board Of Regents, The University Of Texas System, Austin, TX (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/223,761

(22) Filed: Jul. 29, 2016

(65) Prior Publication Data
US 2016/0337971 A1    Nov. 17, 2016

Related U.S. Application Data

(63) Continuation-in-part of application No. 15/172,736, filed on Jun. 3, 2016, now Pat. No. 9,806,791, which
(Continued)

(51) Int. Cl.
*H04W 52/02* (2009.01)
*H04B 7/155* (2006.01)
(Continued)

(52) U.S. Cl.
CPC ........ *H04W 52/0216* (2013.01); *H04B 7/155* (2013.01); *H04B 7/15507* (2013.01); *H04W 28/021* (2013.01); *H04W 52/0209* (2013.01);

*H04W 88/04* (2013.01); *H04B 7/2606* (2013.01); *H04L 5/0023* (2013.01); *H04L 5/0032* (2013.01); *H04L 5/14* (2013.01);
(Continued)

(58) Field of Classification Search
CPC ........................... H04W 52/0216; H04B 7/155
See application file for complete search history.

(56) References Cited

U.S. PATENT DOCUMENTS

2009/0247214 A1* 10/2009 Cai ................... H04W 52/0216
455/550.1

* cited by examiner

*Primary Examiner* — Jamal Javaid
(74) *Attorney, Agent, or Firm* — Pillsbury Winthrop Shaw Pittman LLP

(57) ABSTRACT

A method, wireless device and computer program product for expanding the coverage of a cellular network. A wireless device (e.g., cellular telephone) is able to communicate with a base station in a cell of the cellular network over a non-cellular interface via another wireless device in a cell through the use of multi-hopping. A wireless device may request permission to communicate with the base station over a non-cellular interface via hopping off another wireless device when its signal strength is below a threshold. Alternatively, a wireless device may receive a request to communicate with the base station over a non-cellular interface via hopping off the wireless device that sent the request when that wireless device has excess capacity in its bandwidth with the base station. By enabling wireless devices to communicate with a base station in such a manner, the effective capacity of the cellular network is expanded and the effective capacity of the cellular network is improved.

22 Claims, 33 Drawing Sheets

Related U.S. Application Data is a continuation of application No. 14/823,506, filed on Aug. 11, 2015, now Pat. No. 9,363,006, which is a continuation of application No. 13/701,449, filed as application No. PCT/US2011/039180 on Jun. 3, 2011, now Pat. No. 9,148,908.

(60) Provisional application No. 62/198,557, filed on Jul. 29, 2015, provisional application No. 61/451,039, filed on Mar. 9, 2011, provisional application No. 61/369,181, filed on Jul. 30, 2010, provisional application No. 61/351,541, filed on Jun. 4, 2010.

(51) Int. Cl.
| | |
|---|---|
| *H04W 88/04* | (2009.01) |
| *H04W 28/02* | (2009.01) |
| *H04B 7/26* | (2006.01) |
| *H04W 48/20* | (2009.01) |
| *H04W 84/18* | (2009.01) |
| *H04L 5/00* | (2006.01) |
| *H04L 5/14* | (2006.01) |
| *H04W 76/14* | (2018.01) |

(52) U.S. Cl.
CPC ............ *H04W 48/20* (2013.01); *H04W 76/14* (2018.02); *H04W 84/18* (2013.01); *Y02D 70/00* (2018.01); *Y02D 70/122* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/22* (2018.01); *Y02D 70/449* (2018.01)

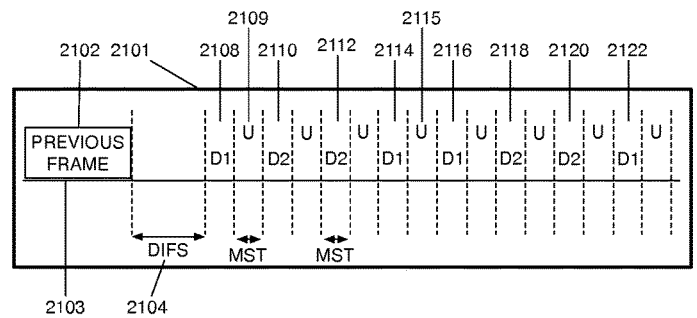
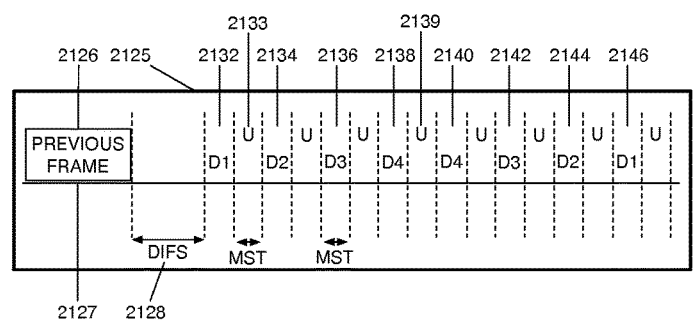
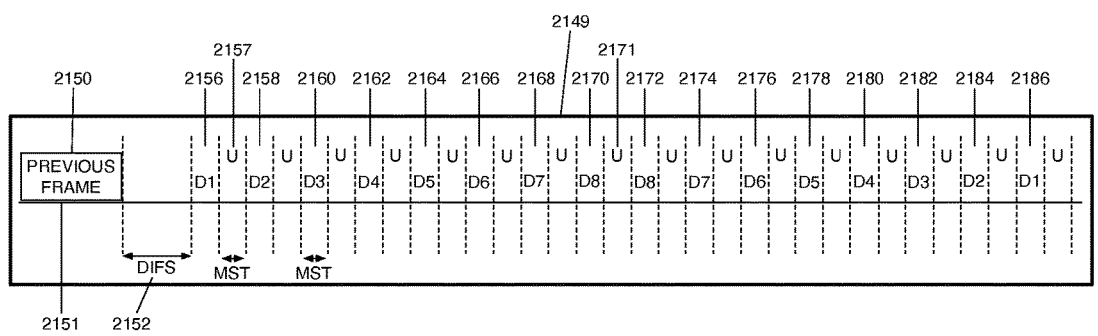
Figure 21

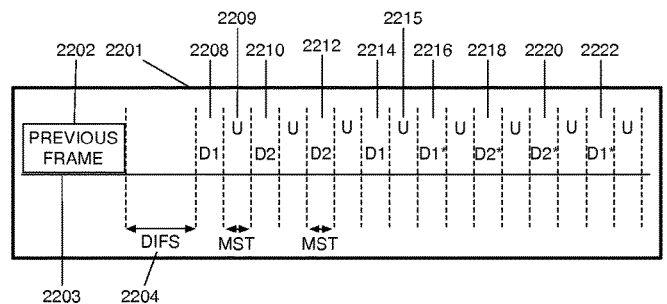
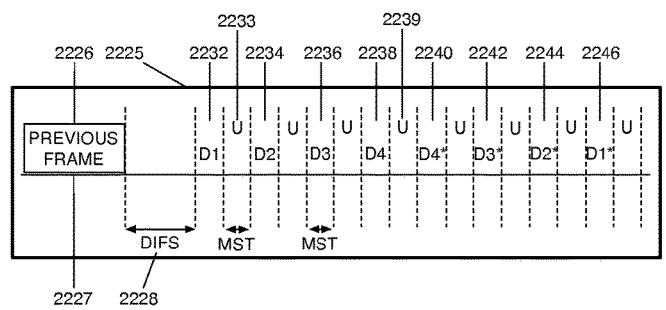
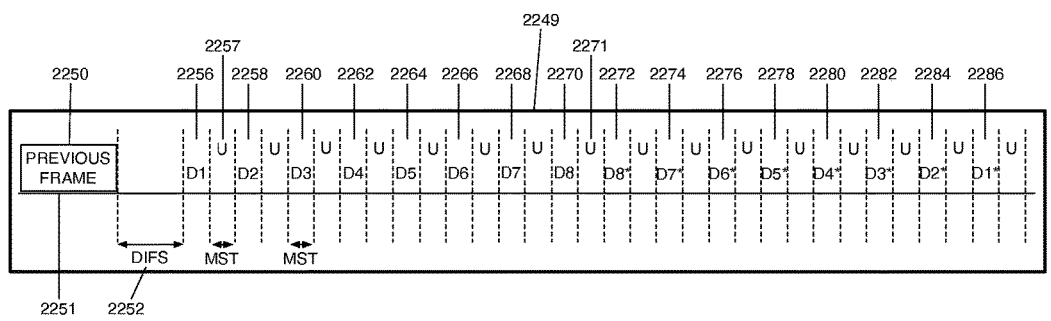
Figure 22

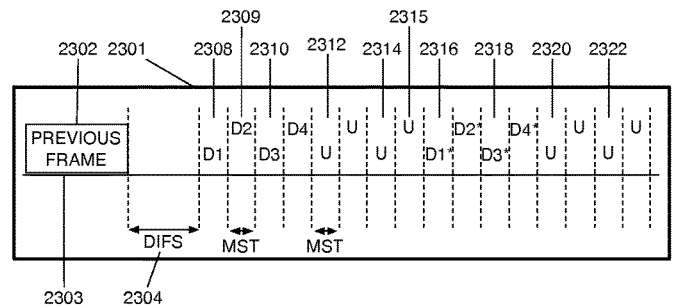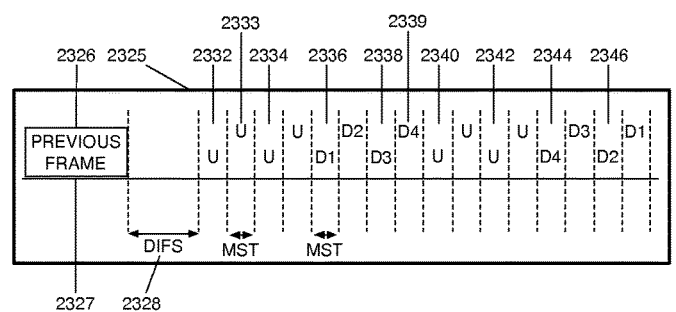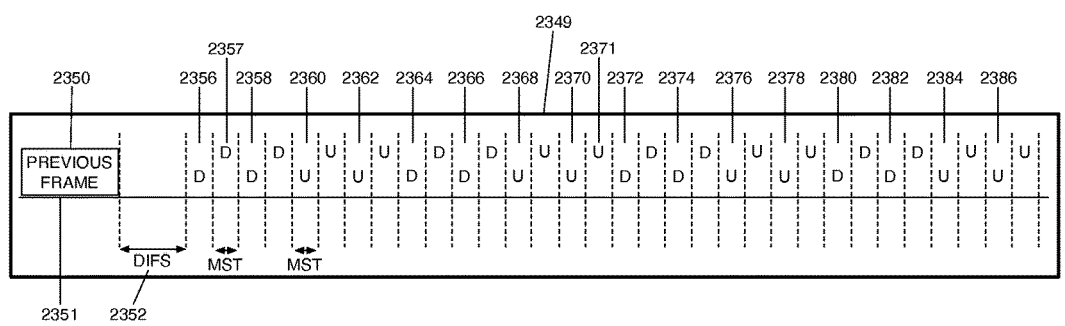
Figure 23

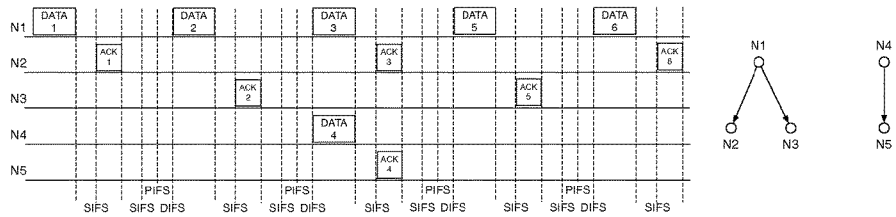

Notes:

1. ACK frame contains a sequence number or a collision detection pattern.

2. Arrow points from transmitter of DATA frame to receiver of DATA frame.

3. In a distributed network, collision detection patterns used by N2 and N3 in their ACKs may not be coordinated. Longer collision detection patterns may reduce the probability that N2 and N3 use the same collision detection numbers at any given point in time. This may further robustly facilitate extra ACK snooping.

4. In the example scenario, N4 uses extra ACK snooping to test the feasibility of its transmission to N5 in parallel with N1's transmission to N2. Thus, extra ACK snooping may improve robustness and correctness of the collision detection mechanism in scenarios with multiple client nodes.

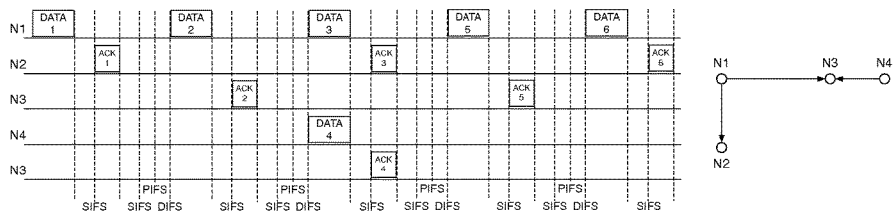

Notes:

1. ACK frame contains a sequence number or a collision detection pattern.

2. Arrow points from transmitter of DATA frame to receiver of DATA frame.

3. In a distributed network, collision detection patterns used by N2 and N3 in their ACKs may not be coordinated. Longer collision detection patterns may reduce the probability that N2 and N3 use the same collision detection numbers at any given point in time. This may further robustly facilitate extra ACK snooping.

4. In the example scenario, N4 uses extra ACK snooping to test the feasibility of its transmission to N3 in parallel with N1's transmission to N2. Thus, extra ACK snooping may improve robustness and correctness of the collision detection mechanism in scenarios with multiple client nodes.

Figure 29

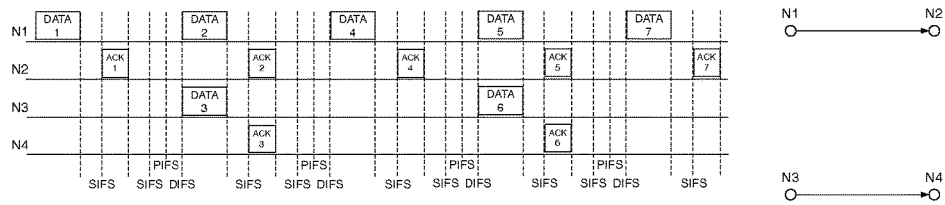

Notes:

1. ACK frame contains a sequence number or a collision detection pattern.

2. Arrow points from transmitter of DATA frame to receiver of DATA frame.

3. More ACK snooping may improve robustness.

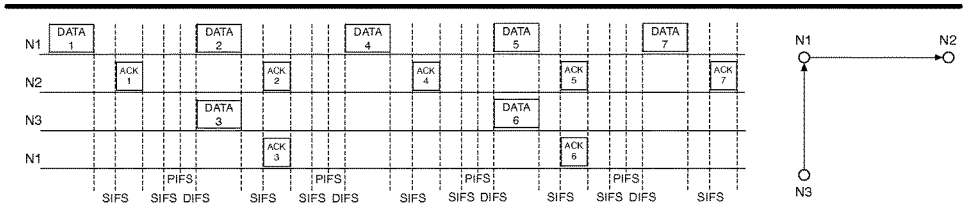

Notes:

1. ACK frame contains a sequence number or a collision detection pattern.

2. Arrow points from transmitter of DATA frame to receiver of DATA frame.

3. More ACK snooping may improve robustness.

4. N1 is capable of transmitting and receiving at the same time.

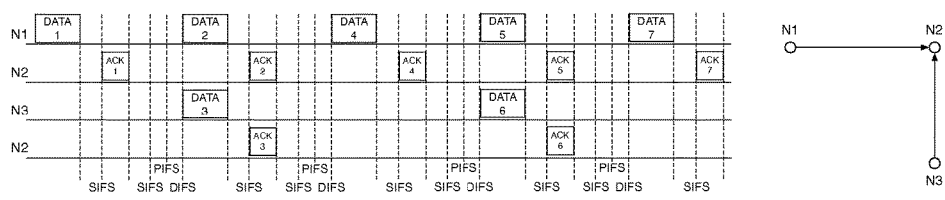

Notes:

1. ACK frame contains a sequence number or a collision detection pattern.

2. Arrow points from transmitter of DATA frame to receiver of DATA frame.

3. More ACK snooping may improve robustness.

4. N2 is capable of transmitting and receiving multiple frames at the same time.

Figure 30

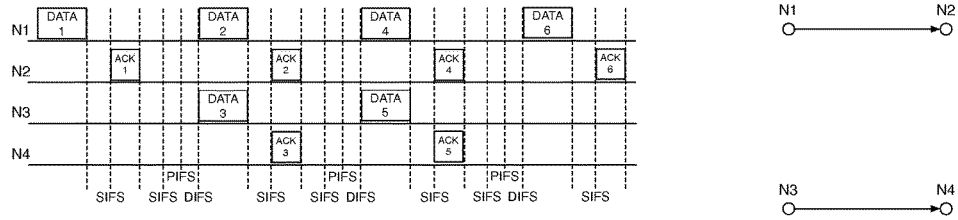
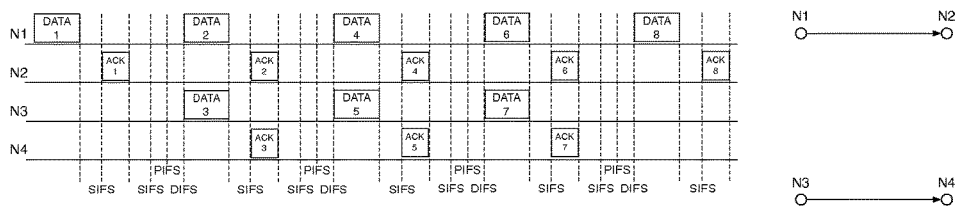
Figure 31

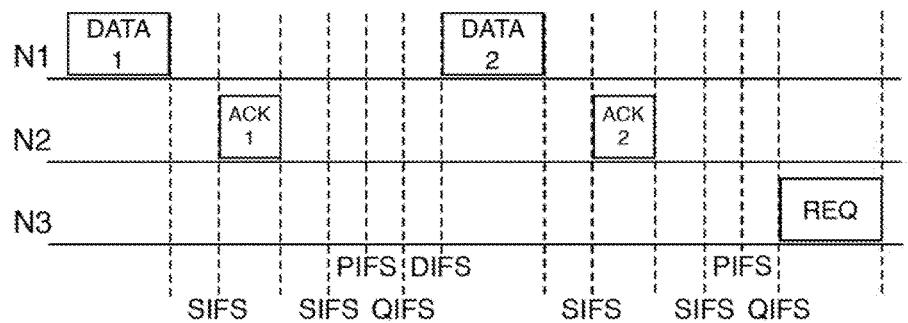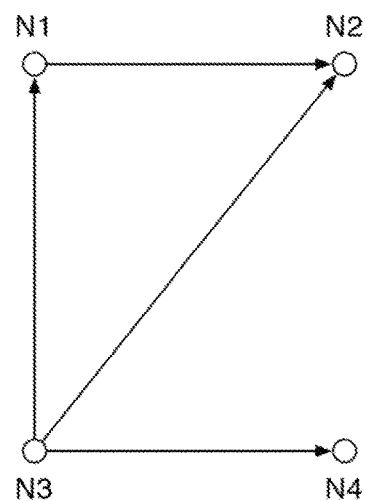
Figure 32

WIRELESS COMMUNICATION METHODS, SYSTEMS, AND COMPUTER PROGRAM PRODUCTS

CROSS-REFERENCE TO RELATED APPLICATIONS

The present patent claims the benefit of U.S. Provisional Patent Application 62/198,557, having the same title, filed 29 Jul. 2015 and is a continuation-in-part of U.S. patent application Ser. No. 15/172,736, having the same title, filed 3 Jun. 2016, which is a continuation of U.S. patent application Ser. No. 14/823,506, having the same title, filed 11 Aug. 2015, now U.S. Pat. No. 9,363,006, which is a continuation of U.S. patent application Ser. No. 13/701,449, having the same title, filed 3 Dec. 2012, now U.S. Pat. No. 9,148,908, which is the US national-phase entry of international application PCT/US2011/039180, having the same title, filed 3 Jun. 2011, which is a non-provisional of, and thus claims the benefit of, each of U.S. Provisional Patent Application 61/451,039, filed 9 Mar. 2011; U.S. Provisional Patent Application 61/369,181, filed 30 Jul. 2010; and U.S. Provisional Patent Application 61/351,541, filed 4 Jun. 2010. Each of the parent applications listed above is incorporated by reference.

TECHNICAL FIELD

The present invention relates to wireless communication networks, and more particularly to routing signals through and scheduling transmissions over wireless networks.

BACKGROUND OF THE INVENTION

In some wireless communication systems, such as cellular communication systems, a geographic area of the network is broken up into sub-areas referred to as "cells." Each cell may, for example, be about ten square miles in area in a larger area of 50 square miles. Each cell may include a device referred to as "cellular base station," which, in some systems, has a tower for receiving/transmitting and a base connected into a public switched telephone network (PSTN).

Areas are often divided into cells in order to use spectrum more efficiently. Typically, a wireless carrier is allocated a limited number of frequency channels. The use of the cells, in some applications, facilitates frequency reuse, such that, for instance, different users (e.g., individuals operating cellular handsets or wireless devices that send or receive data over a wireless network) may communicate with different base stations over the same frequency in different cells, thereby re-using spectrum while avoiding or reducing interference. Cell phone systems are often digital with each cell having several channels for assignment to users. In a large city, there may be hundreds of cells.

Cellular networks often include a mobile telephone switching office (MTSC) that, in some systems, controls certain aspects of the operation of some or all of the base stations in a region, control that may include control of the connections to a public land mobile network PLMN. For instance, when a user's wireless device gets an incoming call, the MSC may attempt to locate in which cell the user's wireless device is located. The MSC then may instruct a base station and other system components to assign resources for the call to the wireless device. The MSC then communicates with the user's wireless device over a control channel to inform the user's wireless device what resources to use. Typically, once the user's wireless device and its respective cell tower are connected, the call may proceed between the wireless device and tower. Similar mechanisms are used to facilitate data communication (e.g., packet switched data communication) between the wireless device and the network.

In some cellular communication systems, a wireless device directly communicates with the cellular base station. That is, in some cellular wireless systems, the wireless device communicates with the cellular base station via a single-hop, meaning that the signals sent between the wireless device and the cellular base station are not mediated through an intermediary device that receives signals from one and passes them on to the other.

In some systems, at certain times, there may be a relatively large number of users attempting to directly communicate with the cellular base station in a cell. Some of these users may be located in areas referred to herein as "marginal-to-inoperative regions," which are areas where the wireless service is spotty, or relatively weak, because the signal between the wireless device and the cellular base station is weak or blocked, usually because of hilly terrain, excessive foliage, physical distances, concrete walls, or tall buildings. In another example of a marginal-to-inoperative region, some of these users may be located in areas referred to herein as "cell-edges," which are areas where the interference from neighboring cells is relatively high.

Furthermore, the signal strength/quality in some areas of the cell may not be strong enough to meet the throughput demand of the user. This is because, when everything else is kept constant, the data rate that can be supported between a wireless device and a cellular base station depends, in part, on the signal strength/quality between the device and the base station. In some cellular systems, wireless devices are configured to transmit at a relatively high power when the device is in an area of the cell where the signal strength is low. This may help in supporting higher data rates between that particular device and that particular base station. However, higher-power transmission consumes precious battery power of the device and also potentially causes more interference in the neighboring cells. Causing more interference in the neighboring cells may further hurt the effective capacity of the cellular system.

Some cellular systems may use adaptive modulation and coding. To facilitate communication, these systems often use modulation schemes and a certain amount of error correction coding (which may tend reduce the data rate or throughput of the wireless link) when the signal strength between a wireless device and the cellular base station is relatively low. Thus, such systems may achieve a data rate between the device and the base station that depends, in part, on the location of the device with respect to the base station. Moreover, in these systems, if the same amount of spectrum was allocated to two wireless devices in a cell, where the signal strength/quality between the base station and the first device is high and the signal strength/quality between the base station and the second device is low, then the first device would (on average) be able to send/receive more useful data to/from the cellular base station. Thus, while allocating spectrum to a requesting device, the cellular base station is often at the mercy of the location of the requesting device when determining the amount of spectrum that is allocated. This further hurts the effective capacity of the wireless spectrum:

Therefore, there is a need in the art for expanding the effective coverage area and improving the effective capacity of cellular base stations and cellular networks.

This need exists independently of other inadequacies of other types of wireless networks (though as explained in the accompanying description, solutions to one need may facilitate solutions to the other). For instance, certain non-cellular networks, such as wireless networks that communicate in accordance with IEEE 802.11n specification, may convey data at a lower rate or to fewer devices than is desired.

BRIEF DESCRIPTION OF THE SEVERAL VIEWS OF THE DRAWING

A better understanding of the present inventions can be obtained when the following detailed description is considered in conjunction with the following drawings, in which:

FIGS. 21-23 are more examples of schedules for mediating access to a wireless medium;

FIGS. 28-31 are examples of timing diagrams and processes for detecting collisions on a wireless network; and FIG. 32 is a timing diagram depicting example of a request frame.

DETAILED DESCRIPTION

Figure 1:
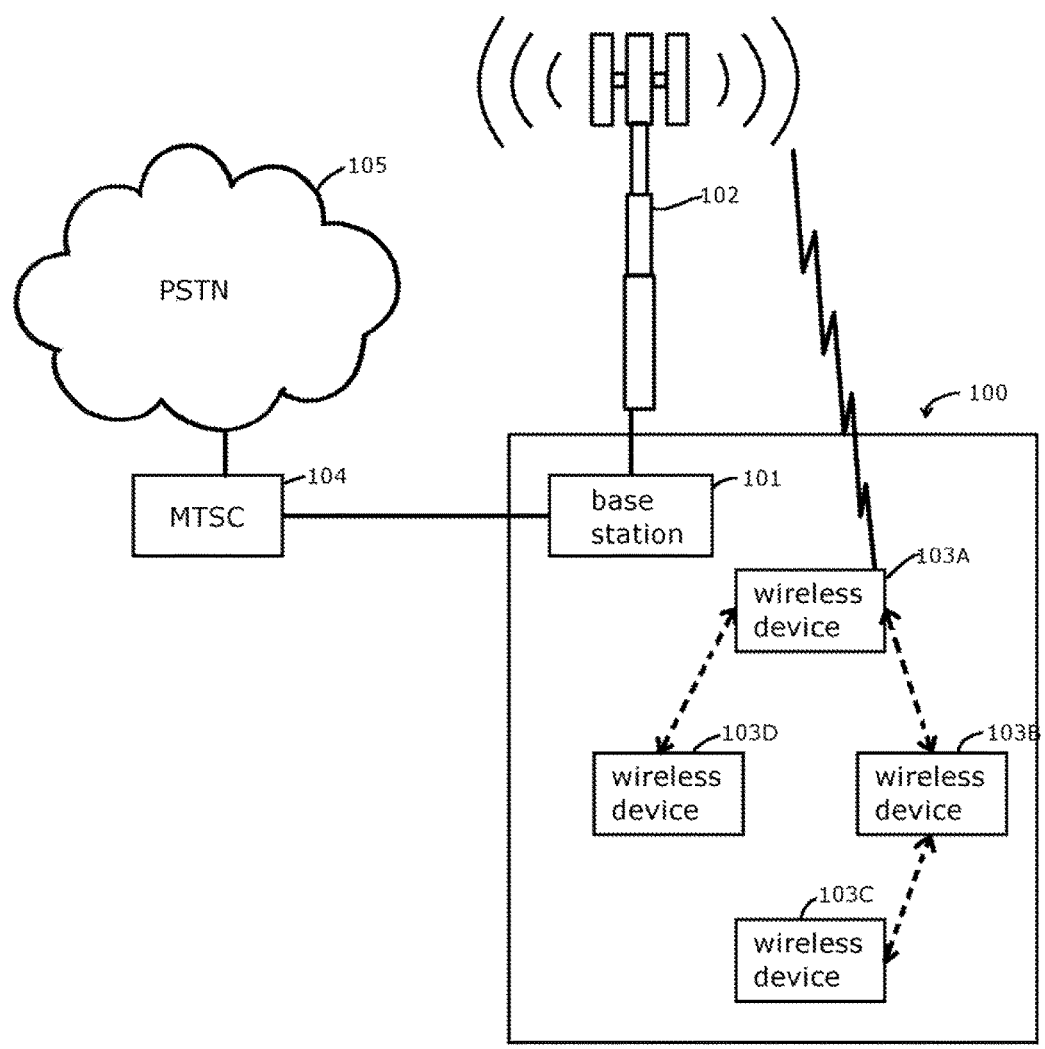
FIG. 1 is a generalized diagrammatic view of a cell in a cellular network where wireless devices in the cell have the ability to communicate with the base station via multi-hopping in accordance with an embodiment of the present invention.

The present inventions include methods, a wireless devices, and computer program products for expanding the coverage and improving the capacity of a cellular network. The present inventions also include methods, wireless devices, and computer program products for enhancing the capacity of certain non-cellular wireless networks.

In one embodiment, a wireless device (e.g., a cellular telephone) is able to communicate with a cellular base station in a cell of the cellular network over a non-cellular interface via another wireless device in the cell through the use of multi-hopping. A wireless device may request permission to communicate with the base station over a non-cellular interface via hopping off another wireless device when its signal strength is below a threshold. Other factors that may affect a device's hopping decision include, but are not limited to, battery life, bandwidth usage, type of device, level of mobility, time of day, subscription fees, user profile, non-cellular signal strength, cellular signal strength, level of wireless interference seen by non-cellular interface, and level of wireless interference seen by cellular interface, as explained further below. Alternatively, a wireless device may receive a request to communicate with the base station over a non-cellular interface via hopping off the wireless device that sent the request when that wireless device has excess capacity in its bandwidth with the base station. The wireless devices may communicate with one another in the cell using a non-cellular protocol thereby minimizing the usage of the bandwidth of the cellular network. By enabling wireless devices in the cell of the cellular network to communicate with a base station in such a manner via multi-hopping, the coverage area and the capacity of the cellular network is enhanced. Moreover, an improvement may be observed in the allocation and use of the cellular network system resources.

While the following discusses the present inventions in connection with wireless devices in a cellular network, the principles of the present invention may be applied to home appliances and other wireless devices that are wirelessly connected to each other in a peer-to-peer network. And, embodiments applying the principles of the present inventions to such implementations would fall within the scope of the present inventions.

In the following description, numerous specific details are set forth to provide a thorough understanding of the present inventions. However, it will be apparent to those skilled in the art that the present inventions may be practiced without such specific details. In other instances, well-known circuits have been shown in block diagram form in order not to obscure the present inventions in unnecessary detail. With the exception of certain inventions relating to scheduling of transmissions on a wireless network, details considering timing considerations and the like have been omitted inasmuch as such details are not necessary to obtain a complete understanding of some of the present inventions.

As stated in the Background Information section, currently, in some existing cellular systems, the cellular device directly communicates with the cellular base station. That is, in some existing cellular systems, the cellular device communicates with the cellular base station via a single-hop. As discussed above, there may be hundreds or thousands of people attempting to directly communicate with the base station in a cell. Some of these individuals may be located in areas referred to herein as "bad spots," which are areas where cell telephone service is weak and/or not available because the signal between the cellular phone and the base station is blocked, usually by hilly terrain, excessive foliage, physical distance or tall buildings. Further, the signal strength in some areas of the cell may not be strong enough to meet the throughput demand of the user. Therefore, there is a need in the art for extending the coverage area of the base station to serve those individuals that may be located in bad spots as well as to meet throughput demand for users in areas where the signal strength is low.

Principles of the present inventions, as discussed herein in connection with FIGS. 1-4, among others, expand the coverage area and improve the capacity of the cellular base station. This allows the cellular base station to serve those individuals that may be located in bad spots. Further, principles of the present inventions, as discussed herein in connection with FIGS. 1-4, among others, more efficiently allocate the system resources of the cellular network in order to more effectively meet the throughput demand for users in areas where the signal strength is low. Though not all embodiments are directed toward providing these benefits, and other embodiments may provide other advantages.

Figure 2:
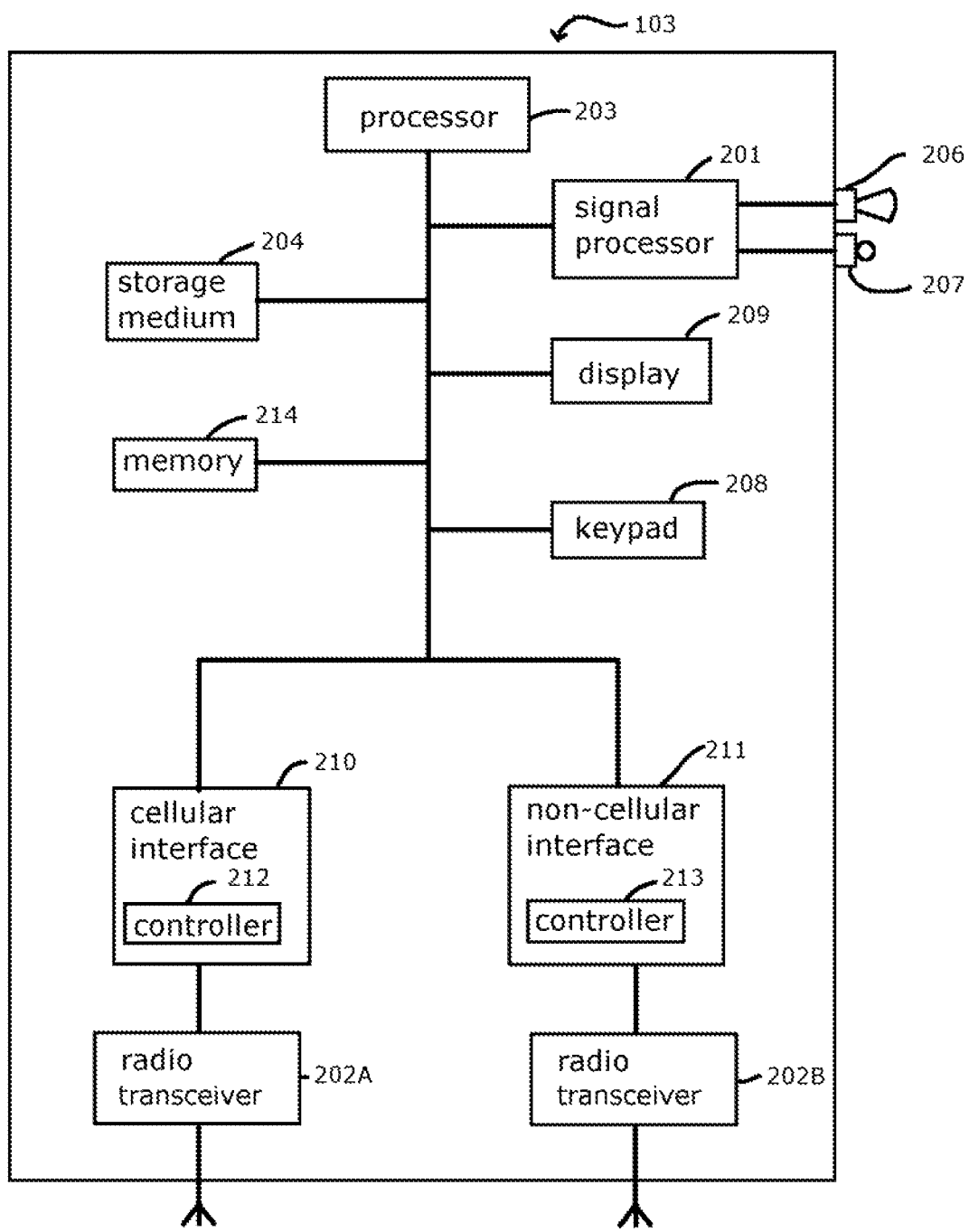
FIG. 2 is a block diagram illustrating an exemplary view of the internal circuitry of components of a cellular telephone in accordance with an embodiment of the present invention.
Figure 3:
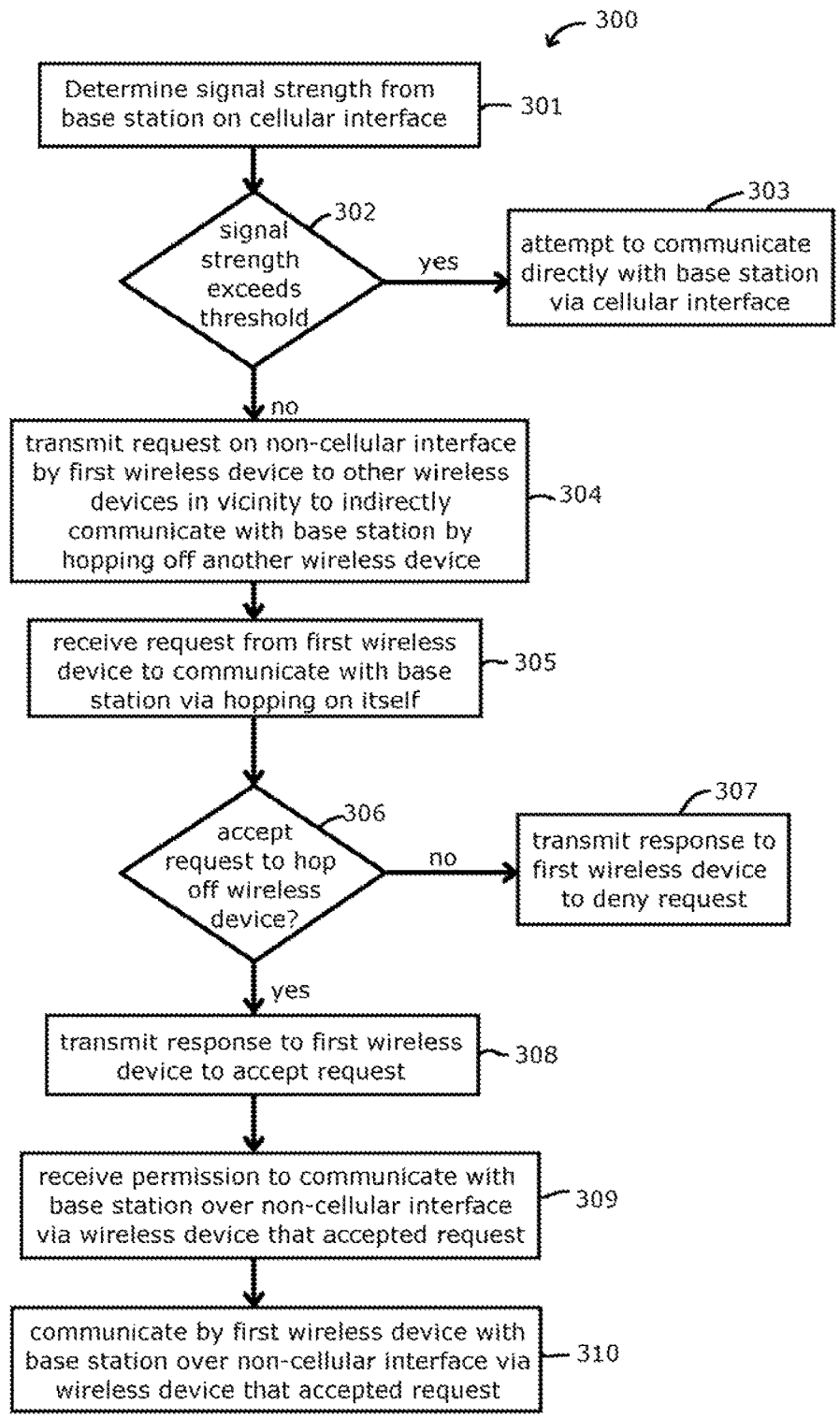
FIG. 3 is a flowchart of a method for expanding the coverage of a cellular network in accordance with an embodiment of the present invention.
Figure 4:
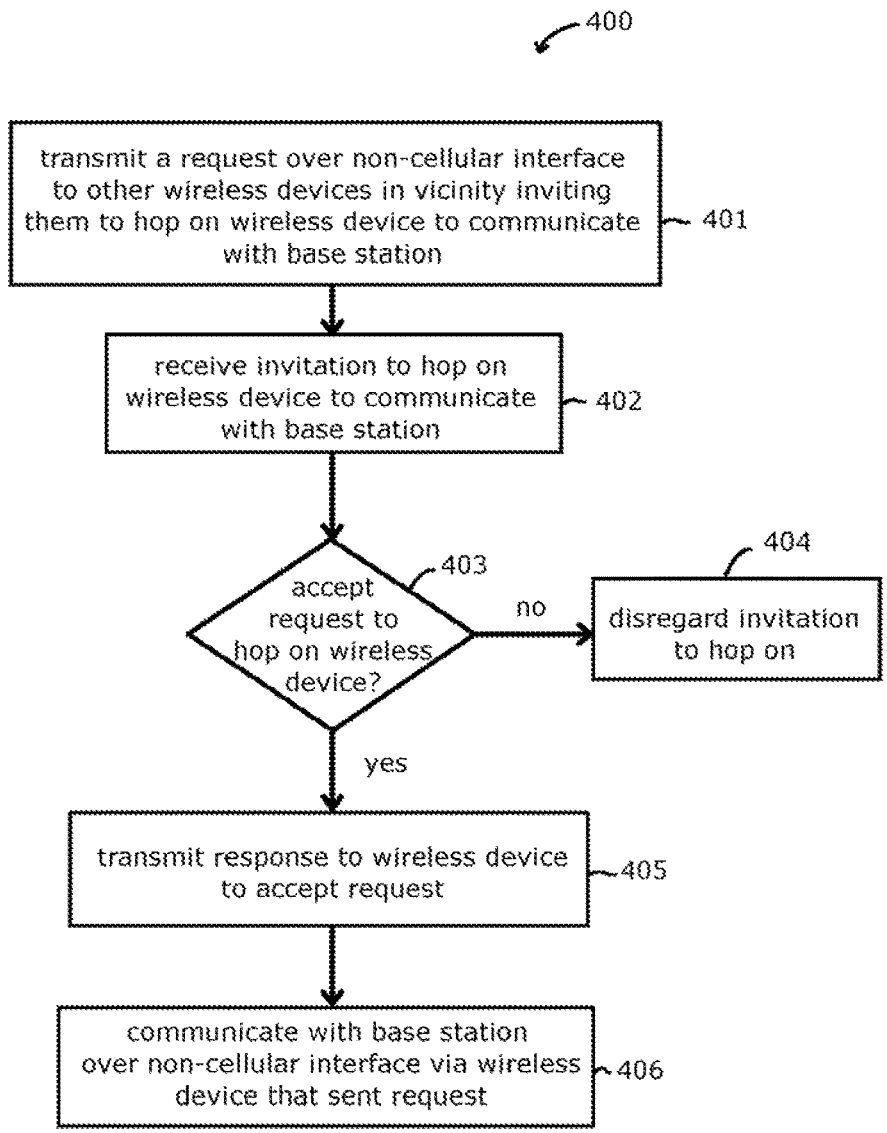
FIG. 4 is a flowchart of an alternative method for expanding the coverage of a cellular network in accordance with an embodiment of the present invention.

FIG. 1 is a generalized diagrammatic view of a cell in a cellular network where wireless devices in the cell have the ability to communicate with the base station via multi-hopping. FIG. 2 is a block diagram illustrating an exemplary view of the internal circuitry of certain components of a cellular telephone. FIG. 3 is a flowchart for expanding the coverage and improving the capacity of a cellular network in the scenario of when a wireless device has low signal strength thereby, in some instances, necessitating the need to attempt to hop off another wireless device in the cell to communicate with the base station. FIG. 4 is a flowchart for expanding the coverage and improving the capacity of a cellular network in the scenario of when a wireless device has excess capacity in its bandwidth with the base station to allow other wireless devices in the cell to hop off itself to communicate with the base station.

Referring to FIG. 1, FIG. 1 is a generalized diagrammatic view of a cell 100 in a wireless cellular telephone network in accordance with an embodiment of the present inventions. It is noted that only a single cell 100 in a cellular network is depicted for ease of understanding. The principles of the present invention are not limited to any particular number of cells in a particular cellular telephone network.

Cell 100 in a wireless cellular telephone network may be about ten (10) square miles in area. Each cell 100 in a cellular telephone network may include a cellular base station 101 that has a tower 102 for receiving/transmitting with wireless devices 103A-D (e.g., cellular phones, netbooks, personal digital assistants, laptop computers). Wireless devices 103A-D may collectively or individually be referred to as wireless devices 103 or wireless device 103, respectively. A wireless device 103, as used herein, may refer to any communication device that has the capability of wirelessly communicating data to or from a cellular network or other network. While FIG. 1 depicts four wireless devices 103 in cell 100, FIG. 1 is not to be limited in scope to any particular number of wireless devices 103 that may be serviced in cell 100. An example of a wireless device being a cellular telephone for practicing the principles of the present inventions is discussed below in connection with FIG. 2.

In accordance with an embodiment of the present inventions, wireless devices 103 are configured to communicate with base station 101 over "multiple hops." "Multi-hopping," as used herein, refers to the process whereby a wireless device 103 is able to communicate with base station 101 via one or more other wireless devices 103. For example, as illustrated in FIG. 1, wireless device 103B may be able to communicate with base station 101 via wireless device 103A. In another example, as illustrated in FIG. 1, wireless device 103C may be able to communicate with base station 101 via wireless devices 103B, 103A. In this example, the range of communication is extended. In another example, as illustrated in FIG. 1, wireless device 103D may be able to communicate with base station 101 via wireless device 103A. Hence, by allowing wireless devices 103B, 103D to communicate with base station 101 via wireless device 103A, there is a more efficient usage of the bandwidth of the cellular network. A more detail description of multi-hopping will be discussed further below. In one embodiment, wireless devices 103 may be able to communicate with each other via a non-cellular protocol thereby minimizing or reducing the usage of the bandwidth of the cellular network as discussed in further detail below. In one embodiment, the user of wireless device 103 communicating with base station 101 via multi-hopping is charged for the service. That is, the user(s) of the intermediary wireless device(s) 103 are not charged for the service involving the user of wireless device 103 communicating with base station 101 via the intermediary wireless device(s) 103.

Referring again to FIG. 1, cellular base station 101 may be connected into the public switched telephone network (PSTN) 105 (or other wired or optical fiber-based network, e.g., the Internet) via a mobile telephone switching office (MSC) 104. Each carrier may have a mobile telephone switching office (MTSO) 104 that controls all of the base stations 101 in the city or region and controls all of the connections to the land based PSTN 105. Different cellular standards, such as GSM, UMTS, WiMAX, LTE, etc. may use terms like mobile switching center (MSC) for 104 and public land mobile network (PLMN) for 105.

As discussed above, the cellular base station 101 has a tower 102 for receiving/transmitting with wireless devices 103A-D. That is, communication is achieved between wireless device 103 and tower 102, such as via two-way long-range radio frequency communication, e.g., communication over a distance of more than 1000 meters. A block diagram illustrating an exemplary view of the internal circuitry of key components of wireless device 103 being a cellular telephone is provided below in connection with FIG. 2.

Referring to FIG. 2, FIG. 2 is a block diagram illustrating an exemplary view of the internal circuitry of components of wireless device 103 (FIG. 1) being a cellular telephone in accordance with an embodiment of the present invention. Wireless device 103 includes a signal processor 201 and radio transceivers 202A, 202B coupled to a processor 203 (radio transceivers 202A, 202B coupled to processor 203 via cellular and non-cellular interfaces 210, 211, respectively, as discussed further below). Further, wireless device 103 includes a storage medium 204 coupled to processor 203. Additionally, wireless device 103 includes an antenna 205 for transmitting and receiving radio waves (wireless signals). Radio transceivers 202A, 202B coupled to antenna 205 performs processes relating to transmitting and receiving radio communication. Signal processor 201 converts radio signals received from radio transceivers 202A, 202B into audio signals outputted by a speaker 206 and coverts received audio signals from a microphone 207 into radio signals that are transmitted by radio transceivers 202A, 202B and antenna 205 combinations. Keypad 208 includes internal electrical sensors behind each key visible from the exterior of wireless device 103. These sensors may trigger a particular response when a key is depressed by a user of wireless device 103.

Processor 203 is a microprocessor that may be the brain or central processor of wireless device 103, e.g., in some embodiments, an operating system of wireless device 103 may be executed on by processor 203. In this embodiment, processor 203 controls all or substantially all processes occurring within/on wireless device 103, including responding to user-inputs and executing program modules to generate menu items, prompts, etc., that are outputted on a display 209. Display 209 may be a touch or multi-touch display, e.g., a capacitance-responsive LCD, E-ink, or OLED display, for receiving user-input through contact or proximity between the screen and one or more digits of the user or a stylus.

Storage medium 204 stores computer executable programs as individual utilities/modules and maintains a database of user-entered (or dynamically created/stored) data.

In this embodiment, wireless interface implements protocols that facilitate wireless communication between two wireless terminals. A terminal could be a base station or a device; moreover, a base station can also be considered as a device. Thus we will use the phrase wireless terminal and wireless device interchangeably. At least one wireless interface resides inside each wireless terminal. A cellular interface is a wireless interface that is being directly managed by a cellular network. Thus one or more cellular towers could be controlling the behavior of the cellular interface inside a cellular device. For example, a cellular base station or base stations may indicate to a cellular device which cellular base station it should communicate with, when the cellular device should communicate, or with what frequencies, codes, timing, transmission power level, and data rate the cellular device should communicate. Using its cellular interface, a cellular device can communicate with a base station directly over a single-hop. In some implementations, the wireless device may communicate over multiple hops by using only the cellular interface. A non-cellular interface is a wireless interface that is not being directly managed by a cellular network, e.g., the wireless devices may be capable of forming wireless connections to other wireless devices independent of a cellular base station. Examples of non-cellular interfaces include interfaces that implement the IEEE 802.11a, b, g, n, p, or s standard, the Bluetooth standard, or the Zigbee standard. In certain examples of non-cellular interfaces, the non-cellular interface may be capable of accessing a one or more frequencies, time slots, or using codes without having its access to the same mediated by a cellular base station. There is one exception to this definition: in a device, if a first infrastructure network is managing a first wireless interface and a second infrastructure network is managing a second wireless interface, and the first wireless interface facilitates multi-hopping in the second infrastructure network, then the first wireless interface can be considered as a non-cellular interface from the perspective of the second infrastructure network. For example, a smartphone may simultaneously connected to a 3G network using a cellular interface and a WiFi network using a non-cellular interface. The non-cellular interface, while being connected to a WiFi base-station, may also be simultaneously facilitating multi-hop cellular communication via the non-cellular interface for some other device. Communication with the other device over the non-cellular interface, in this example, is not tightly controlled by the WiFi base-station or the cellular base-station. Although a non-cellular interface may modify its behavior based on the feedback that it gets from the cellular network in which it is facilitating multi-hop, it cannot be forced to do so solely by the cellular network, e.g., inputs to the non-cellular interface other than those provided by the cellular network may also affect the behavior of the non-cellular interface, for instance an input from a cellular network may be one parameter among many in a decision made by the non-cellular interface. For instance, a cellular network may request that the wireless device modify some of the subsequently described routing or role selection processes to make the wireless device more or less inclined to use the non-cellular interface over the cellular interface. Indeed, in some embodiments, the non-cellular interface still has full control over its behavior and is capable of making its communication decisions in a decentralized manner.

Additionally, wireless device 103 includes a cellular interface 210 and a non-cellular interface 211 coupled to processor 203. Cellular interface 210 is further coupled to radio transceiver 202A; whereas, non-cellular interface 211 is further coupled to radio transceiver 202B. Some implementations may couple cellular interface 210 and non-cellular interface 211 to the same radio transceiver and antenna. Cellular interface 210 and non-cellular interface 211 include a controller 212, 213. Cellular interface 210 refers to an interface for communicating with cellular tower 102. Non-cellular interface 211 refers to an interface, such as but not limited to, Bluetooth™, WiFi™, FlashLinQ™, for communicating indirectly with cellular tower 102 or other devices, such as other hand-held cellular devices or access points, having the same type of non-cellular interface. As discussed further below, wireless device 103 may communicate with each other using a non-cellular interface. Non-cellular interface 211 and cellular interface 210 may use the same wireless spectrum or different wireless spectrums. If non-cellular interface 211 uses different spectrum, peer-to-peer communication between wireless devices 103 may not use or affect the bandwidth of the cellular network. In one embodiment, cellular interface 210 and non-cellular interface 211 may each be embodied on a separate integrated circuit. In another embodiment, cellular interface 210 and non-cellular interface 211 may both be embodied on a single integrated circuit with controller 212/213 located on a separate integrated circuit. In another embodiment, cellular interface 210 (without controller 212) and non-cellular interface 211 (without controller 213) along with a single controller (controllers 212/213 combined into a single controller) may all be embodied on a single integrated circuit. In another embodiment, cellular interface 210 (without controller 212) and non-cellular interface 211 (without controller 213) may be coupled to processor 203, where processor 203 includes a single controller (controllers 212/213 combined into a single controller).

Furthermore, wireless device 103 includes a memory 214 coupled to processor 203, cellular interface 210 and non-cellular interface 211. An application in accordance with the principles of the present inventions may include an application for expanding the coverage of a cellular network as discussed further below in association with FIGS. 3 and 4. The application of the present inventions may reside in memory 214. Controller 212, 213 may be a processor configured to execute the instructions of the application residing in memory 214. In another embodiment, the instructions of the application may reside in a separate memory (not shown) in cellular interface 210/non-cellular interface 211.

As will be appreciated by one skilled in the art, aspects of the present inventions may be embodied as a system, method or computer program product. Accordingly, aspects of the present inventions may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more tangible computer readable medium(s) having computer readable program code embodied thereon.

Any combination of one or more computer readable medium(s) may be used. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventions may be written in any combination of one or more programming languages, including an object oriented programming language such as Java, Smalltalk, C++ or the like and conventional procedural programming languages, such as the "C" programming language or similar programming languages.

Aspects of the present inventions are described below with reference to flowchart illustrations and/or block diagrams of methods, apparatus (systems) and computer program products according to embodiments of the present inventions. It will be understood that each block of the flowchart illustrations and/or block diagrams, and combinations of blocks in the flowchart illustrations and/or block diagrams, can be implemented by computer program instructions. These computer program instructions may be provided to a controller or processor, such that the instructions, which execute via the controller or processor, create means for implementing the function/acts specified in the flowchart and/or block diagram block or blocks.

These computer program instructions may also be stored in a computer readable medium that can direct a device to function in a particular manner, such that the instructions stored in the computer readable medium produce an article of manufacture including instructions which implement the function/act specified in the flowchart and/or block diagram block or blocks.

As stated above, in some currently existing cellular telephone systems, the cell telephone directly communicates with the cellular base station thereby resulting in limited coverage and inefficient use of the resources. Principles of the present inventions expand the coverage area while efficiently using the resources of the cellular network by allowing wireless devices (e.g., cellular phones, netbooks, personal digital assistants, laptop computers) to communicate with a cellular base station via hopping off other wireless devices in the cell. Furthermore, wireless devices may communicate with one another via a non-cellular protocol thereby minimizing or reducing the usage of the bandwidth of the cellular network. These principles will be discussed below in connection with two scenarios involving wireless devices 103. Referring to FIG. 1, one scenario involves wireless device 103 (e.g., wireless device 103B) having low signal strength thereby necessitating the need to attempt to hop off another wireless device 103 (e.g., wireless device 103A) in cell 100 to communicate with base station 101 as discussed below in connection with FIG. 3. In another scenario, wireless device 103 (e.g., wireless device 103A) has excess capacity in its bandwidth with base station 101 to allow other wireless devices 103 (e.g., wireless device 103B) in cell 100 to hop off itself to communicate with base station 101 as discussed below in connection with FIG. 4.

Referring to FIG. 3, FIG. 3 is a flowchart of a method 300 for expanding the coverage of a cellular network in accordance with an embodiment of the present invention. In particular, as stated above, FIG. 3 discusses expanding the coverage of the cellular network for the scenario involving wireless device 103 (e.g., wireless device 103B) having low signal strength thereby necessitating the need to attempt to hop off another wireless device 103 (e.g., wireless device 103A) in cell 100 to communicate with base station 101.

Referring to FIG. 3, in conjunction with FIGS. 1-2, in step 301, wireless device 103 (e.g., wireless device 103B, wireless device 103D) determines its signal strength on cellular interface 210 from base station 101.

In step 302, wireless device 103 (e.g., wireless device 103B, wireless device 103D) determines whether its signal strength exceeds a threshold. For example, wireless device 103 may determine if its signal strength is of sufficient strength to communicate with base station 101. The signal strength may not be strong enough to meet the throughput demand of the user of wireless device 103. The signal may not even be available due to the user of wireless device 103 being located in a "bad spot."

If the signal strength exceeds the threshold, then, in step 303, wireless device 103 attempts to directly communicate with base station 101 via cellular interface 210.

If, however, the signal strength is less than the threshold (i.e., signal strength is not strong enough to meet the throughput demand of the user of wireless device 103), then, in step 304, wireless device 103 (e.g., wireless device 103B, wireless device 103D) transmits a request to other wireless devices 103 (e.g., wireless device 103A) in the vicinity to indirectly communicate with base station 101 by hopping off another wireless device 103. "Hopping off a wireless device," as used herein, refers to indirectly communicating with base station 101 via that wireless device 103.

In step 305, wireless device 103 (e.g., wireless device 103A) receives the request to hop off itself to communicate with base station 101.

In step 306, wireless device 103 (e.g., wireless device 103A) that receives the request determines whether to accept the request. In one embodiment, wireless device 103 (e.g., wireless device 103A) determines whether to accept the request based on a variety of factors, such as battery usage, bandwidth usage (referring to the amount of the bandwidth that is currently being used in its connection), time of day pricing, etc.

If wireless device 103 (e.g., wireless device 103A) that receives the request determines to not accept the request, then, in step 307, wireless device 103 (e.g., wireless device 103A) transmits a response to wireless device 103 (e.g., wireless device 103B, wireless device 103D) to deny the request.

Alternatively, if wireless device 103 (e.g., wireless device 103A) that receives the request determines to accept the request, then, in step 308, wireless device 103 (e.g., wireless device 103A) transmits a response to wireless device 103 (e.g., wireless device 103B, wireless device 103D) to accept the request.

In step 309, wireless device 103 (e.g., wireless device 103B, wireless device 103D) receives permission to communicate with base station 101 over non-cellular interface 211 via wireless device 103 (e.g., wireless device 103A) that accepted the request.

In step 310, wireless device 103 (e.g., wireless device 103B, wireless device 103D) communicates with base station 101 over non-cellular interface 211 via wireless device 103 (e.g., wireless device 103A) that accepted the request.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted, which it not to suggest that any other features or steps described herein cannot also be omitted or performed simultaneously.

As stated above, an alternative scenario using the principles of the present invention involves wireless device 103 (e.g., wireless device 103A) having excess capacity in its bandwidth with base station 101 to allow other wireless devices 103 (e.g., wireless device 103B) in cell 100 to hop off itself to communicate with base station 101 as discussed below in connection with FIG. 4.

Referring to FIG. 4, in conjunction with FIGS. 1-2, in step 401, wireless device 103 (e.g., wireless device 103A) transmits a request over non-cellular interface 211 to other wireless devices 103 (e.g., wireless devices 103B, 103D) in the vicinity inviting them to hop on wireless device 103 (e.g., wireless device 103A) to communicate with base station 101 since wireless device 103 (e.g., wireless device 103A) has excess capacity in its bandwidth with base station 101.

In step 402, wireless devices 103 (e.g., wireless devices 103B, 103D) receive the invitation from wireless device 103 (e.g., wireless device 103A) to hop on wireless device 103 (e.g., wireless device 103A) to communicate with base station 101.

In step 403, wireless devices 103 (e.g., wireless devices 103B, 103D) determine whether to accept the invitation to hop on wireless device 103 (e.g., wireless device 103A) to communicate with base station 101. In one embodiment, wireless devices 103 (e.g., wireless devices 103B, 103D) determine whether to accept the invitation based on a variety of factors, such as the available bandwidth wireless device 103 (e.g., wireless device 103A) has to offer. For example, if the available bandwidth is not sufficient to handle the throughput demand, then wireless device 103 (e.g., wireless device 103B) would not accept the invitation. Alternatively, if there is sufficient bandwidth to handle the throughput demand, then wireless device 103 (e.g., wireless device 103B) may accept the invitation.

If wireless device 103 (e.g., wireless device 103B) that receives the request determines to not accept the invitation, then, in step 404, wireless device 103 (e.g., wireless device 103B) disregards the invitation.

Alternatively, if wireless device 103 (e.g., wireless device 103D) that receives the request determines to accept the invitation, then, in step 405, wireless device 103 (e.g., wireless device 103D) transmits a response to wireless device 103 (e.g., wireless device 103A) to accept the request.

In step 406, wireless device 103 (e.g., wireless device 103B) that accepted the request starts communicating with base station 101 over non-cellular interface 211 via wireless device 103 (e.g., wireless device 103A) that sent the request.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted, which it not to suggest that any other features or steps described herein cannot also be omitted or performed simultaneously.

In another embodiment, described below, a non-cellular interface may be used to indirectly communicate with a cellular network. Thus, in some embodiments, a wireless device without a cellular interface may indirectly communicate with a cellular network using principles of the present inventions. However, in some cellular network systems, only a cellular interface can directly communicate with a cellular network. Although not necessary in certain embodiments, some wireless devices have a cellular interface and a non-cellular interface. As noted above, the cellular and non-cellular interfaces in a device may operate in the same wireless spectrum or in wireless different spectrums. As explained above, properly configured, such a wireless device may communicate directly with a cellular network via its cellular interface and indirectly with a cellular network via its non-cellular interface. Therefore, such a wireless device may be configured to select whether to communicate directly or indirectly with a cellular network depending on its state, situations, and surroundings. That is, the wireless device may perform a process for determining whether to hop off of another device or communicate directly. In making this decision, a device may consider factors such as quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, and surrounding wireless environment. For example, each of, or a subset of, these factors may be compared against respective threshold values and if a factor exceeds the threshold, indirect communication may be selected, otherwise direct communications may be selected.

While devices are communicating directly with a cellular base station via a cellular interface today, in some systems, devices are not communicating with a cellular base station via a non-cellular interface today. Indirect communication with a cellular network by a wireless device via its non-cellular interface, in some embodiments, requires a first wireless device to send data for a base station via the non-cellular interface of the wireless device to the non-cellular interface of a second wireless device. If the second wireless device has a good enough (e.g. the signal strength may be greater than approximately −80 dBm, the signal to noise plus interference ratio may be greater than 15 dB, or a channel quality indicator (CQI) may be greater than 15) direct connection to the base station via its cellular interface, the second wireless device may forward the data that it receives via its non-cellular interface from the first wireless device directly to the base station via its cellular interface. Otherwise, the second wireless device may relay the data that it receives for the base station on its non-cellular interface from the first wireless device to the non-cellular interface of a third wireless device.

If the third wireless device has a good enough direct connection to the base station via its cellular interface, the third wireless device may forward the data (originated by the first wireless device) that it receives via its non-cellular interface from the second wireless device directly to the base station via its cellular interface. Otherwise, the third wireless device may relay the data (originated by the first wireless device) that it receives for the base station on its non-cellular interface from the second wireless device to the non-cellular interface of a fourth wireless device. In this way the multi-hop route can be extended to as many hops depending on the constraints, state and abilities of each wireless device that is involved.

In some systems cellular base stations may collaborate with one another to manage interference at the edge of the cell. However, such methods may result in the base stations tending to shuffle their resources around to mitigate interference. Principles of the present inventions provide these cellular base stations with an additional way to manage the interference in some embodiments. For example, if the cellular base stations detect that serving a wireless device at the edge of the cell may cause a an amount of interference above a threshold for other wireless devices near the same edge of the cell, one of the base stations may communicate with the cellular interface of the concerned wireless device and request that wireless device to use its non-cellular interface to indirectly communicate with the cellular network. In some embodiments, the cellular network requests the wireless device to choose another route to the cellular network. Thus, with loose help from the base station, the wireless device may mitigate the interference for other wireless devices located near the cell-edge and also help enhance the performance of the cellular network.

Moreover, in some embodiments, the wireless device may also make this decision independently without any, or with limited, assistance from the cellular base stations. One such way of doing this is to analyze the signal strength from nearby base stations. If the signal strengths of the top (strongest) few base stations (e.g., the two, three, or four strongest) are nearly the same (e.g., within 5%, 10%, or 30% of one another), the wireless device may predict that excessive cell-edge interference is likely, as transmissions to one cellular base station are likely to interfere with the other cellular base stations of similar signal strength, and, in response, wireless device may try to use its non-cellular interface to indirectly communicate with a nearby cellular base station, e.g., by initiating one or more of the above-mentioned processes for using non-cellular interfaces to hop off another cellular device closer to one of the cellular base stations. Other processes for predicting or sensing cell-edge user interference in a distributed manner (e.g., through processes performed by each wireless device) could use one of the following: signal strengths of nearby base stations, quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, surrounding wireless environment, history of throughput through various direct and indirect routes to the cellular network, and feedback from nearby wireless devices. Feedback from nearby wireless devices may be fed into distributed algorithms and protocols, which in some embodiments, may determine routing without global knowledge of the state of every wireless device on the cell or within a certain range. Moreover, in some systems, such feedback only provides indications to the device and the device may make an independent hopping decision to mitigate cell-edge user interference based on additional parameters independent of the information in the feedback. However, in certain systems, distributed approaches may be overly cautious and suffer from false alarms. Thus, loose co-ordination with base stations, e.g., as described above where the cellular base station influences but does not control hopping decisions, may be useful in certain implementations even when wireless devices use their non-cellular interfaces to communicate with base stations; the principles of the present invention, in certain embodiments, accommodate such co-ordination to further enhance the coverage and the capacity of cellular networks. For example, the cellular base stations may transmit a signal that influences decisions made by wireless devices concerning whether they will form multi-hop non-cellular connections to the cellular network, for instance by adjusting thresholds or weighing coefficients used by the wireless devices when performing processes to select a role in such a multi-hop network.

In some networks, a variety of wireless devices may communicate with cellular base stations, and the number of such devices attempting to connect with a given cellular base station is expected to increase in the future. Current and expected future single-hop cellular networks may not be adequate to support the increasing demand for better coverage and capacity. However, in some of the presently described embodiments, devices could leverage each other's capabilities to use the cellular system more efficiently in order to satisfy their demands for better coverage and capacity. One way for devices to make efficient use of the cellular system resources is to employ multi-hopping when seen as beneficial, e.g., according to one or more of the role-selection processes described herein. In some embodiments, the role selections may be distributed: each device may decide on its own about participating in multi-hopping.

Tight centralized control in a multi-hop cellular network may be exercised in accordance with embodiments of the presently described techniques, but such control is expected to reduce the performance of individual devices. This expected reduction in performance is because a centralized controller likely will not know everything about all wireless devices at all times without incurring a tremendous amount of overhead to convey detailed information about the state of each device and its wireless environment to the centralized controller. Overheads to convey such information themselves consume wireless spectrum and resources of the cellular system. Thus, tight centralized control on hopping decisions is expected to adversely affect the performance of multi-hop cellular systems. However, certain embodiments of the present inventions facilitate a multi-hop cellular system where the tight centralized control only extends to the cellular interfaces of the devices that are directly communicating to a cellular base station via their cellular interfaces. Depending on their state, situations and surroundings, the wireless devices themselves may make inter-device hopping decisions in a decentralized manner. A wireless device may receive some assistance from the cellular base station when making hopping decisions, but this is not necessary in every embodiment.

Although a hybrid approach (e.g., a mix of centralized and distributed control) used in embodiments of the present inventions is expected to make, in some systems, multi-hop cellular networks more scalable and efficient, the overall performance of multi-hop hybrid cellular and non-cellular networks may by enhanced, it is believed, by using distributed routing, device management, adaptive scheduling, and other distributed techniques. Examples of these techniques are described herein and can be extended to other kinds of wireless networks, such as single-hop cellular, multi-hop cellular, peer-to-peer single-hop, peer-to-peer multi-hop, wireless ad-hoc network, wireless mesh networks, etc. (Herein, the phrases cellular base station and cellular tower are used interchangeably.)

In another embodiment, a method for routing in a wireless network is provided. The method may include a first wireless terminal choosing to participate as a router. The method further includes the first wireless terminal deciding whether it will act as a relay or a sink. A relay may receive non-cellular signals (e.g., frames) and pass those signals on to a cellular network, either indirectly (e.g., via the non-cellular interface of the relay) or directly to a core network. A sink is a type of relay that passes the signals on directly to a cellular network via a cellular interface of the sink or a wired connection. In addition, in some embodiments, the method further includes a second wireless terminal choosing to send data to the first wireless terminal based on whether the first wireless terminal is acting as a relay or a sink. The first wireless terminal may also transmit a first metric describing cellular signal strength and quality seen by a nearby sink if acting as a relay. The first wireless terminal may also transmit a second metric describing cellular signal strength and quality seen by the first wireless terminal if acting as a sink.

The above-described embodiment may allow nearby wireless terminals to route packets to sinks via relays in a distributed manner. This is because, in some systems, each wireless terminal independently decides whether to act as a relay or a sink based on certain factors. For example, the first wireless terminal could choose to participate as a router based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, and surrounding wireless environment. For example, each of, or a subset of, these factors may be compared against respective threshold values and if a factor exceeds the threshold, the device may act as a router and if the threshold is not met, the device may not act as a router.

Moreover, the first wireless terminal could decide whether it will act as a relay or a sink based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, and surrounding wireless environment. For example, each of, or a subset of, these factors may be compared against respective threshold values and if a factor satisfies the threshold, the device may act as a sink and if the threshold is not met, the device may not act as a sink.

Furthermore, the second wireless terminal could choose to send data to the first wireless terminal based on at least one of the following factors: whether the first wireless terminal is acting as a relay or a sink, quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, and surrounding wireless environment. For example, each of, or a subset of, these factors may be compared against respective threshold values and if a factor satisfies the threshold, the device may send data to the first wireless terminal and if the threshold is not met, the device may not send data to the first wireless terminal.

Figure 5:
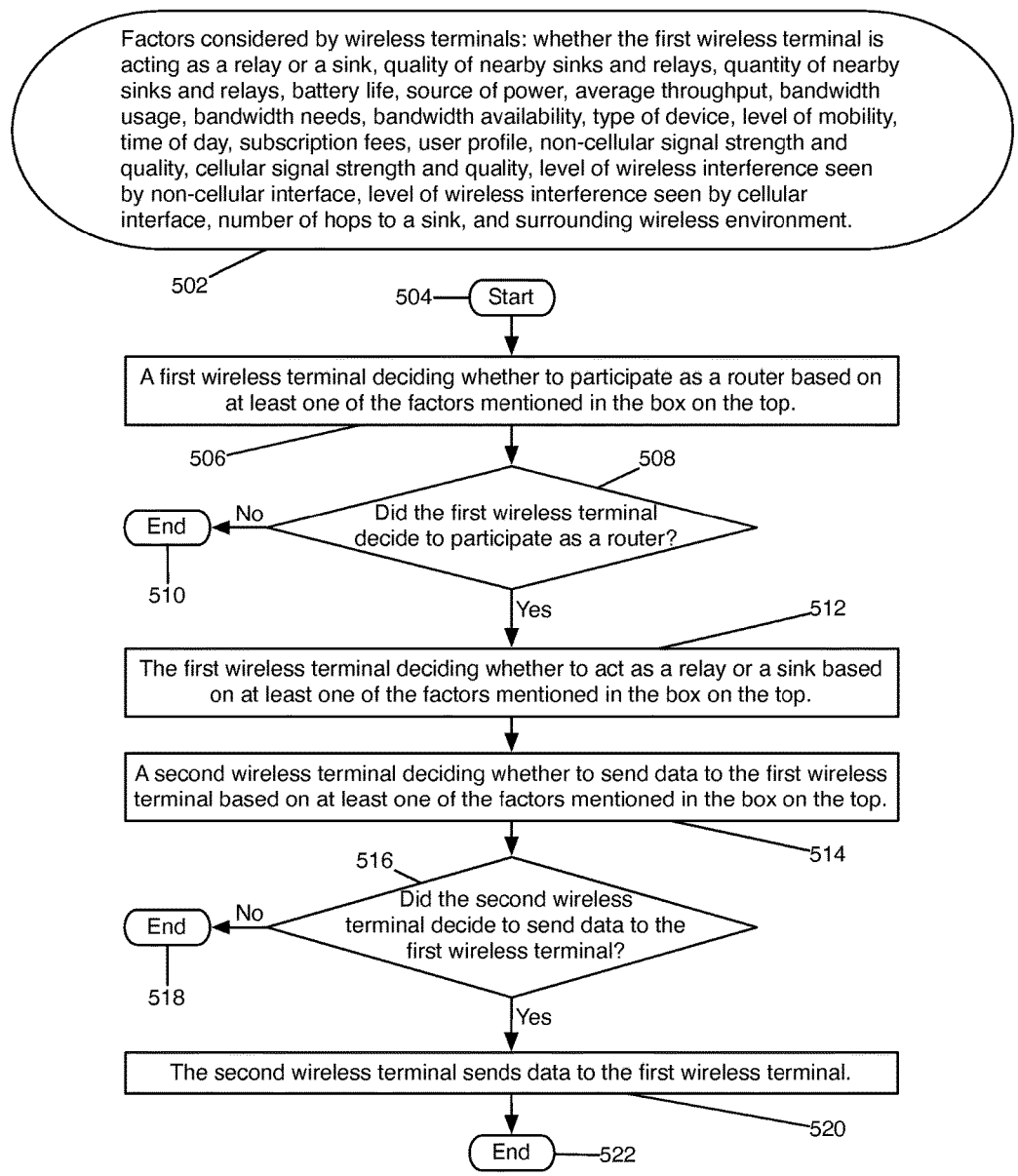
FIG. 5 is a flowchart of a method for selecting a role of a wireless device in a multi-hop network.

FIG. 5 is a flowchart of a method for routing in a wireless network in accordance with an embodiment. In step 506, a first wireless terminal decides whether to participate as a router based on at least one of the factors mentioned in step 502. In step 508, the first wireless terminal makes the corresponding decision. If the first wireless decides to act as a router, in step 512 the first wireless terminal further decides whether it will act as a relay or a sink based on at least one of the factors mentioned in step 502. In step 514, a second wireless terminal decides whether to send data to the first wireless terminal based on at least one of the factors mentioned in step 502. In step 516, the second wireless terminal makes the corresponding decision. If the second wireless terminal decides to send data to the first wireless terminal, it does so in step 520.

In certain embodiments, a sink could be an end-destination or a gateway to an adjoining network. For example, a first wireless device could be communicating with a second wireless device via its non-cellular interface and communicating with a cellular tower via its cellular interface. If the second wireless device chooses to communicate to the cellular network via the first wireless device, the first wireless device is a sink for the second wireless device because it acts as a gateway to the cellular network. Another example includes a third wireless device sending packets destined for a fourth wireless device in a peer-to-peer setting. In this example, the fourth wireless device is a sink for the third wireless device because it is the end destination for the packets originated by the third wireless device. It should be noted that the definition of a sink is contextual. It depends on the wireless device that originates packets.

In certain embodiments, a relay is an intermediate node in the route from a wireless device to a sink. For example, a first wireless device could be sending packets destined for a third wireless device via a second wireless device. The second wireless device is a relay for the first wireless device when relaying packets originated by the first wireless device to the third wireless device. There could be one or more relays in a route from an originating device to a sink. It should be noted that the definition of a relay is contextual. Whether a device is a relay depends on the wireless device that originates packets.

In certain embodiments, a wireless device may decide to act as a sink or a relay depending on the quality and quantity of nearby sinks and relays. For example, in a location where low cellular signal strength and quality is experienced by most wireless devices, a wireless device that gets moderate cellular signal strength and quality from the cellular towers may decide to act like a sink to help other wireless devices access the cellular network in a more efficient manner. In a location where moderate cellular signal strength and quality is experienced by most wireless devices, a wireless device that gets moderate cellular signal strength and quality from the cellular towers may decide to act like a relay instead.

In certain embodiments, a wireless device can decide to act as a router only when it has enough battery life available or when it is plugged into AC power. A wireless device that has multiple antennas and other complicated circuitry that helps it communicate efficiently with an adjoining network, such as a cellular network, can decide to be a sink for other less sophisticated nearby devices. A wireless device may only wish to act as a router, relay, and/or sink if it has enough bandwidth available and/or if it supports reasonable throughputs for other devices. Other device and environment could also help wireless devices decide whether to act as a router, relay, and/or sink.

A wireless device may, in some systems, choose one relay/sink over another based on the factors mentioned above. Some of these factors enhance user experience by taking into account user-based factors such as bandwidth needs and network-based factors such as average throughput. Using such factors may help wireless device choose good routes (e.g., routes having throughput greater than approximately 2 Mbps, latency less than approximately 10 ms, or a packet loss less than approximately 5%, to an adjoining network. For example, a wireless device may choose to communicate indirectly with a cellular tower via multiple hops instead of over a single-hop because the average throughput for the multi-hop route is higher. When the average throughput for the multi-hop route, the device may revert to using the single-hop connection to increase the likelihood of a good user experience.

One application of certain embodiments arises in multi-hop cellular networks. A relay (or intermediate node) may occasionally transmit a metric describing cellular signal strength and quality seen by a nearby sink. It may also transmit other data descriptive of the desirability of a potential connection, such as number of hops to a wireless sink and its own device state. Moreover, a sink (gateway node) may occasionally transmit a metric describing cellular signal strength and quality seen by the sink. It may also transmit other useful data, such as number of hops to a wireless sink and its own device state. Such information can help originating nodes find routes to sinks via relays in a distributed manner. The metrics could be transmitted via periodic beaconing (e.g. WiFi access points) or distributed beaconing (e.g. WiFi-Direct devices).

Figure 6:
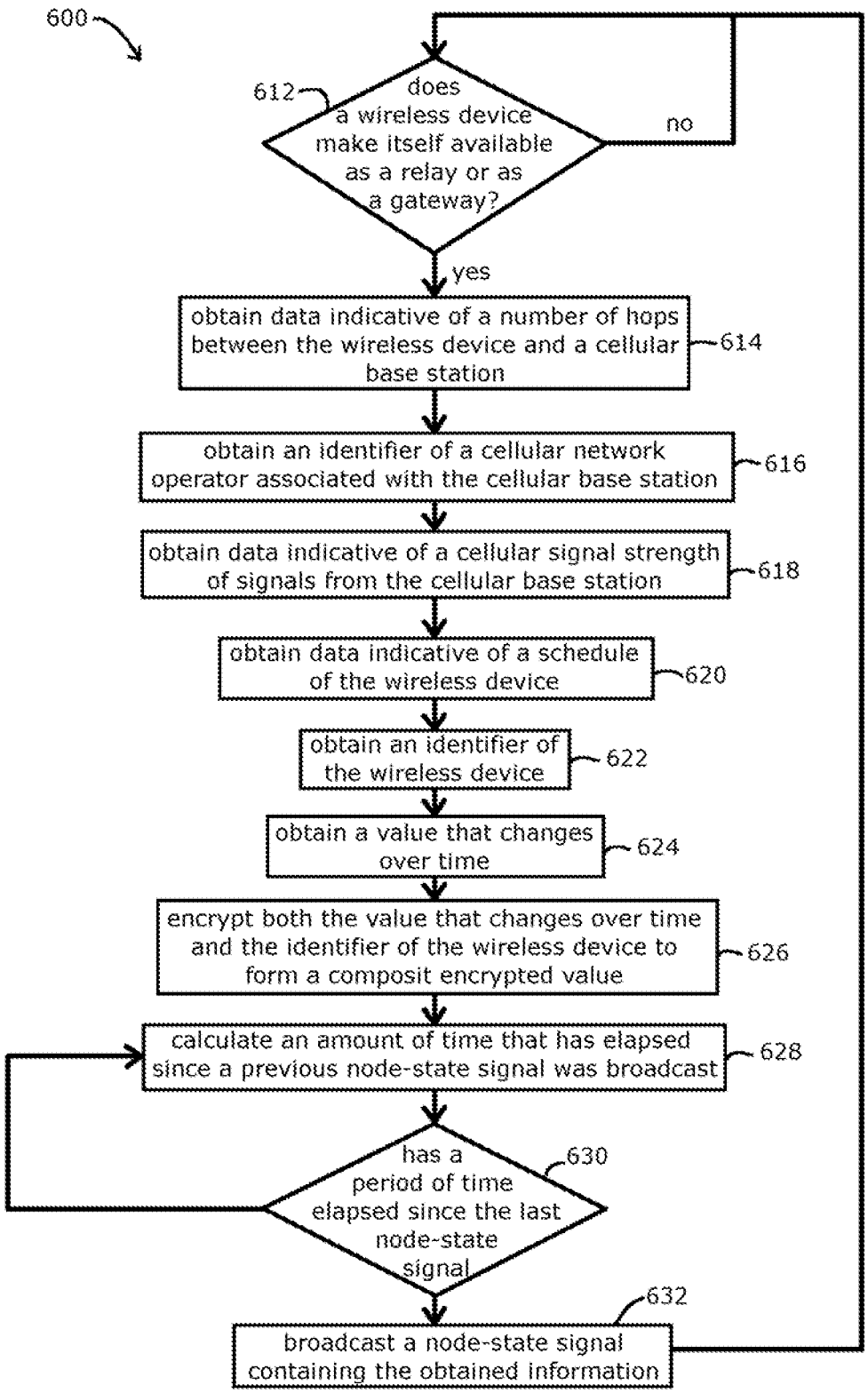
FIG. 6 is an example of a process for forming a node-state signal.
Figure 7A:
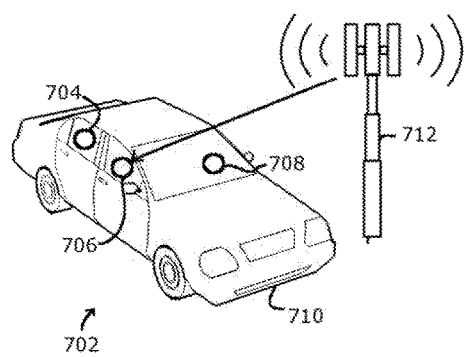
FIGS. 7A-D are exemplary scenarios of wireless usage.
Figure 7B:
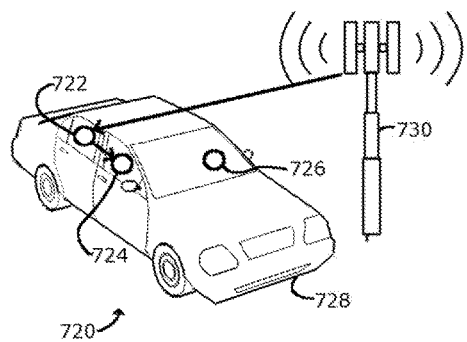
Figure 7C:
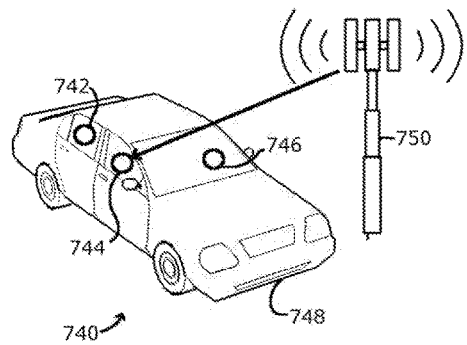
Figure 7D:
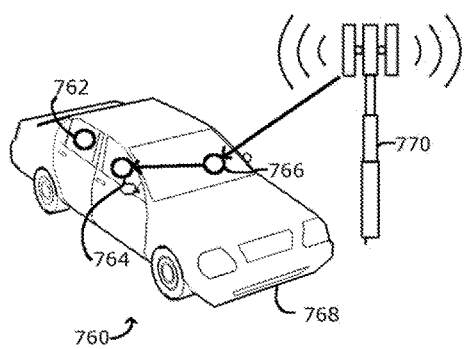

In some embodiments, under certain conditions, each wireless device may broadcast a node-state signal to alert other wireless devices within non-cellular signal range of attributes of the broadcasting wireless device and the wireless network topology sensed by the broadcasting wireless device. For example, process 600 of FIG. 6 is and embodiment of a process for forming and broadcasting an example of such a node-state signal.

As explained below, the node-state signal, in some embodiments, may be broadcast periodically, for example every 100 ms, or in response to a query from another device. The node-state signal may encode a variety of different types of information. For instance, the node-state signal may include a schedule-state signal (described below with reference to non-cellular scheduling techniques), a number of hops between the broadcasting wireless device and a cellular base station, an identifier of a cellular network operator that operates the cellular base station, e.g., a cellular carrier, and data indicative of a strength of cellular signals from the cellular base station at the broadcasting wireless device or at a gateway node through which the broadcasting wireless device is configured to form a multi-hop connection to the cellular base station. The node-state signal may also encode data indicative of cellular signal quality, e.g., a SINR, SNR, or CQI. Further, the node-state signal may encode a remaining battery life of wireless device. In some embodiments, the node-state signal may include the information described by the IEEE 802.11n specification as being conveyed by a beacon frame, or the node-state signal may be formatted as such a beacon frame with additional data. Further, the node-state signal may include a value that indicates the absolute power with which the node-state signal is transmitted, which may be used to calculate path losses, as described below. In some embodiments the node-state signal includes information about the location or movement of the wireless device, and the node-state signal may include a device type field that indicates, e.g., whether the wireless device is likely to be moved, as might occur with a cell phone, whether the wireless device is a laptop or other computer, for instance, whether the wireless device is powered or running on battery, whether the wireless device is usually carried by humans or not, whether the wireless device is currently being used by a human, e.g., based on a signal from a proximity sensor, whether the device is of a type that is usually used by a human being, e.g., a hand-held cellular device. The node-state signal may also include an indication of an amount of cellular bandwidth available for uplink or downlink communication with a cellular base station to the wireless device broadcasting the node-state signal or to a gateway node to which the wireless device may connect. Further, in some embodiments, the node-state signal may be configured to maintain privacy or anonymity of the operator of the wireless device, though not all embodiments include all of the above-listed features.

The process 600 may be performed by a wireless device, for example by the CPU of the wireless device through interaction with various other components of the wireless device, such as the non-cellular and cellular interfaces. Further, each wireless device, in some embodiments, within a hybrid multi-hop cellular non-cellular network may perform the process 600, thereby facilitating distributed hopping decisions, as explained below.

In this embodiment, the process 600 begins with the wireless device determining whether the wireless device performing the process 600 will make itself available for other wireless devices to hop off of, as illustrated by block 612, e.g., the wireless device may execute one of the processes described below for determining whether the wireless device will make itself available as an intermediate node and one of the processes described below for determining whether the wireless device will make itself available as a gateway node. In this embodiment, if the wireless device performing the process 600 determines that it will make itself available for other devices to hop off of, then in response, the process 600 proceeds to step 614. Otherwise, in response, the wireless device repeats determination step 612.

In this embodiment, next, the wireless device obtains data indicative of a number of hops between the wireless device and a cellular base station, as indicated by block 614. The data indicative of a number of hops may be a value of one, corresponding to a single hop to the cellular base station if the wireless device determines that it will act as a gateway node. Otherwise, the wireless device may receive a node-state signal from another wireless device, or a plurality of other wireless devices, making themselves available as intermediate nodes or gateway nodes, and the wireless device performing the process 600 may choose one of these wireless devices based on their node-state signals, e.g., using one of the route selection processes described below, and add one to a hop count conveyed by the node-state signal broadcast by the chosen intermediate node.

Next in the present embodiment, the wireless device may obtain an identifier of a cellular network operator associated with the cellular base station. The cellular network operator may, for example, be a cellular carrier or other entity that charges for access to its network through the cellular base station. If the wireless device performing the process 600 is acting as a gateway node, then the cellular network operator may be the operator of a cellular base station through which the wireless device will connect. Otherwise, the identifier of the cellular network operator may be obtained from a node-state signal received from a gateway node selected by the wireless device performing the process 600 (e.g., a gateway node selected by an upstream intermediate node).

Next, in this embodiment, the wireless device may obtain data indicative of a cellular signal strength of signals from the cellular base station at the wireless device performing the process 600, as indicated by block 618. Again, if the wireless device performing the process 600 determines that it will make itself available as a gateway node, then in response, the cellular signal strength may be a cellular signal strength observed through a cellular interface of the wireless device performing the process 600. Otherwise, the cellular signal strength may be a cellular signal strength observed by a gateway node chosen by the wireless device performing the process 600. As described below, the cellular signal strength may be characterized as an amplitude of a wireless signal or in a variety of other fashions, for example as a binary value indicating a high or low value.

Next, in the present embodiment, the wireless device may obtain data indicative of a schedule of the wireless device. The schedule may be one of the schedules described below for broadcasting on a non-cellular medium, such as an inter-frame spacing duration slot chosen by the wireless device performing the process 600. The data indicative of a schedule may also identify a schedule type, such as whether the schedule is deterministic or nondeterministic, as described further below, or an indication of the number of deterministic slots available within a given schedule. In some embodiments, the data indicative of a schedule may be the schedule-state signal described below with reference to scheduling processes for non-cellular transmissions.

The process 600 may also include a step of obtaining an identifier of the wireless device performing the process 600, as illustrated by block 622. The identifier may, for example, be a generally unique identifier associated with the wireless device by a cellular network operator, e.g., the identifier may be a MAC address, and IP address, or and identifier associated with the non-cellular interface of the wireless device performing the process 600, for example. Alternatively, or additionally, the identifier may be hardcoded or otherwise programmed into an integrated circuit or module by a maker of the non-cellular interface or other entity, for instance by blowing fuses on the integrated circuit or by setting registers in persistent memory, such as flash memory.

Next, in this embodiment of process 600, the wireless device may obtain a value that changes over time. As explained below, the value that changes over time may be combined with the identifier of the wireless device to conceal the identifier and protect the privacy of the user of the wireless device while permitting trusted parties to track that wireless device performing the process 600, though not all embodiments provide this benefit. The value that changes over time may be selected from a relatively large pool of values, for example more than 1000, more than 10,000, or more than 100,000 to impede brute force efforts to determine the identifier of the wireless device. In some embodiments, the value that changes over time may be the time from a clock of the wireless device or a pseudo-random value, such as a value generated with a linear shift register, or a value generated from noise perceived through the cellular or non-cellular interface of the wireless device. The value that changes over time may be a value that changes frequently, e.g., at least every second or every 100 microseconds, in order to impede tracking of the wireless device from one second to the next, or the value that changes over time may be a value that changes less frequently, e.g., such less frequently than once per minute, once per hour, or once per day, in order to facilitate short-term tracking by un-trusted parties, e.g., to provide a semi-persistent identifier for other devices hopping off of the wireless device, like many of the other features described herein, though not all embodiments include this feature.

Next in the present embodiment, the wireless device may encrypt both the value that changes over time and the identifier of the wireless device to form a composite encrypted value, as indicated by block 626. In some systems, encrypting both the value that changes over time and the wireless identifier together to form a single encrypted value, for example in encrypted output string, is expected to help conceal the identifier, as the encrypted value may change over time even if the identifier of the wireless device does not. However, it should be noted that the present technique is not limited to systems that provide this benefit. Various types of encryption may be used, for example, WEP, WPA, or WPA2 encryption.

In some embodiments, additional potentially sensitive information may be included in the encrypted composite value. For example, the wireless device may obtain data indicative of a location or estimate of the location of the wireless device, e.g., by querying a global-positioning system device of the wireless device or by triangulating position from cellular base stations, and the position information may be encrypted as well. Alternatively, the data indicative of location may be unencrypted.

The wireless device may then, in the present embodiment, calculate an amount of time that elapsed since a previous node-state signal was broadcast, as indicated by block 628, and determine whether a period of time has elapsed since the previous node-state signal was broadcast, as indicated by block 30. The period of time may be a predetermined period of time, for example every 100 ms, and in some embodiments, this predetermined period of time may be encoded in the node-state signal so that other wireless devices in a low-power or sleep mode will know when to wake up, or return to a higher-power consuming state, to receive node-state signals from the wireless device performing the process 600. In other embodiments, the period of time may change between broadcast. In this example, if the period of time has not elapsed, the process 600 returns to block 628 in response. Otherwise, in response, the present embodiment of process 600 proceeds to block 632.

In other embodiments for conveying data on a multi-hop communications network, a first communications device (e.g. a relay communications device) may receive, with a first communications interface (e.g. a WiFi™ interface, a Bluetooth™ interface, an IEEE 802.15.4 interface, a WiGig™ interface, an Ethernet™ interface, or a Power-Line Communications interface), a first node-state signal from a second communications device (e.g. a sink communications device). The communication interface may be a wired communication interface or a wireless communication interface. The step of receiving may further include entering a lower-power mode of operating the first communications device (e.g., turning off the receiver of the first communications interface, operating the first communications interface such that it consumes less than a threshold amount of power [e.g., less than or approximately equal to 5 mW, less than or approximately equal to 25 mW, less than or approximately equal to 100 mW, less than or approximately equal to 250 mW, less than or approximately equal to 500 mW], disabling circuitry [e.g., disabling one or more of the following: radio-frequency (RF) receive circuitry, RF transmit circuitry, power-amplifier (PA) circuitry, low-noise-amplifier (LNA) circuitry, automatic-gain-control (AGC) circuitry, envelope-tracking circuitry, duplexer receive circuitry, duplexer transmit circuitry, full-duplex receive circuitry, full-duplex transmit circuitry, analog-to-digital-converter (ADC) receive circuitry, ADC transmit circuitry, physical-layer (PHY-layer) receive circuitry, PHY-layer transmit circuitry, medium-access-control-layer (MAC-layer) receive circuitry, MAC-layer transmit circuitry, logical-link-control-layer (LLC-layer) receive circuitry, LLC-layer transmit circuitry, network-interface-{card,chip,package} (NIC) receive buffers, NIC transmit buffers, NIC driver/firmware, PHY-layer driver/firmware, MAC-layer driver/firmware, LLC-layer driver/firmware, network-layer driver/firmware, transport-layer driver/firmware, etc.] of the first communications interface) for a first duration of time (e.g., 1000 ms, 5000 ms, 20000 ms, 60000 ms). The step of receiving may further include entering a higher-power mode of operating the first communications device (e.g., turning on the receiver of the first communications interface) for a second duration of time (e.g., greater than or approximately equal to 50%, greater than or approximately equal to 75%, greater than or approximately equal to 100%, greater than or approximately equal to 125%, greater than or approximately equal to 150% of the node-state signal interval of the first node-state signal) that corresponds to a node-state signal interval (e.g. 100 ms, 250 ms, 500 ms, 1000 ms) of the first node-state signal. One or more node-state signals (e.g. the first node-state signal) may be received or (i.e., and/or) transmitted while the first communications device is operating in the higher-power mode. The step of receiving may further include entering the lower-power mode of operating the first communications device (e.g., turning off the receiver of the first communications interface, operating the first communications interface such that it consumes less than a threshold amount of power [e.g., less than or approximately equal to 5 mW, less than or approximately equal to 25 mW, less than or approximately equal to 100 mW, less than or approximately equal to 250 mW, less than or approximately equal to 500 mW], disabling circuitry [e.g., disabling one or more of the following: radio-frequency (RF) receive circuitry, RF transmit circuitry, power-amplifier (PA) circuitry, low-noise-amplifier (LNA) circuitry, automatic-gain-control (AGC) circuitry, envelope-tracking circuitry, duplexer receive circuitry, duplexer transmit circuitry, full-duplex receive circuitry, full-duplex transmit circuitry, analog-to-digital-converter (ADC) receive circuitry, ADC transmit circuitry, physical-layer (PHY-layer) receive circuitry, PHY-layer transmit circuitry, medium-access-control-layer (MAC-layer) receive circuitry, MAC-layer transmit circuitry, logical-link-control-layer (LLC-layer) receive circuitry, LLC-layer transmit circuitry, network-interface-{card,chip,package} (NIC) receive buffers, NIC transmit buffers, NIC driver/firmware, PHY-layer driver/firmware, MAC-layer driver/firmware, LLC-layer driver/firmware, network-layer driver/firmware, transport-layer driver/firmware, etc.] of the first communications interface) for a third duration of time (e.g. 1000 ms, 5000 ms, 20000 ms, 60000 ms).

In some embodiments, the first communications device (e.g. a relay communications device) may transmit, from a second communications interface (e.g., a WiFi™ interface, a Bluetooth™ interface, an IEEE 802.15.4 interface, a WiGig™ interface, an Ethernet™ interface, or a Power-Line Communications interface), a second node-state signal indicating the availability of the first communications device as a relay for other communications devices in the multi-hop communications network. The step of transmitting may further include entering a lower-power mode of operating the first communications device (e.g., turning off the receiver of the second communications interface, operating the second communications interface such that it consumes less than a threshold amount of power [e.g., less than or approximately equal to 5 mW, less than or approximately equal to 25 mW, less than or approximately equal to 100 mW, less than or approximately equal to 250 mW, less than or approximately equal to 500 mW], disabling circuitry [e.g., disabling one or more of the following: radio-frequency (RF) receive circuitry, RF transmit circuitry, power-amplifier (PA) circuitry, low-noise-amplifier (LNA) circuitry, automatic-gain-control (AGC) circuitry, envelope-tracking circuitry, duplexer receive circuitry, duplexer transmit circuitry, full-duplex receive circuitry, full-duplex transmit circuitry, analog-to-digital-converter (ADC) receive circuitry, ADC transmit circuitry, physical-layer (PHY-layer) receive circuitry, PHY-layer transmit circuitry, medium-access-control-layer (MAC-layer) receive circuitry, MAC-layer transmit circuitry, logical-link-control-layer (LLC-layer) receive circuitry, LLC-layer transmit circuitry, network-interface-{card,chip,package} (NIC) receive buffers, NIC transmit buffers, NIC driver/firmware, PHY-layer driver/firmware, MAC-layer driver/firmware, LLC-layer driver/firmware, network-layer driver/firmware, transport-layer driver/firmware, etc.] of the second communications interface) for a first duration of time (e.g., 90 ms, 200 ms, 480 ms, or 950 ms). The step of transmitting may further include entering a higher-power mode of operating the first communications device (e.g., turning on the receiver of the second communications interface) for a second duration of time (e.g. less than or approximately equal to 100%, less than or approximately equal to 75%, less than or approximately equal to 50%, less than or approximately equal to 25% of the node-state signal interval of the second node-state signal) that corresponds to a node-state signal interval (e.g., 100 ms, 250 ms, 500 ms, or 1000 ms) of the second node-state signal. One or more node-state signals (e.g. the second node-state signal) may be received or (i.e., and/or) transmitted while the first communications device is operating in the higher-power mode. The step of transmitting may further include entering the lower-power mode of operating the first communications device (e.g., turning off the receiver of the second communications interface, operating the second communications interface such that it consumes less than a threshold amount of power [e.g., less than or approximately equal to 5 mW, less than or approximately equal to 25 mW, less than or approximately equal to 100 mW, less than or approximately equal to 250 mW, less than or approximately equal to 500 mW], disabling circuitry [e.g., disabling one or more of the following: radio-frequency (RF) receive circuitry, RF transmit circuitry, power-amplifier (PA) circuitry, low-noise-amplifier (LNA) circuitry, automatic-gain-control (AGC) circuitry, envelope-tracking circuitry, duplexer receive circuitry, duplexer transmit circuitry, full-duplex receive circuitry, full-duplex transmit circuitry, analog-to-digital-converter (ADC) receive circuitry, ADC transmit circuitry, physical-layer (PHY-layer) receive circuitry, PHY-layer transmit circuitry, medium-access-control-layer (MAC-layer) receive circuitry, MAC-layer transmit circuitry, logical-link-control-layer (LLC-layer) receive circuitry, LLC-layer transmit circuitry, network-interface-{card,chip,package} (NIC) receive buffers, NIC transmit buffers, NIC driver/firmware, PHY-layer driver/firmware, MAC-layer driver/firmware, LLC-layer driver/firmware, network-layer driver/firmware, transport-layer driver/firmware, etc.] of the second communications interface) for a third duration of time (e.g., 90 ms, 200 ms, 480 ms, or 950 ms).

In some cases, the lower-power mode of operation may be defined relative to the higher-power mode of operation. For instance, in the lower-power mode of operation, the network interface may consume less than 50% of the (e.g., time averaged) power consumed in the higher-power mode of operation, less than 20% of the power consumed in the higher-power mode of operation, or less than 5% of the power consumed in the higher-power mode of operation, depending on the amount of features disabled in the lower-power mode.

Reducing power consumption is expected to facilitate more battery-sensitive use cases, for instance, in many Internet-of-things applications. Some conventional multi-hop systems remain in a higher-power mode of operation regardless of beaconing schedules, both on the receiving side and the transmitting side, thereby consuming relatively large amounts of power. Some embodiments may mitigate this effect by strategically entering lower-power modes of operation. Further, some embodiments may facilitate these lower-power modes of operation by embedding information about the quality of connection capabilities in beacons from relay nodes, using the techniques described in the parent applications referenced above. As described, other nodes may sleep, and for example, once a minute, scan for 100 ms to take inventory of connection capabilities of nearby nodes—signal strength, hop count, type of gateway, etc. These nodes taking inventory can thereby save power because the nodes do not need to listen all of the time for beacons. In some embodiments, relays can also sleep between beacons, as is also described in the parent applications. It should be emphasized that these techniques are useful both in wired and wireless networks and in hybrid and non-hybrid multi-hop mesh networks.

In this embodiment, the wireless device may broadcast a node-state signal containing the obtained information, as indicated by block 632. The node-state signal may be broadcast as a frame, for example as a beacon frame in accordance with the IEEE 802.11n specification. In other embodiments, the node-state signal may be transmitted to one or more specific receiving wireless devices. The node-state signal, in some embodiments, may include the encrypted composite value formed from the identifier of the wireless device and the value that changes over time, but in these embodiments, not the unencrypted version of the identifier of the wireless device. In certain embodiments, all of the obtained data may be encrypted a different subset of the obtained data may be encrypted.

In some embodiments, other wireless devices may receive the node-state signal broadcast or transmitted by the device performing the process 600, and the received information may be stored in memory of the receiving device or stored in a database for tracking the wireless device that transmitted the node-state signal. For instance, the receiving wireless device may be a gateway node or a WiFi access point, and the receiving wireless device may be configured to transmit the encrypted composite value and other node-state data to a tracking server, which may decrypt the composite value and store in memory, e.g., as associated entries in a database or as an object, the information from the node-state signal. The stored information may be retrieved from memory for a variety of purposes, e.g., to transmit targeted advertisements or offers to the user of the wireless device that performed the process 600 by selecting the decrypted identifier of the wireless device and associated user data from memory, such as demographic information like income or home address.

As was explained in the above, multi-hopping may expand the coverage and improve the capacity of a cellular network. To facilitate multi-hopping, in some embodiments, wireless devices may be capable of relatively efficiently and securely hopping off other nearby wireless. Some embodiments may be at least as secure as current single-hop cellular systems. Moreover, the latency for data transmission over multiple hops may be acceptable, where the definition of acceptable depends on the application. Lastly, in some embodiments, the power consumption overhead over multiple hops may be relatively low so that the gains in coverage and capacity due to multi-hopping are not outweighed by the power consumption overhead.

While some of the prior art describes several centralized approaches for multi-hop cellular, this prior art does not present a hybrid approach for multi-hop cellular, where hybrid, in this instance, means a mix of centralized control and decentralized freedom to relatively efficiently facilitate multi-hop cellular. While certain examples of the prior art try to solve the complexities of a centralized multi-hop cellular scheme, they fail to make their solutions scalable. Billions of cellular devices connect to the cellular networks across the world. In office complexes and college campuses there may be tens of thousands of cellular devices in a single cell. Unfortunately, a solution that is not scalable will not suffice in facilitating multi-hop cellular. Despite decades of research in multi-hop cellular by the telecom and wireless industry giants, the market does not offer multi-hop cellular. At this juncture, principles of the present inventions may provide a ray of hope by combining the centralized control of traditional cellular networks with decentralized hopping decisions of the wireless devices. It should be stressed, however, that the present techniques are not limited to systems that use a hybrid mix of centralized control and decentralized hopping decisions. Moreover, the present techniques are not limited to systems that provide the above-mentioned advantages.

In this document, wireless signal means any communication sent over the wireless medium, including data, voice, etc. In this document, the terms data, data frame, and wireless frame are used interchangeably.

A wireless interface implements protocols that facilitate wireless communication between two wireless terminals. At least one wireless interface resides inside each wireless terminal. A traditional cellular device (e.g. a cellular telephone) has at least a cellular interface. A cellular interface is a wireless interface that is being directly managed by a cellular network. Thus one or more base stations will be controlling the behavior of the cellular interface inside a cellular device. Using its cellular interface, a cellular device can communicate with a base station directly over a single-hop. In some systems, it may be possible to communicate over multiple hops by using only the cellular interface. However, in these systems, since by definition cellular interfaces are directly managed by the cellular network, the cellular network will have to compute the multi-hop route for each device. This approach is not expected to be very scalable and or be very efficient in facilitating multi-hop cellular. Nonetheless, embodiments of the present inventions can co-exist with cellular interfaces that communicate with the base station over a single-hop and over multiple hops.

From the above examples, it is apparent that, in some embodiments, a multi-hop cellular system that uses principles of the present inventions may classify wireless devices based on their operation and usage. Such classifications are indicated herein below to help the reader better understand the principles in use. It should be kept in mind, though, that single device may be classified as more than one type of device at the same time, e.g., a single device may simultaneously provide the functionality of more than one type of device. In some embodiments, a single device may also be classified as a different type of device at different times.

An originating node is a wireless device that communicates data (e.g., voice or multimedia data) indirectly with a base station via its non-cellular interface, where the data is either input or generated in the originating node, in the case of uplink data, or the data comes from the cellular network, in the case of downlink data. An originating node may send data for the cellular base station to another wireless device via the non-cellular interface of the originating node. In some embodiments, the originating node may also receive data for itself via its non-cellular interface.

An intermediate node is a wireless device that allows another wireless device to communicate with a cellular base station via the intermediate node. An intermediate node may receive data for the cellular base station from a first wireless device via a non-cellular interface of the intermediate node and relay the data to a second wireless device via the non-cellular interface of the intermediate node. An intermediate node, in some embodiments, may also receive data for the first wireless device via the non-cellular interface of the intermediate node and relay the data to the first wireless device via the non-cellular interface of the intermediate node.

A gateway node is a specific type of intermediate node: a wireless device that allows another wireless device to communicate to a cellular base station via itself, with the gateway node providing a direct connection to the cellular base station, i.e., signals exchanged between the gateway node and the cellular base station are not mediated through another intermediate node. In some instances, a gateway node may also operate as an intermediate node by sending a portion of the data to another gateway node, e.g., in parallel. A gateway node may receive data for the base station via the non-cellular interface of the gateway node and forward the data via the cellular interface of the gateway node. In some embodiments, a gateway node may also receive data for an originating node via the cellular interface of the gateway node and forward the data to the originating node or an intermediate node via the non-cellular interface of the gateway node.

In some embodiments, an originating node may communicate indirectly with a base station via the non-cellular interface of the originating node, rather than communicating directly via the cellular interface of the originating node, based on (e.g., in response to) battery life, bandwidth usage, type of device, level of mobility, time of day, subscription fees, user profile, non-cellular signal strength, cellular signal strength, level of wireless interference seen by non-cellular interface, and level of wireless interference seen by cellular interface. In some embodiments, an intermediate node may allow another wireless device to communicate to a base station via itself, e.g., it may operate as an intermediate node as described above, based on battery life, bandwidth usage, type of device, level of mobility, time of day, subscription fees, user profile, non-cellular signal strength, cellular signal strength, level of wireless interference seen by non-cellular interface, and level of wireless interference seen by cellular interface. And, in some embodiments, a gateway node may allow another wireless device to communicate to a base station via itself based on battery life, bandwidth usage, type of device, level of mobility, time of day, subscription fees, user profile, non-cellular signal strength, cellular signal strength, level of wireless interference seen by non-cellular interface, and level of wireless interference seen by cellular interface.

The criteria for allowing and disallowing could depend on a subset of the mentioned factors and the current state of the wireless device. Moreover, in some embodiments, the values of the various factors could be fixed depending on the subscription fees paid by the user or the owner of the wireless device. In some embodiments, this billing mechanism may facilitate an economical way of sharing the wireless channel, where those that require or prefer better wireless and system performance could pay more and get better performance. For example, a power user for whom the wireless device's battery life is critical or relatively important may never or rarely allow other wireless devices to hop onto his or her wireless device. However, the power user may want his or her wireless device to be able to hop onto other wireless devices to gain from the advantages of multi-hopping. Such a power user may pay more to receive this privilege as compared to users who do not need such a privilege. In this way, embodiments of the present inventions may facilitate an economic model for sharing wireless spectrum and cellular system resources in a multi-hop cellular setting.

In some embodiments, originating nodes may choose to communicate indirectly with a base station based on information received from the base station and other base stations, so that interference for wireless devices located near the cell-edge is mitigated and the performance of the cellular network is enhanced. Intermediate nodes may also decide whether to allow other wireless devices to communicate to a base station via themselves based on information received from the base station and other base stations, so that interference for wireless devices located near the cell-edge is mitigated and the performance of the cellular network is enhanced. Similarly, in some embodiments, gateway nodes may decide whether to allow other wireless devices to communicate to a base station via themselves based on information received from the base station and other base stations, so that interference for wireless devices located near the cell-edge is mitigated and the performance of the cellular network is enhanced.

In some systems, cellular base stations may collaborate with one another to manage interference at the edge of the cell. However, such methods are expected to force the cellular base stations to shuffle their resources around to mitigate interference. Principles of the present inventions, in some embodiments, provide these cellular base stations another way to manage the interference, though some of the present techniques may be used with cellular base stations that use centralized control to mitigate interference. If, for example, the cellular base stations detect that serving a wireless device at the edge of the cell may cause a tremendous amount of interference for other wireless devices near the same edge of the cell, e.g. the SINR may be less than 3 dB or the CQI may be less than 10, one of the base stations may communicate with the cellular interface of the concerned wireless device and request that wireless device to use its non-cellular interface to indirectly communicate with the cellular network. This approach is unique because the cellular network is requesting the wireless device to choose another route to the cellular network, though this is not the only reason the approach is unique, and other embodiments described herein are unique for other reasons. Thus, in some embodiments, with loose help from the base station, the wireless device is getting a chance to help mitigate the interference for other wireless devices located near the cell-edge and also help enhance the performance of the cellular network.

In another embodiment of the present inventions, a process may improve the performance of a wireless network. The exemplary process may include a first wireless device receiving support from a second wireless device and a third wireless base station. The third wireless base station may route traffic for the first wireless device via the second wireless device when beneficial, e.g., when the second wireless device sees an up-fade on the downlink channel from the base-station to the second wireless device, or when the first wireless device sees a down-fade on the downlink channel from the base-station to the first wireless device. Moreover, the first wireless device may route traffic for the third wireless base station via the second wireless device when beneficial. The third wireless base station, e.g., a cellular base station, may also request support from the second wireless device when communicating with the first wireless device. Furthermore, the first wireless device could request support from the second wireless device when communicating with the third wireless base station.

In the above described embodiment, the second wireless device may choose to provide support to the first wireless, e.g., act as an intermediate node, such as a gateway node, for the first wireless device, device based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, current state of the second device, current state of the first device, participation policy being used by the second wireless device, participation policy being used by the first wireless device, and surrounding wireless environment. For example, each of, or a subset of, these factors may be compared against respective threshold values or categories and if a factor satisfies the threshold or falls in a category, the device may choose to provide support to the first wireless device and if the threshold is not met or the category is inapplicable, the device may not choose to provide support to the first wireless device.

In the above embodiment, the first wireless device may request support from the second wireless device and the third wireless base station, and the cost of support to the user of the first wireless device may depend on at least one of the following: time, date, subscription fees, user profile, network conditions, network congestion, location, surrounding wireless environment, spot price, average price, nightly price, and monthly price. Adding the dimension of cost to requesting, granting, receiving, and giving support is expected to create economic incentives for wireless terminals to cooperate with each. Such cooperation may be useful for wireless terminals and wireless networks, though not all embodiments incorporate these incentives. For example, a subscriber paying higher subscription fees maybe request relatively frequent and heavy cooperation from nearby wireless terminals. For example, during peak hours, requesting and receiving support may have a high spot price. Also, during peak hours, granting and giving support may have a high reward associated with it. Such cost and reward information may be made available to users, wireless devices, wireless base stations, and wireless network operators in real-time.

FIGS. 7A through 7D are generalized diagrammatic views of an examples of a cell in a cellular network where wireless devices in the cell have the ability to cooperate with each other and the base station via multi-hopping in accordance with an embodiment of the present invention. In scenario 702 of FIG. 7A, wireless device 704 is seeing an upfade from the cellular tower 712 and wireless devices 706 and 708 are seeing a downfade from the cellular tower 712. An upfade happens when at a given instant in time and/or frequency, a receiver receives a transmitters signal at a high signal-to-interference-and-noise-ratio (SINR) or high signal-to-noise-ratio (SNR). A downfade happens when at a given instant in time, and/or frequency, a receiver receives a transmitters signal at a low signal-to-interference-and-noise-ratio (SINR) or low signal-to-noise-ratio (SNR). Without any cooperation between the wireless devices and the cellular tower, the only way for wireless device 706 to communicate with the cellular network is directly over a single hop. As shown in scenario 702, such a limitation could force devices to get a low data rate while using a given amount of wireless spectrum because of the downfade. In scenario 720 of FIG. 7B, wireless device 722 is seeing an upfade from the cellular tower 730 and wireless devices 724 and 726 are seeing a downfade from the cellular tower 730. If cellular tower 730 is capable of routing downlink traffic to wireless device 724 via wireless device 722, it could support a higher data rate using the same amount of spectrum as in scenario 702 because device 722 is experiencing an upfade from the cellular tower 730. In scenario 740 of FIG. 7C, wireless device 744 is seeing an upfade from the cellular tower 750 and wireless devices 742 and 746 are seeing a downfade from the cellular tower 750. Thus, in scenario 740, cellular tower 750 can directly send downlink traffic to wireless device 744 and could still support a higher data rate using the same amount of spectrum as in scenario 702. This is because device 744 is experiencing an upfade from the cellular tower 750. In scenario 760 of FIG. 7D, wireless device 766 is seeing an upfade from the cellular tower 770 and wireless devices 762 and 764 are seeing a downfade from the cellular tower 770. If cellular tower 770 is capable of routing downlink traffic to wireless device 764 via wireless device 766, it could support a higher data rate using the same amount of spectrum as in scenario 702 because device 766 is experiencing an upfade from the cellular tower 770. This example is one way in which wireless terminals and the wireless network can benefit if from the capability to receive support from each other. The data rate in scenarios 702, 720, 740, and 768 may be 1 Mbps, and the bandwidth may be 5 MHz.

Algorithmic support from different parts of the cellular network could be useful, in some systems, for single-hop and multi-hop cellular networks. Such support could facilitate cooperative routing, cooperative scheduling, reliability, and throughput enhancements. Algorithmic support could come from the base-transceiver-system (BTS), base station-controller (BSC), radio-network-controller (RNC), mobile-switching-center (MSC), and other wireless terminals. Such algorithmic support could enhance user experience and network performance by, for example, enabling several use-cases and applications. For example, the examples shown in FIGS. 7A-D could benefit from such routing algorithmic support from the cellular base station. Note that different wireless devices in FIGS. 7A-D may see severe upfades and downfades at different times and frequencies because of multi-path effects, shadowing effects, and mobility of the car. Billing support from MSC may be required to exercise different costs and rewards for receiving and granting support. Amount support received or granted could be based on subscription fees, user profiles, user preferences, and multi-hop participation policies. Algorithmic support and cooperation between wireless terminals could be induced/initiated/enabled by wireless devices, wireless base stations, wireless networks, and core networks.

Typically, users use the cellular network without knowing much about the current state of the cellular network. For example, there may be severe congestion in the cell of a cellular network and if user's cellular devices constantly keep trying to access the cellular network, the congestion may get worse. This may reduce performance for everyone. If wireless terminals have the capability of cooperating with each other the core network, wireless devices may be able to smartly access the cellular network to satisfy the needs of end-users, though this is not the only benefit to such cooperation, and not all embodiments engage in this form of cooperation. Embodiments may include application software that senses network state and network congestion using algorithmic support from nearby wireless terminals and the core network of the cellular operator. Moreover, the application software may collect users' requests to access the cellular network. Using the two pieces of information, the application software could then transmit and receive data from the network in a way that mitigates network congestion and yet does not appear unusable to the end users. For example, delay sensitive data such as voice could be exchanged with the cellular network without much delay. However, requests to download files and buffer video could be delayed to balance the congestion in the network and help the network operate in a stable state. Moreover, the delay in accessing the cellular network could be hidden from end-user by clever user-interface design, e.g., by buffering and transition animations. Moreover, such cooperation and coordination between wireless terminals and the cellular operator's core is expected to be good for overall network performance. Thus, the end-user is expected to see a gain in user experience and performance. The application software or hardware of the above embodiment could ask for multiple requests (e.g., requiring network access) at a time from the user and then opportunistically use the network using knowledge of macro and micro network environment. Such functionality could include providing of http data to a web browser being used by the user when such data becomes available at the convenience of the network. Algorithmic support, in some embodiments, from other wireless terminals and the networks operator's core network may simplify the design of the human interface of such an application and make it appear to the end-user as though the latency is low. Furthermore, network efficiency may increase and congestion may decrease as was explained above. This could especially be useful for wireless networks during times of peak usage and heavy congestion, though the technique is expected to provide other benefits, and not all embodiments provide this benefit. Network access that is be delayed by a significant amount may be particularly useful in some embodiments. For example, backing up of large databases could be delayed until nighttime when network congestion is low and enough network capacity is available.

Moreover, in some embodiments, the wireless device may make this decision independently without any, or with limited, assistance from the base stations. One such way of doing this is to analyze the signal strength from nearby base stations. If the signal strengths of the top (strongest) few base stations are nearly the same, the device may predict that excessive cell-edge interference is likely and may try to use its non-cellular interface to indirectly communicate with a nearby base station. Other ways of predicting and sensing cell-edge user interference in a distributed manner could use one of the following: signal strengths of nearby base stations, quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, surrounding wireless environment, history of throughput through various direct and indirect routes to the cellular network, and feedback from nearby wireless devices. Feedback from nearby wireless devices may be fed into distributed algorithms and protocols, which in some embodiments, may determine routing without global knowledge of the state of every wireless device on the cell or within a certain range. Moreover, in some systems, such feedback only provides indications to the device and the device is still able to make an independent hopping decision to mitigate cell-edge user interference. However, in certain systems, distributed approaches could also be overly cautious and suffer from false alarms. Thus, loose co-ordination with base stations may be useful in certain implementations even when wireless devices use their non-cellular interfaces to communicate with base stations; the principles of the present invention, in certain embodiments, accommodate such co-ordination to further enhance the coverage and the capacity of cellular networks.

Figure 8A:
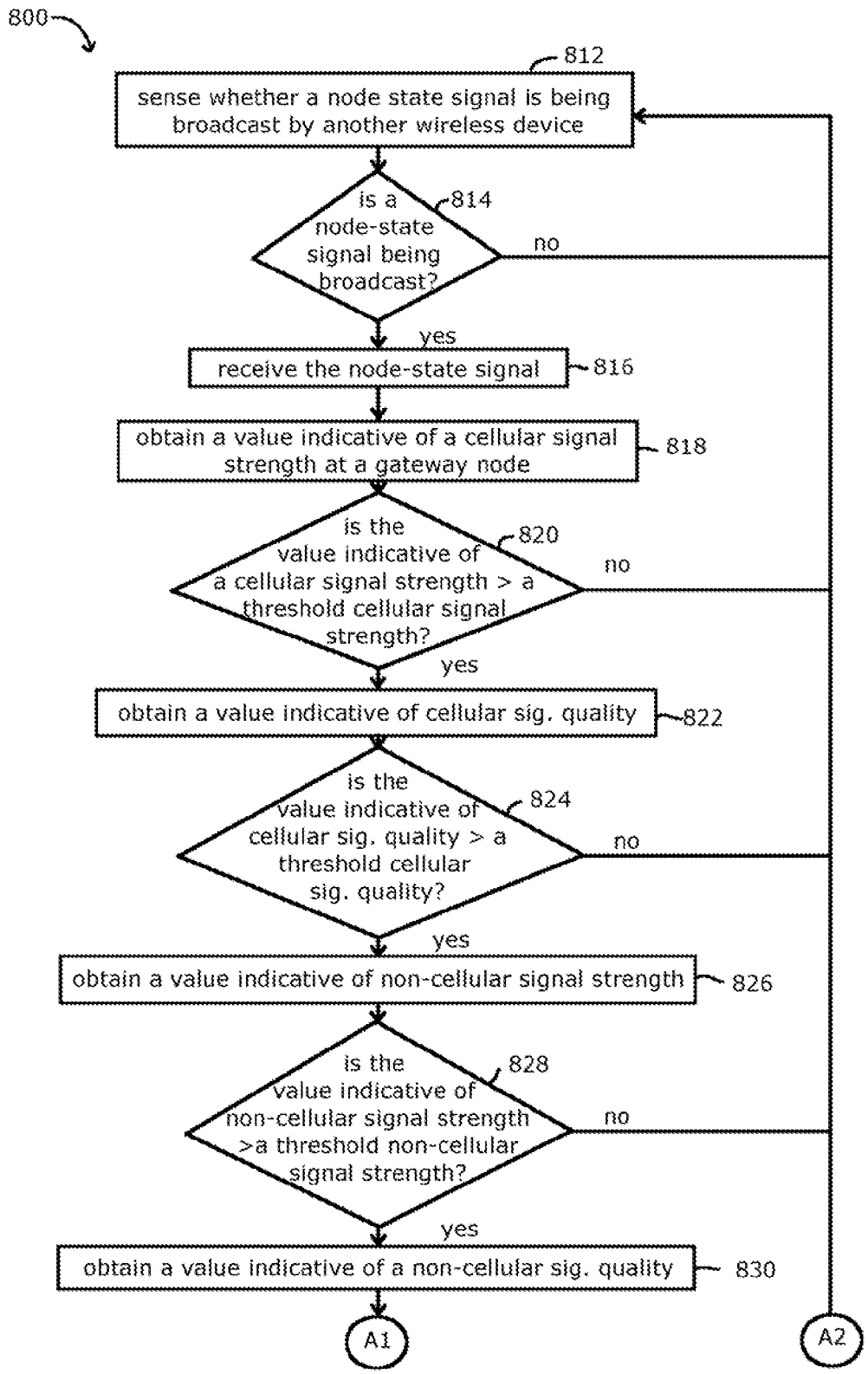
FIGS. 8A-C are an example of a process for selecting a role of a wireless device in a multi-hop network.
Figure 8B:
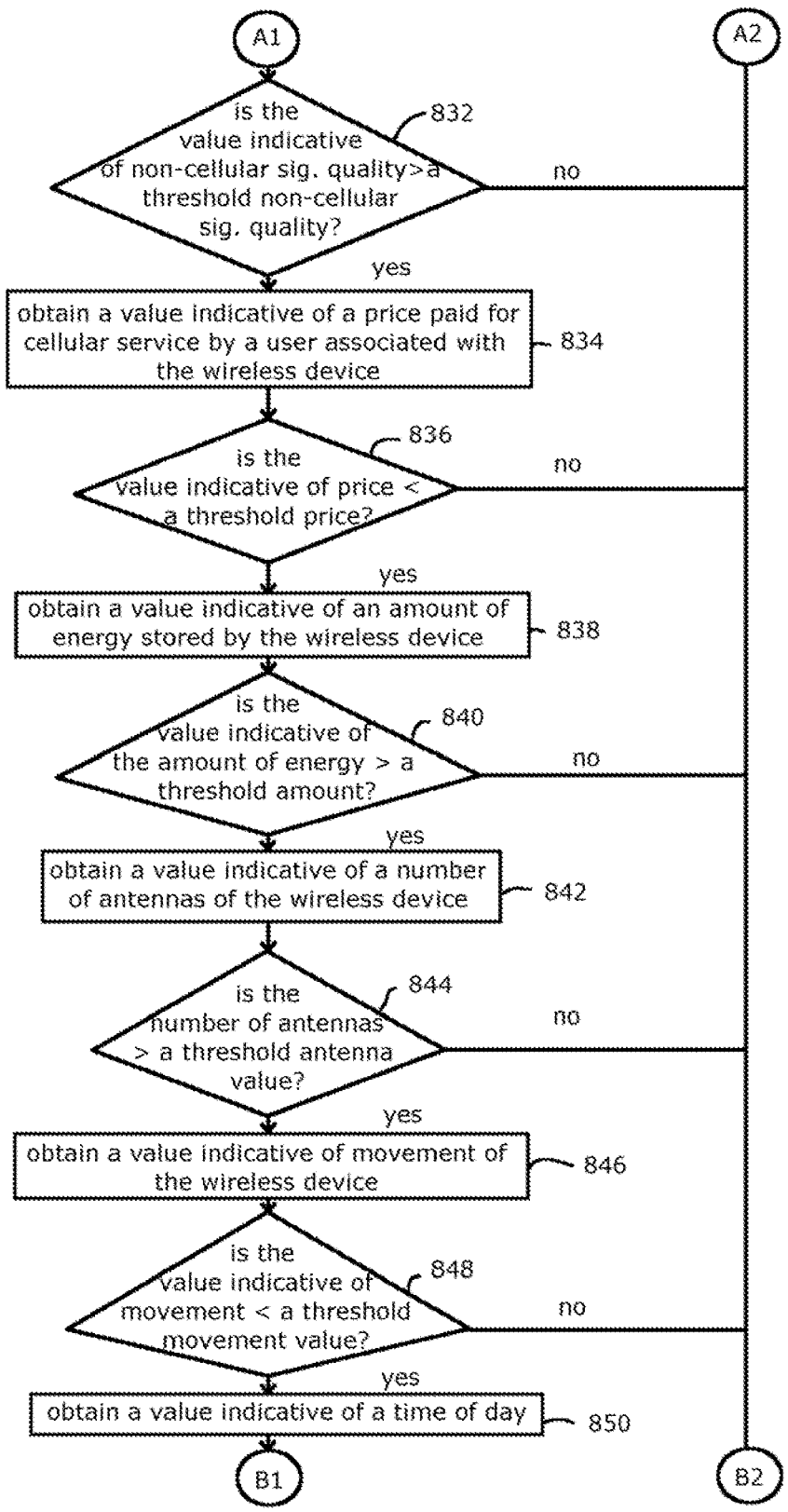
Figure 8C:
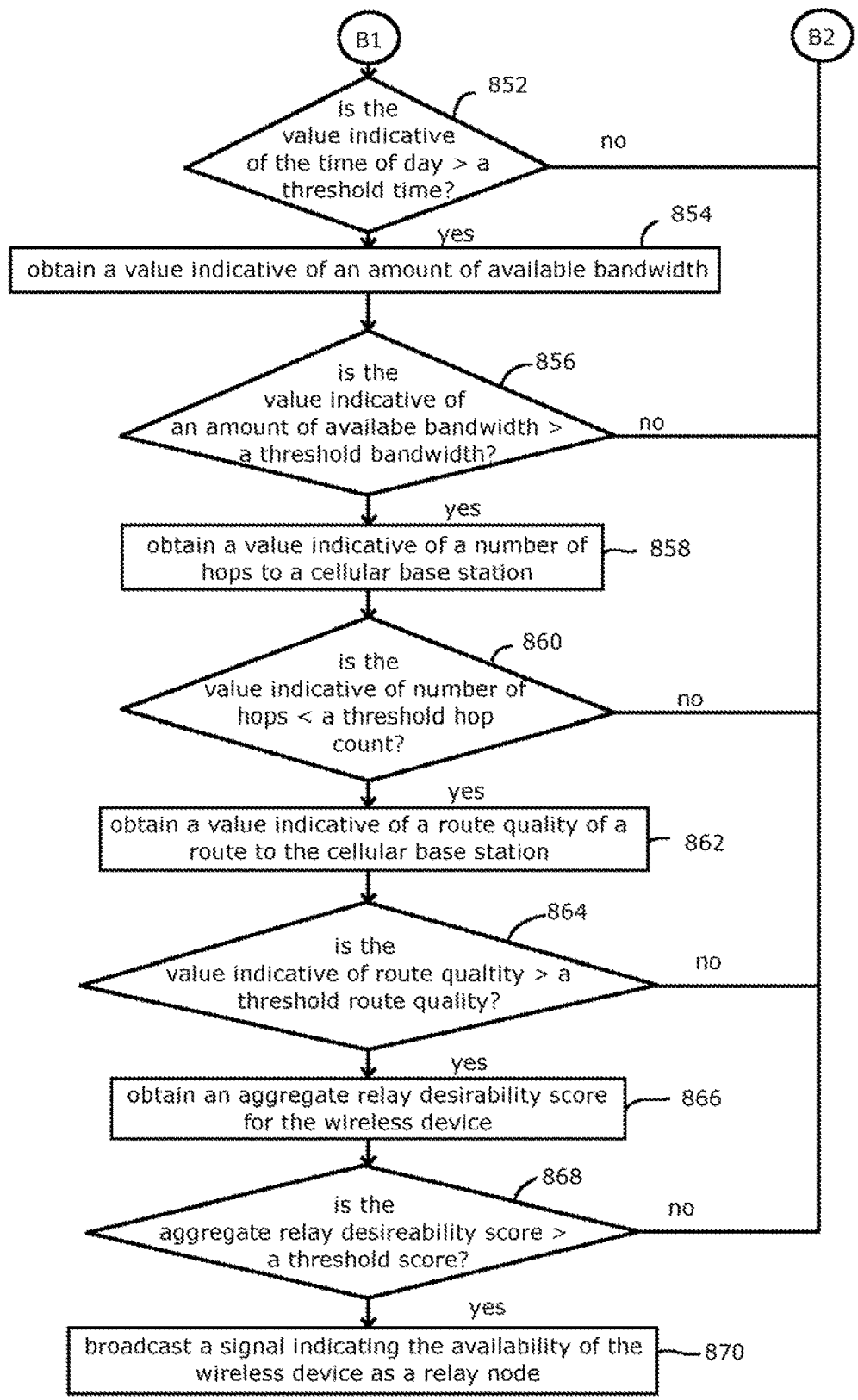

In certain embodiments, each wireless device in a hybrid cellular non-cellular multi-hop network may execute certain processes for selecting a role or roles that the wireless device will perform in the network. For example, FIG. 8 illustrates an example of a process 800 for determining whether a wireless device will operate as a relay node (e.g., as an intermediate node) in the multi-hop network. While the steps of this process and other processes discussed herein are addressed in a particular order, the presently described techniques are not limited to embodiments that perform these steps in that order, unless otherwise indicated.

The process 800, in the present embodiment, begins with a step of sensing whether a node-state signal is being broadcast by another wireless device, as illustrated by block 812. The node-state signal may be a signal that is broadcast by each wireless device in the multi-hop network, as described above.

Next, in the illustrated process 800, it is determined, e.g., by the wireless device performing the process 800, whether a node-state signal is being broadcast by another wireless device, as illustrated by block 814. If a node-state signal is not being broadcast, the process 800, in this embodiment, returns to block 812 in response. If a node-state signal is being broadcast, in response, the process 800 proceeds to receive the node-state signal, as illustrated by block 816. Receiving the node-state signal may include receiving the node-state signal through a non-cellular interface of the wireless device performing the process 800. In some embodiments, information encoded in or otherwise conveyed by the received node-state signal may be stored in memory of the wireless device performing the process 800. Receiving the node-state signal may also include sensing attributes of the node-state signal, including a signal strength of the node-state signal and a signal to noise ratio or signal to interference plus noise ratio of the node-state signal.

In this embodiment, the process 800 proceeds to a step of obtaining a value indicative of a cellular signal strength, as illustrated by block 818. Obtaining a value indicative of a cellular signal strength may include obtaining a value indicative of cellular signal strength of signals from a cellular base station at a gateway node, for instance a gateway node that broadcast the node-state signal received in step 816 or a gateway node through which the wireless device, e.g., an intermediate node, that broadcast the node-state signal is configured to connect to the cellular base station. The cellular signal strength may be an amplitude of signals received from the cellular base station, for example by an upstream the gateway node. In some embodiments, the amplitude may be an amplitude in the frequency domain, for instance in some systems using orthogonal frequency-division multiplexing (OFDM), or the signal strength may be an amplitude in the time domain, for instance in certain third-generation cellular networks. The gateway node that is measuring the cellular signal strength may sample the signal strength from, for instance, an entire frame of data, or based on cellular signals that encode a header, a preamble, or pilots of a frame. In some embodiments, the signal strength may be expressed as a received signal strength indication (RSSI), or the signal strength may be expressed as a received channel power indicator (RCPI), both as defined by the IEEE 802.11n specification. In certain embodiments, the cellular signal strength may be calculated by subtracting from a sensed amplitude of cellular signals a measure or estimate of the noise, for instance an estimate of ambient noise, or a measure of ambient noise as measured during a silent period on a channel in question.

Next, in the present embodiment of the process 800, it is determined, for instance by a wireless device, whether the value indicative of a cellular signal strength is greater than a threshold cellular signal strength, as illustrated by the block 820. If the cellular signal strength is not greater than the threshold cellular signal strength, then in response, the process 800 returns to block 812, in this embodiment. The threshold cellular signal strength may be, prior to a processes gain, −50 dBm or −113 dBm, for example, in a third-generation CDMA cellular network, or −100 dBm or zero dBm and a LTE cellular network. In some embodiments, the threshold cellular signal strength may be a function of a signal-to-noise ratio or signal to interference plus noise ratio of cellular signals, with a higher threshold used in response to higher a ratio. Certain embodiments may change the threshold in response to a time of day and a network usage profile associated with that time of day. For instance, the threshold may be elevated during times of heavy cellular network traffic. If the value indicative of cellular signal strength is less than the threshold cellular signal strength, then in response, the process 800 returns to block 812. Otherwise, the process 800 proceeds to the step labeled with reference number 822. In some embodiments, in addition to, or as an alternative to, the illustrated decision block 820, the cellular signal strength may be multiplied by a cellular signal strength coefficient, and this value may be added to other values described below to form an aggregate relay desirability score.

In this embodiment, the process 800 next includes a step of obtaining a value indicative of cellular signal quality, as illustrated in block 822. The cellular signal quality in question, in this embodiment, may be a channel quality indicator (CQI) or SINR or SNR as sensed by the wireless device performing the process 800 to select a role for itself. The cellular signal quality may be quantified by, for example, sensing signal strengths of signals from more than one cellular base station and subtracting the strongest signal strength from the next strongest signal strength. Some embodiments may quantify cellular signal quality as a signal to interference plus noise ratio, a channel quality indicator, or a ratio of energy per bit to noise per bit. Some embodiments may quantify cellular signal quality indirectly, for example, by measuring a rate of throughput of data signals between the wireless device performing the process 800 and a cellular base station. Certain embodiments may also measure cellular signal quality from sources other than cellular base stations, such as interference from other wireless handsets. For instance, some systems configured for an LTE cellular network may use similar techniques to those described above for measuring interference from cellular base stations to measure interference from other handsets. Some embodiments may estimate the amount of cellular signal quality by counting the number of cellular towers from which signals are received. The signals from the various cellular base stations may be sensed through a cellular interface of the wireless device performing the process 800.

After obtaining a value indicative of cellular signal quality, in this embodiment, the process 800 proceeds to step 824, in which it is determined whether the value indicative of cellular signal quality is greater than a threshold cellular signal quality. In some embodiments, the threshold cellular signal quality may be 0 dB to 30 dB, including a processing gain, or −20 dB to 20 dB, as measured without a processing gain. As with the threshold cellular signal strength, the threshold cellular signal quality may be changed based on other parameters. For instance, the threshold cellular signal quality may be increased based on a time of day and a network usage profile such that the threshold cellular signal quality is increased during times when network traffic is typically heavy. In another example, the threshold cellular signal quality may be modulated based on an amount of uncertainty concerning the value indicative of cellular signal quality, with a higher amount of uncertainty corresponding to a higher threshold cellular signal quality. If the value indicative of cellular signal quality is not greater than the threshold cellular signal quality, the process 800 returns to block number 812. Otherwise, the process 800 continues to block number 826. In some embodiments, in addition to, or as an alternative to the decision block 824, the value indicative of cellular signal quality may be multiplied by a cellular signal quality coefficient and added to the above mentioned aggregate relay desirability score.

Next, the illustrated process 800 includes a step of obtaining a value indicative of a non-cellular signal strength, as illustrated by block 826. The non-cellular signal strength, in this embodiment, is the strength of non-cellular signals from other wireless devices received at the wireless device performing the process 800. For example, the strength of non-cellular signals may be quantified based on the strength of a node-state signal received from another wireless device. The non-cellular signals may be signals transmitted according to any of the above-mentioned non-cellular signal protocols, including any of the IEEE 802.11 protocols. In some embodiments, the non-cellular signal strength is quantified as an RSSI or an RCPI value. Some embodiments of process 800 may include a step of subtracting an estimate or a measurement of non-cellular noise or interference from the measured non-cellular signal strength to form an adjusted non-cellular signal strength value. The non-cellular signal strength may, for example, be quantified as an amplitude measured based on a node-state signal or other beacon or a data frame from other wireless devices. (As noted above, the node-state signal may include a value that indicates the power with which the node-state signal is transmitted, and in some embodiments, the value indicative of a non-cellular signal strength may be divided by this value to determine a path loss value, which may be compared against a path loss threshold to determine whether the process 800 returns to block 812 or continues as illustrated.) In instances in which the wireless device performing the process 800 measures the non-cellular signal strength of multiple wireless devices, the wireless device may compare the non-cellular signal strengths and select the strongest signal as the value indicative of non-cellular signal strength.

Next, in the illustrated embodiment of process 800, the wireless device performing the process 800 determines whether the value indicative of a non-cellular signal strength is greater than a threshold non-cellular signal strength, as illustrated by block 828. This determination 828 may include comparing to a threshold non-cellular signal strength of −30 dBm and −96 dBm, for example in systems employing one of the IEEE 802.11 protocols. Alternatively, or additionally, the value indicative of non-cellular signal strength may be multiplied by a non-cellular signal strength coefficient, which may be empirically determined or determined based on modeling, and this value may be added to the above mentioned aggregate relay desirability score. If the value indicative of the non-cellular signal strength is not greater than the threshold non-cellular signal strength, then in response, the process 800 returns to block 812. Otherwise, in response, the process 800 proceeds to block 830.

In block 830 of the present embodiment of process 800, a value indicative of a non-cellular signal quality is obtained. In some embodiments, the value indicative of non-cellular signal quality may be quantified as an RSSI value, a signal-to-noise ratio, a signal to interference plus noise ratio, or an RCPI value, for example. In other embodiments, the value indicative of non-cellular interference may be a count of wireless devices transmitting on a particular channel or channels that overlap with a particular channel. The non-cellular signal quality may be measured from node-state signals or other signals, e.g., beacon frames, data frames, or other transmissions received via the non-cellular interface of the wireless device performing the process 800. In systems employing some of the deterministic or partially deterministic inter-frame spacing techniques described below, non-cellular interference may be quantified via measuring the number of inter-frame spacing duration slots in use or that are available.

Next, in the present embodiment, it is determined whether the value indicative of a non-cellular signal quality is greater than a threshold non-cellular signal quality, as indicated by block 832. The threshold non-cellular signal quality may be a ratio or an indicator (e.g., CQI or SINR), for example a SINR of 0 dB to 30 dB, including process gains, for example, in the case of non-cellular systems employing one of the IEEE 802.11 protocols and a 64 QAM encoding. Systems with a more aggressive encoding, such as 256 QAM, in some embodiments, may have a threshold non-cellular interference of 0 to 40 dB. In some embodiments, the threshold non-cellular interference may be modulated based on a degree of confidence for the measured non-cellular interference, with a lower degree of confidence corresponding to a higher threshold non-cellular interference. If the value indicative of a non-cellular signal quality is less than the threshold non-cellular signal quality, then the process 800 returns to block 812. Otherwise, the process 800 proceeds to block 834. Alternatively, or additionally, the value indicative of non-cellular signal quality may be multiplied by a non-cellular signal quality coefficient, with the appropriate coefficient being empirically determined or determined, based on modeling, and this value may be added to the above mentioned aggregate relay desirability score.

In some embodiments, the process 800 may include a step of obtaining a value indicative of a price for cellular service paid by a user associated with the wireless device performing the process 800, as indicated by block 834. The value indicative of the price for cellular service may indicate, for example, an amount that the user of the wireless device performing the process 800 has promised to pay a cellular network operator or other attributes of the user's relationship with the cellular network operator, for instance whether the user is a long-term customer or entitled to a higher level of service for some other reason. The value indicative of price may be obtained from a cellular network based on a SIM card associated with the wireless device or other identifier of the wireless device stored in memory of the wireless device. In some embodiments, the wireless device may query the cellular network in real-time (e.g., approximately concurrent with performing the present step) to identify a value indicative of price paid.

Next in the illustrated embodiment of process 800, the wireless device determines whether the value indicative of a price for cellular service paid by a user associated with the wireless device is less than a threshold price, as illustrated by block 836. In other embodiments, the wireless device may determine whether the price is greater than a threshold price. The threshold price may be modulated based on a variety of factors. For instance, the threshold price may be decreased in response to a relatively low battery level of the wireless device performing the process 800, e.g., less than 20% battery capacity remaining, or the threshold price may be modulated based on a time of day and usage history stored in memory of the wireless device, e.g., the threshold price may be raised if it is early in the afternoon and previous usage of the device indicates that the wireless device is likely to be used extensively at later in the evening. If the value indicative of a price paid for cellular service is greater than the threshold price, in response, the process 800 returns to block 812. Otherwise, in response, in this embodiment, the process 800 proceeds to block 838. Alternatively, or additionally, the value indicative of a price paid for cellular service may be multiplied by a price coefficient, with the appropriate coefficient being empirically determined or determined based on modeling, and this value may be added to the above mentioned aggregate relay desirability score.

In other embodiments, the wireless device performing the process 800 may obtain from another wireless device a value indicating a price that another user is willing to pay to hop off the wireless device performing the process 800. This received payment offer may be compared against a threshold payment price, and if the payment offer exceeds the threshold payment price, in response, the process 800 may proceed as illustrated to block 838, or if the threshold payment price is not exceeded, in response, the process 800 may return to block 812. In some embodiments, a user of the wireless device performing the process 800 may enter a threshold price or parameters that are used to set a threshold payment price. For instance, the user may indicate that the threshold payment price should have a certain value depending on the time of day and amount of battery power remaining in the wireless device performing the process 800.

In this embodiment, the process 800 proceeds to a step of obtaining a value indicative of an amount of energy stored by the wireless device performing the process 800, as indicated by block 838. The value indicative of an amount of energy, in some embodiments, may be a value indicative of an amount of battery storage capacity that remains unexhausted, for instance, a percentage of battery life remaining or a value indicating the amount of time the wireless device can continue to operate on the existing amount of stored energy and the current usage pattern, or the value may be, or correspond to, an absolute amount of energy stored. In other embodiments, the value may be indicative of an amount of fluid remaining in a reservoir, for instance and amount of hydrogen or methane for use in a fuel cell. This value indicative of an amount of energy, in some embodiments, may be obtained by querying the operating system of the wireless device.

Next in the present embodiment, as illustrated by block 840, the wireless device performing the process 800 determines whether the value indicative of an amount of energy stored exceeds a threshold amount of energy. The threshold amount of energy stored may, in some embodiments, be modulated based on a variety of factors. For instance, the threshold amount of energy may be adjusted based on the time of day and a profile of previous usage stored in memory of the wireless device performing the process 800, with the threshold amount of energy being adjusted based on an integration over the remaining portion of the day of the profile of previous usage stored in memory. For instance, if the profile of previous usage and time of day indicate that the wireless device is likely to be operated extensively before being charged again, then the threshold amount of energy may be raised, and vice versa. The profile may include an average amount of usage for each hour of the day over a certain period, for example over the previous week, and may indicate the times at which the wireless device was charged during this period. In this embodiment, if the value indicative of an amount of energy stored is less than the threshold energy amount, in response, the process 800 returns to block 812. Otherwise, in response, in the present embodiment, the process 800 proceeds to block 842. Alternatively, or additionally, the value indicative of an amount of energy stored be multiplied by an energy storage coefficient, with the appropriate coefficient being empirically determined or determined based on modeling, and this value may be added to the above mentioned aggregate relay desirability score.

Next in the illustrated embodiment of the process 800, a value indicative of a number of antennas of the wireless device performing the process 800 is obtained, as illustrated by block 842. In some embodiments, the value may be a binary value indicating whether the wireless device is configured for multiple input multiple output (MIMO). In other embodiments, the value may be a number of antennas for input duplex, output duplex, or input and output of non-cellular signals. The value indicative of the number of antennas may, for example, be stored in a register or other configuration setting accessible through the OS of the wireless device. The number of antennas may be the number of antennas connected to a cellular interface, a non-cellular interface, or both of the wireless device performing the process 800.

Next in the illustrated embodiment of the process 800, the value indicative of a number of antennas is compared against a threshold antenna value, as illustrated by block 844. The threshold antenna value may be a number of antennas from 1 to 8, for example. It is expected that more antennas will provide for better connections with other devices, as the additional antennas can be used, for example, for assessing with higher accuracy than systems with fewer antennas the wireless direction and wireless distance of received signals, which in some embodiments, provides information that can affect the confidence ascribed to measures of interference and can be used to estimate the topology of the network. In this embodiment, if the value indicative of the number of antennas is less than the threshold antenna value, in response, the process 800 returns to block 812. Otherwise, in response, the process 800 proceeds to block number 846. Alternatively, or additionally, the value indicative of the number of antennas may be multiplied by an antenna coefficient, with the appropriate coefficient being empirically determined or determined based on modeling, and this value may be added to the above mentioned aggregate relay desirability score. In other embodiments, the steps 842 and 844 are performed less often, for example during a boot process of the wireless device, and the process 800 is only performed if the value indicative of the number of antennas exceeds a threshold antenna value.

Next in the presently described embodiment of process 800, the wireless device obtains a value indicative of movement of the wireless device performing the process 800, as illustrated by block 846. Movement may be sensed through a variety of mechanisms. For example, movement may be sensed through components of the wireless device configured to detect position and changes in position through the global positioning system. In another example, movement may be detected by triangulating the position of the wireless device and changes in the position of the wireless device through cellular or non-cellular signals from a plurality, e.g. three or more, sources of such signals through the cellular or non-cellular interface of the wireless device. In another example, movement of the wireless device may be detected by calculating a Doppler shift of wireless signals received by the wireless device. In some embodiments, movement may be detected through an accelerometer coupled to the wireless device, for example by integrating a signal from the accelerometer to estimate velocity. In some embodiments, movement is measured relative to a fixed reference point, for example one or more cellular base stations. Additionally, or in the alternative, movement may be quantified relative to potentially movable reference points, for example relative to other wireless devices that may hop onto the wireless device performing the process 800 or that the wireless device performing the process 800 may itself hop onto.

In this embodiment, the wireless device may next determine whether the value indicative of movement is less than a threshold movement value, as illustrated by block 848. In other embodiments, the wireless device may determine whether the value indicative of movement is greater than the threshold movement value. The threshold movement may be a value of low movement or high movement or an objective value, such as less than 10 miles per hour or less than 30 miles per hour. In some embodiments, the threshold movement may be expressed as a rate of change in topology that is quantified as either slow or fast or objectively, e.g., as less than one or two wireless devices coming or leaving the wireless range of the device per minute. If the value indicative of movement of the wireless device is greater than the threshold movement value, then in response the process 800 returns to block 812. Otherwise, in this embodiment, in response, the process 800 proceeds to block 850. Alternatively, or additionally, the value indicative of movement of the wireless device may be multiplied by a movement coefficient, with the appropriate coefficient being empirically determined or determined based on modeling, and this value may be added to the above mentioned aggregate relay desirability score.

Next in the presently described embodiment of process 800, the wireless device obtains a value indicative of the time of day, as illustrated by block 850. In some embodiments, the value indicative of the time of day could be the time of day on a 24 hour clock. In other embodiments, the value indicative of the time of day may indicate the time relative to a usage profile pattern stored in memory of the wireless device. For example, the usage profile pattern stored in memory may indicate the average time of day or times of day during which the wireless device is charged and the average usage for each period, for example during each hour, of other portions of the day. In this example, the usage profile pattern stored in memory may indicate that the wireless device is typically charged between 9 PM and 7 AM and that 70% of the devices typical daily usage occurs between 6 PM and 9 PM. In response to this profile, and an indication that the current time of day is 6 PM, the value indicative of the time of day may indicate a predicted amount of power usage or network traffic expected to occur prior to the next charging session.

Next in this embodiment, the wireless device determines whether the value indicative of the time of day is greater than a threshold time, as indicated by block 852. In other embodiments, the wireless device may determine whether the time of day is less than a threshold time. The threshold time may be modified based on other factors. For example, if the value indicative of time of day indicates that a substantial amount of usage is expected, the threshold time may be relatively high and may be adjusted based on the amount of energy stored by the wireless device. If the value indicative of the time of day is less than the threshold time, in this embodiment, the process 800 returns to block 812 in response. Otherwise, in response, the process 800 proceeds to step 854. Alternatively, or additionally, the value indicative of the time of day may be multiplied by a time coefficient, with the appropriate coefficient being empirically determined or determined based on modeling, and this value may be added to the above mentioned aggregate relay desirability score.

In step 854, in this embodiment, the wireless device obtains a value indicative of an amount of available bandwidth. In some embodiments, this value indicative of an amount of available bandwidth may be empirically determined by sending and receiving data. In some embodiments, two values may be obtained, one for uplink available bandwidth, and one for downlink available bandwidth, and each value may be compared against a separate threshold in the following step. The amount of available bandwidth, in the present embodiment, may be the amount of available cellular bandwidth, though other embodiments may additionally or alternatively obtain a value indicative of an amount of non-cellular available bandwidth. In some embodiments, the amount of available bandwidth may be determined by a cellular base station and this value may be transmitted to the wireless device. In embodiments in which the wireless device performing the process 800 is connecting to the cellular base station through a gateway node, the value indicative of an amount of available bandwidth may be a value indicative of an amount of available bandwidth to the gateway node with the cellular base station. The amount of available bandwidth may also be quantified as an amount of available spectrum or other orthogonal attribute of a wireless protocol.

Next in this embodiment of the process 800, the wireless device determines whether the value indicative of the amount of available bandwidth is greater than a threshold bandwidth amount, as indicated by block 856. The threshold bandwidth amount may be expressed in absolute terms, for example from 0 Mb per second to 100 Mb per second, or the threshold bandwidth amount may be expressed as a percentage of the maximum amount of potentially available bandwidth, for example from 0% to 100%, or greater than 20%, greater than 40%, or greater than 60%. The threshold bandwidth amount may be modulated based on other factors. For instance, other potentially originating node wireless devices may broadcast a signal indicating a needed amount of bandwidth, and the threshold bandwidth amount may be adjusted based on, for example to match, the indicated needed amount of bandwidth. In some embodiments, the wireless device performing the process 800 may broadcast an amount of bandwidth available, for example as part of a node-state signal. The reliability of the value indicative of the amount of bandwidth available may also factor into the threshold and with amount. For example if the reliability as low, for example due to a relatively small amount of sampling of the amount of available bandwidth, e.g., less than a single frame of data, the threshold bandwidth amount may be raised. In this embodiment, if the value indicative of the amount of available bandwidth is less than the threshold bandwidth amount, the process 800 returns to block 812 in response. Otherwise, in response, the process 800 proceeds to block 858. Alternatively, or additionally, the value indicative of the amount of available bandwidth may be multiplied by a bandwidth coefficient, with the appropriate coefficient being empirically determined or determined based on modeling, and this value may be added to the above mentioned aggregate relay desirability score.

Next, in the present example of process 800, the wireless device obtains a value indicative of a number of hops to a cellular base station from the wireless device, as indicated by block 858. The number of hops may be one if the wireless device is a gateway node or maybe two or higher if the wireless device hops onto a gateway node directly or indirectly. For example, the wireless device may first determined whether it will act as a gateway node, indicating that it has a hop count of one, as described below. If the wireless device determines that it will not act as a gateway node, then the wireless device may look to data encoded in signals received from other wireless devices. The value indicative of the number of hops may be determined based on, in part, a node-state signal received from another wireless devices that the wireless device performing the process 800 may hop off of. For example, if another wireless device closer to a gateway node broadcasts a node-state signal indicating that the closer wireless device has a single hop to the gateway node, the wireless device performing the process 800 may add one to the received number, resulting in a value of three hops to the cellular base station.

Next in this embodiment of process 800, the wireless device may determine whether the value indicative of a number of hops is less than a threshold hop value, as indicated by block 860. If the value indicative of the number of hops is greater than the threshold value, then in response, the wireless device may return to block 812 of process 800. Otherwise, in response, the wireless device may proceed to block 862. Alternatively, or additionally, the value indicative of the number of hops may be multiplied by a hop-count coefficient, with the appropriate coefficient being empirically determined or determined based on modeling, and this value may be added to the above mentioned aggregate relay desirability score.

Next, in this embodiment, the wireless device may obtain a value indicative of a route quality to the cellular base station, as indicated by block 862. The value indicative of route quality may be a weighted metric that includes average throughput, average latency, average jitter, available bandwidth, number of hopping devices, number of hops to the base station, and alternative routes to the base station. The signs of the coefficients for the weighted metric may tend to cause the route quality to decrease in response to an increase in average latency, average jitter, and the number of hops to the base station. The average throughput may be measured empirically, for example, by broadcasting and receiving test data or other data between the wireless device and the cellular base station. In some embodiments, the average latency may be determined by sending a management frame that pings, e.g., requests an acknowledgement of receipt from, the cellular base station and measuring the round-trip time. The average jitter may be determined, for example, by transmitting a plurality of management frames that ping the cellular base station, and measuring a variation, e.g., a max minus min, or standard deviation, in the round-trip time. The number of hopping devices may be determined, for example, based on a count of other wireless devices that have currently selected the wireless device performing the process 800 to hop off of. The number of hops to the base station may be the value obtained in step 845. The alternative routes to the base station may be a measure of how many backup routes are available to the cellular base station and a measure of the quality of those backup routes. The quality of those backup routes may be obtained based on a node-state signal broadcast by wireless devices that the wireless device performing the process 800 may hop off of a may be determined in the same manner as the presently described step 862.

Next in the present embodiment of process 800, the wireless device determines whether the value indicative of route quality is greater than a threshold route quality, as indicated by block 864. If the value indicative of route quality is less than the threshold route quality, then in response, the process 800 returns to block 812. Otherwise, in response, the process 800 proceeds to block 866. Alternatively, or additionally, the value indicative of route quality may be multiplied by a route-quality coefficient, with the appropriate coefficient being empirically determined or determined based on modeling, and this value may be added to the above mentioned aggregate relay desirability score.

In some embodiments, the wireless device may obtain and aggregate relay desirability score for the wireless device, as indicated by block 866, and as described above. The wireless device may determine whether the aggregate relay desirability score is greater than a threshold score, as indicated by block 868. If the aggregate relay desirability score is less than the threshold score, the process 800 may return to block 812 in response. Otherwise, in response, the process 800 proceeds to block 870. In some embodiments, the aggregate relay desirability score may indicate an overall suitability of the wireless device for acting as a relay node. For example, the wireless device performing the process 800 may reach step 868 by barely exceeding several of the above-mentioned threshold values, in which case, the aggregate relay desirability score would still be relatively low, indicating that the wireless device is less suitable to act as a relay than other wireless devices with a higher aggregate relay desirability score.

In the present embodiment of process 800, the wireless device may next broadcast a signal indicating the availability of the wireless device as a relay node, as indicated by block 870. The signal may be broadcast as a node-state signal, such as the node-state signals described above. In other embodiments, the wireless device performing the process 800 may sense whether another wireless device is broadcasting or transmitting a request to hop off of the wireless device performing the process 800, in which case, in certain embodiments, the wireless device performing the process 800 may receive data from the originating node on a non-cellular interface and transmit the received data either to another wireless device through the non-cellular interface or to a cellular base station through its cellular interface.

In other embodiments, each of, or a subset of, the steps of process 10 may be performed in a different order from the order in which they were discussed above. Further, while each of the steps of process 800 is expected to improve the selection of wireless devices as relay nodes, such selections can be performed with a subset of the steps in process 800, which is not to suggest that any future or step described elsewhere herein cannot also the omitted.

In other embodiments, each of the values obtained in steps 818, 822, 826, 830, 834, 838, 842, 846, 850, 854, 858, and 862 may be passed as inputs into a first, second, or third order, or higher order, neural-net module, e.g., executing on the CPU of the wireless device. The gains for each layer of the neural-net of this embodiment may be determined empirically or based on modeling, and these values may be stored in memory in the wireless device for assessing whether the wireless device should operate as a relay node. In other embodiments, a support vector machine or other machine learning module may be used to determine whether the wireless device will operate as a relay node based on the above mentioned values.

The process 800 described above and the related embodiments may also be used by a wireless device to determine whether the wireless device will act as a gateway node. In some embodiments, the above-described process 800 may be modified for this purpose by inverting decision steps 820 and 824. For example, in this embodiment, in response to a determination that the value indicative of a cellular signal strength is greater than the threshold cellular signal strength, the wireless device may return to block 812, and in response to a determination that the value indicative of a cellular signal strength is less than the threshold cellular signal strength, the wireless device may proceed to block 822. Similarly, in response to a determination that the value indicative of cellular signal quality is greater than the threshold cellular signal quality, the wireless device may return to block 812, and in response to a determination that the value indicative of cellular interference is less than the threshold cellular interference, the wireless device may proceed to block 826. These two modifications are expected to result in wireless devices with relatively strong cellular signal strength and relatively little cellular interference operating as a gateway nodes, thereby potentially providing a relatively low cellular interference path four other wireless devices onto the cellular network, though not all contemplated embodiments provide this benefit. In other embodiments, some of the steps are not inverted, and the process 800 applies a different (e.g., higher) threshold in certain steps to determine whether a device will operate as a gateway node.

Figure 9:
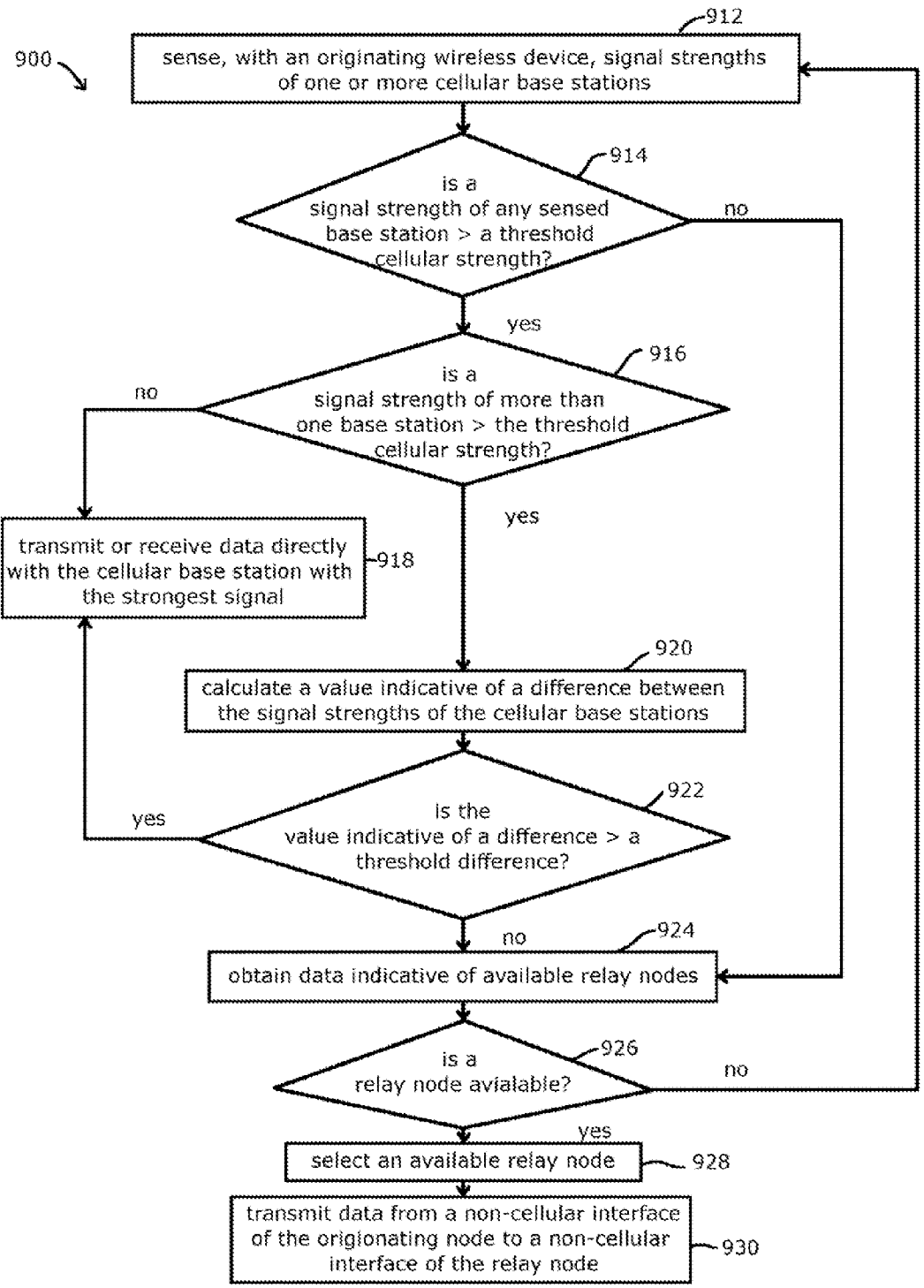
FIG. 9 is a flowchart of method for expanding the capacity of a cellular network in accordance with an embodiment of the present invention.
Figure 10:
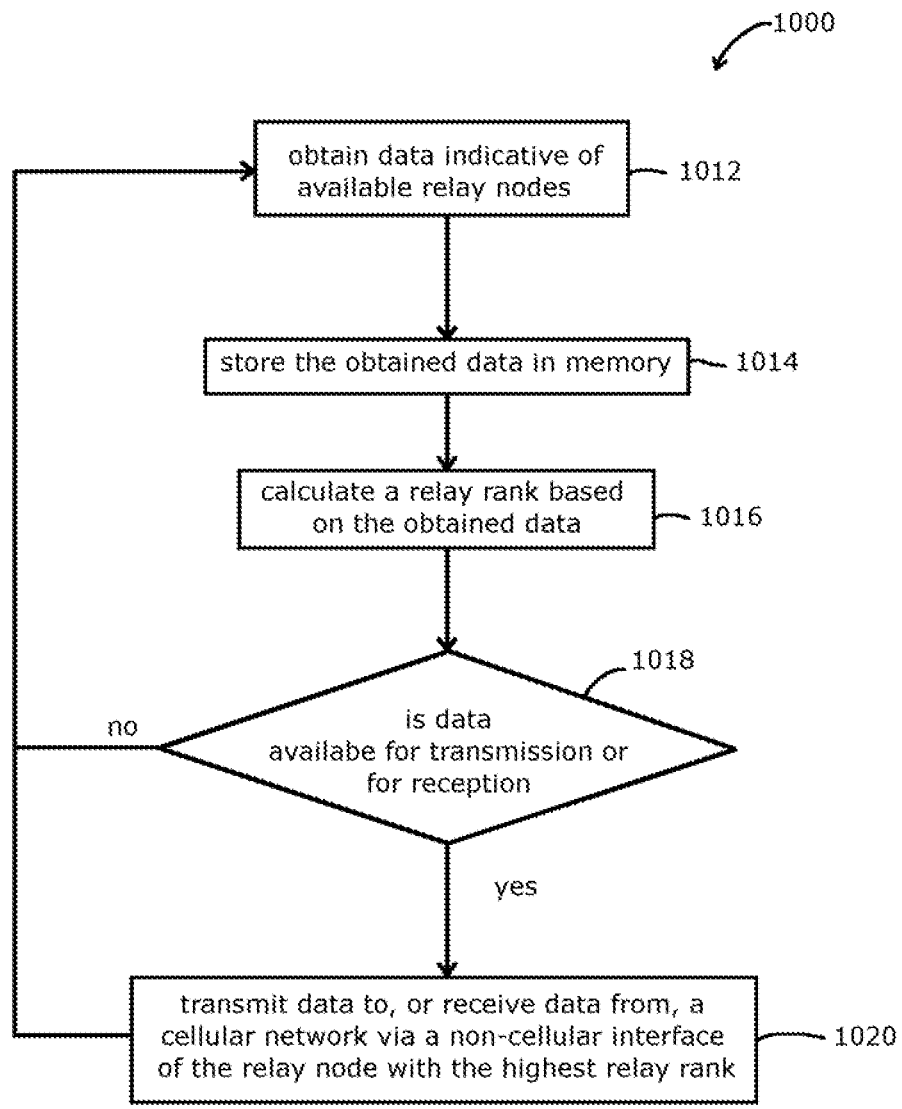
FIG. 10 is an example of a process for selecting a relay node.

In certain embodiments, each wireless device may execute a process for determining whether the wireless device will connect to a cellular base station directly or indirectly through and an intermediate node or a gateway node. An example of such a process 900 is shown in FIG. 9. The process 900 may be performed periodically, for example in response to receipt of a node-state signal, or in response to a certain amount of time elapsing, such as approximately 100 ms, for example. In other embodiments, the process 900 may be performed in response to a user indicating an intent to transmit or receive data, for example by dialing a telephone number or by opening a browser. The process 900 may be performed by a CPU of the wireless device in conjunction with the cellular interface and the non-cellular interface.

In this embodiment, the process 900 begins with the wireless device sensing cellular signal strengths of one or more cellular base stations, as indicated by block 912. The cellular signal strengths may be sensed and characterized with the techniques described above in other steps in which a cellular signal strength is obtained. After obtaining the cellular signal strengths, the wireless device may determine whether the signal strength of any cellular base station is greater than a threshold cellular signal strength, as indicated by block 914. The threshold cellular signal strength may be an amplitude or other value selected such that the cellular signal strength is adequate to form a robust connection, for example the threshold cellular signal strength may be a value of greater than −80 dBm. If none of the cellular base stations have a signal strength, as perceived by the wireless device performing the process 900, that is greater than the threshold cellular signal strength, the process 900 in response may proceed to block 924, which is described further below. Otherwise, in response, the wireless device performing the process 900 of the present embodiment may proceed to block 916. Next, in this embodiment, the wireless device may determine whether a signal strength of more than one cellular base station is greater than the threshold cellular signal strength, as indicated by block 916. If only one cellular base station has a cellular signal strength that is greater than the threshold cellular signal strength, the wireless device performing the process 900 may proceed, in response, to block 918, and the wireless device may transmit and receive data directly with the cellular base station having the strongest signal strength without the use of an intermediate node or a gateway node. Otherwise, in response, the wireless device may proceed to block 920, and in the present embodiment, the wireless device may calculate a value indicative of a difference between the cellular signal strengths of the cellular base stations as perceived by the wireless device performing the process 900, as indicated in block 920. The value indicative of a difference may be an average difference between each pair of cellular base stations, a difference between the cellular base station having the strongest signal and the cellular base station having the next strongest signal, or a number of cellular base stations from which signals are received. Next in the present embodiment, the wireless device performing the process 900 may determine whether the value indicative of a difference between the cellular signal strengths of the cellular base stations is greater than a threshold signal strength difference, as indicated by block 922. If, in this embodiment, the value is greater than the threshold signal strength difference, in response, the process 900 proceeds to block 918, as one of the cellular base stations has a substantially stronger signal strength, indicating that interference with the other cellular base stations is less likely. Otherwise, in this embodiment, in response, the wireless device performing the process 900 proceeds to block 924 and obtains data indicative of available relay nodes.

Obtaining data indicative of available relay nodes may include receiving node-state signals from other wireless devices, and storing data encoded in or otherwise conveyed by the node-state signals in memory of the wireless device performing the process 900. The wireless device performing the present embodiment of process 900 may next determine whether a relay node is available, for example based on the obtained data from block 924, as indicated by block 926. If no relay nodes are available, in response, the wireless device performing the process 900 may return to block 912, or in other embodiments, the wireless device may return to block 924 in cases where it is desired that only a multi-hop connection be sought. Otherwise, in response, the wireless device performing the process 900 proceeds to block 928 and selects an available relay node. Selecting an available relay node may include retrieving information from node-state signals stored in memory of the wireless device performing the process 900 and ranking or otherwise selecting among the available relay nodes, e.g., with the route selection process described below. In some embodiments, selecting an available relay node may also include transmitting a signal to the selected relay node indicating the selection and instructing the relay node to propagate a connection forward to the cellular network with similar transmissions. Finally, in the present embodiment, the wireless device performing the process 900 may transmit or receive data between the non-cellular interface of the wireless device performing the process 900 and the non-cellular interface of the selected relay node, which may conveyed data to and from the cellular network.

In some embodiments, under certain circumstances, an originating node may experience a network topology that provides more than one available relay node. In some embodiments, the originating node may select among the available relay nodes and transmit data via a single relay node or in parallel via multiple relay nodes. An example of a process 1000 for selecting a route through one or more relay nodes is depicted in FIG. 1. The exemplary process 1000 may be performed by each originating node in a hybrid the cellular non-cellular multi-hop network. For example, the process 1000 may be performed as part of step 928 of the previously described process for determining whether a wireless device will hop off of another wireless device. The process 1000 may also be performed by intermediate nodes in order to select a gateway node or other intermediate node closer to a gateway node.

In this embodiment, the process 1000 begins with the originating wireless device obtaining data indicative of available relay nodes, as indicated by block 1012. Obtaining data indicative of available relay nodes may include the steps described above in reference to block 824 of process 800. For example, the data indicative of available relay nodes may be received from node-state signals received through a non-cellular interface of the originating wireless device from each of a plurality of available relay nodes. And in some embodiments, each of the relay nodes may perform the above described process for forming a node-state signal. Next, in the present embodiment, the data indicative of available relay nodes may be stored in memory of the originating wireless device, as indicated by block 1014. In some embodiments, the data may be stored as structured data, for example as an object or as one or more entries in a database, that associates an identifier of each relay node with data about that relay node.

Next, in the present embodiment of process 1000, the originating node may calculate a relay rank based on the obtained data. For example, the originating node may retrieve the obtained data from memory and multiply values of the obtained data with weighing coefficients and adding the products to form an aggregate score for each wireless device that is available as a relay node. The weighing coefficients may have a sign (positive or negative) such that the weighing coefficients tend to cause the following effects: a larger number of hops to make a given relay node be ranked lower, a stronger cellular signal strength to cause a given relay node to rank higher, a higher amount of cellular interference to cause a relay node to rank lower, a match between a cellular carrier of the originating wireless device and a cellular carrier of the gateway node to cause the relay node to rank higher, a relatively low amount of energy stored in a relay node to cause the relay node to rank lower, a relatively strong non-cellular connection to the relay node from the originating device to cause the relay node to rank higher, a relatively high amount of non-cellular interference to cause the relay node to rank lower, and a higher price paid for cellular service by a user of the relay node to cause the relay node to rank lower. The weighing coefficients may be determined empirically or based on modeling of various topologies and use cases. In some embodiments, the weighing coefficients may be stored in memory of the originating wireless device and recalled from memory prior to performing step 1016. Further, in some embodiments, a cellular network operator may update the weighing coefficients from time to time to adjust the operation of the wireless devices. For instance, a cellular network operator may update the weighing coefficients in a given region or around a particular cellular base station in advance of and during an event that is expected to draw a large number of people, for example during a concert or sporting event. The updates may adjust the weighing coefficients, for example, to use non-cellular spectrum more carefully, e.g., the magnitude of the weighing coefficients associated with non-cellular signal strength and non-cellular interference maybe increased, and the magnitude of the other weighing coefficients may be decreased. The updates may be transmitted indirectly over multiple hops or directly over a cellular connection. In some embodiments, the wireless device performing the process 1000 may transmit a signal to the highest-ranking relay node indicating to that relay node its selection.

Next, in the present embodiment of process 1000, the originating wireless device determines whether data is available for transmission or reception, as indicated by block 1018. The determination may be made based on a buffer within the wireless device for storing data for transmission or based on the receipt of data on a non-cellular interface of the wireless device from, for example, one of the relay nodes, such as the highest-ranking relay node. If the determination of block 18 indicates that no data is available, the process 1000 returns to block 1012 in response. Otherwise, in the present embodiment, the wireless device performing the process 1000 proceeds to block 1020, and that the wireless device transmits data to and receives data from a cellular network via a non-cellular interface of the relay node with the highest relay rank.

In some embodiments, the wireless device performing the process 1000 may adjust to changes in network topology, e.g., if a relay node is carried into another room or out of range. The wireless device will detect a change in, e.g., a deterioration of, the rank of a wireless device that has become less suitable, and in response, another relay node will rank higher, which may cause the wireless device performing the process 1000 to cease transmitting data to, or receiving data from, the non-cellular interface of the first relay node and begin transmitting data to, or receiving data from, the non-cellular interface of the other, now higher ranking, relay node.

In some embodiments, an originating node may send data to a cellular base station via the non-cellular interface of the originating node, through a gateway node, such that the data appears to the cellular base station as though the data is coming directly from the originating node, e.g., for purposes of billing, ciphering, authentication, integrity, and security. In these embodiments, an intermediate node may receive data for the cellular base station on the non-cellular interface of the intermediate node and relay the data via the non-cellular interface of the intermediate node such that the data appears to the base station as though coming directly from the originating node, e.g., for purposes of billing, ciphering, authentication, integrity, and security. A gateway node may receive data for the base station on the non-cellular interface of the gateway node and forward the data via the cellular interface of the gateway node such that the data appears to the base station as though coming directly from the originating node, e.g., for purposes of billing, ciphering, authentication, integrity, and security.

Similarly, for downlink data in some embodiments, an originating node may receive data for itself on its non-cellular interface such that the data appears to itself as though coming directly from a cellular base station, e.g., for purposes of billing, ciphering, authentication, integrity, and security. An intermediate node may receive data for the originating node on the non-cellular interface of the intermediate node and relay the data via the non-cellular interface of the intermediate node such that the data appears to the originating node as though coming directly from the cellular base station, e.g., for purposes of billing, ciphering, authentication, integrity, and security. A gateway node may receive data for the originating node on its cellular interface and forward the data via its non-cellular interface such that the data appears to the originating node as though coming directly from the cellular base station, e.g., for purposes of billing, ciphering, authentication, integrity, and security.

There are several ways for data frames to appear to an originating device or a cellular base station to come from come from a particular cellular base station or a particular wireless device when the data is sent over multiple-hops. For example, some implementations of the Global System for Mobile Communications (GSM) standard use Subscriber Identity Module (SIM) cards. SIM cards contain secret information that is also stored in the cellular networks' databases. When communicating over multiple hops by hopping onto distrusted wireless devices, users may want to encrypt their voice and data communications. In some embodiments, such users may only trust their own wireless devices and the cellular base stations.

Following is one secure way to facilitate indirect communication between a wireless device and a base station over multiple hops. The wireless device (or the originating node) may encrypt a data frame with the originating node's SIM card. Rather than passing the encrypted data frame to the stage after SIM encryption has been done in the protocol stack of its own cellular interface, the wireless device may send out the data frame via the non-cellular interface of the wireless device. Any intermediate nodes in the multi-hop path to the cellular base stations may relay the encrypted data frame using the non-cellular interfaces of the intermediate node. The gateway node may then receive the encrypted data frame on its non-cellular interface and inject the data frame at the stage after SIM encryption has been done in the protocol stack of the cellular interface of the gateway node. When the cellular base station receives the encrypted data frame from the gateway node via the gateway node's cellular interface, the cellular base station may use the originating node's secret details to decrypt the frame. Not only is such an implementation expected to be secure as current single-hop cellular communications, this technique is expected to also allow the cellular base station's mobile switching center to bill the originating node. This is one way for an originating node to appear as itself to a base station when communicating indirectly over multiple hops via its non-cellular interface. In some embodiments, this technique may be extended to incorporate other cellular and non-cellular standards.

Applying the present embodiment in the reverse order is expected to provide another secure way to facilitate indirect communication between a wireless device and a base station over multiple hops. The base station may encrypt a data frame with the originating node's SIM card details stored in the cellular network's database and then send out the data frame via the cellular interface of the cellular base station to the cellular interface of the gateway node. Rather than passing the encrypted data frame for decryption in the protocol stack of its own cellular interface, the gateway node may transmit the encrypted data frame towards the originating node via the non-cellular interface of the gateway node. Any intermediate nodes in the multi-hop path to the originating node may relay the encrypted data frame using the non-cellular interfaces of the intermediate nodes. The originating node may receive the data frame on the non-cellular interface of the originating node and inject the data frame at the stage before SIM decryption has been done in the protocol stack of the cellular interface of the originating node. The originating node may then use its SIM card credentials to decrypt the frame. Some embodiments are expected to be as secure as current single-hop cellular communications, and these embodiments are also expected to allow the originating node to be billed and also verify the authenticity of the cellular base station to the originating node. Thus, in some embodiments, the cellular base station may appear as itself to an originating node when communicating indirectly over multiple hops. This embodiment may be extended to incorporate other cellular and non-cellular standards.

Figure 11:
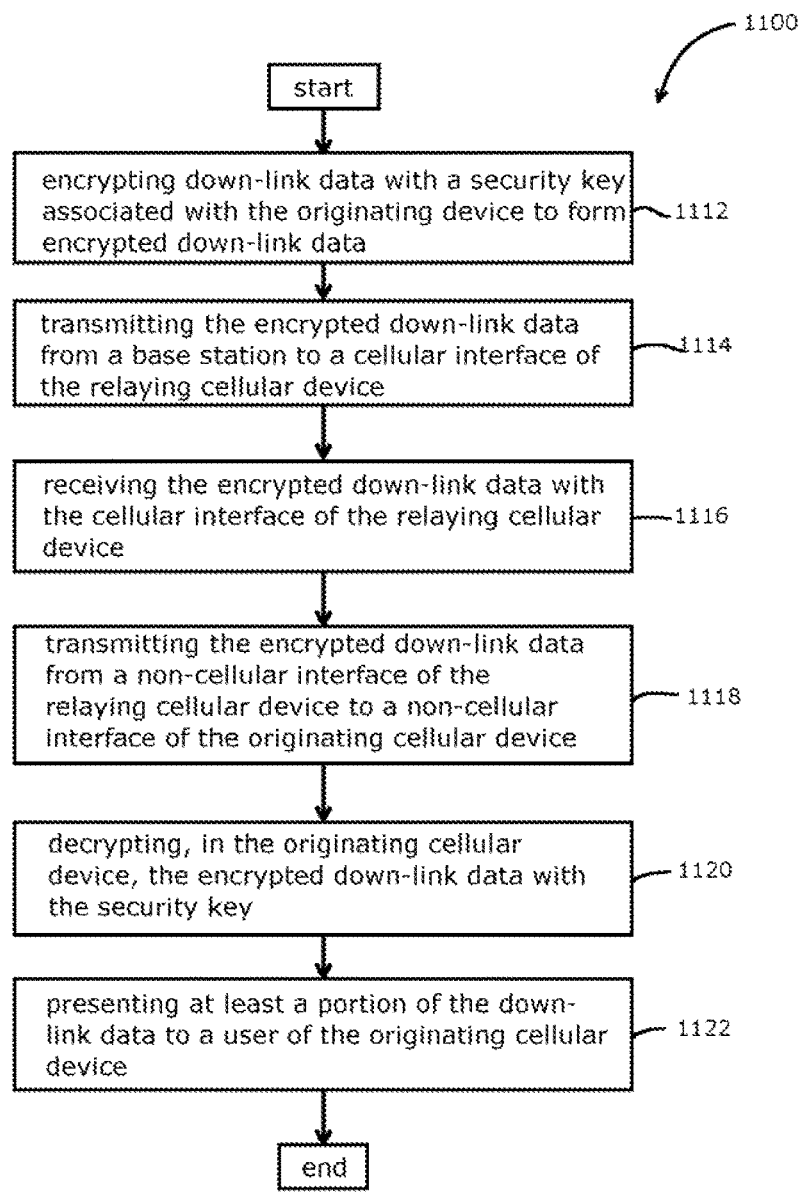
FIGS. 11 and 12 are examples of a processes for securely transmitting data on a multi-hop network.
Figure 12:
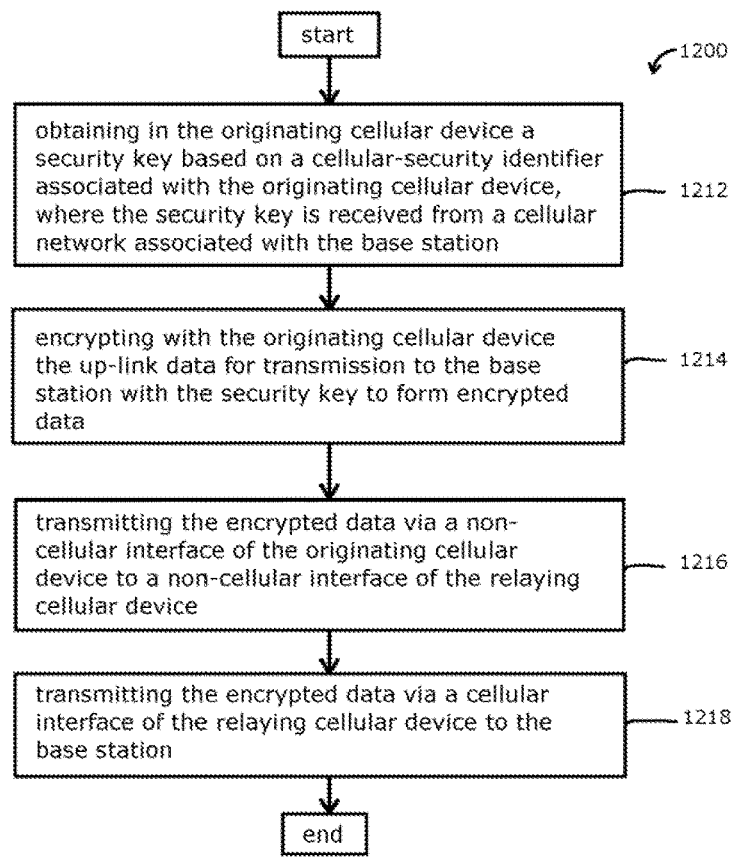

As shown in FIGS. 11 and 12, some embodiments may perform a processes for making a gateway wireless device appear to a cellular network as an originating wireless device.

FIG. 11 illustrates an embodiment of a process 1110 before making downlink data conveyed on a multi-hop hybrid cellular non-cellular network appear to an originating node as if the downlink data is coming from a cellular base station, for example for purposes of security, billing, etc.

In this embodiment, the process 1110, begins with encrypting downlink data with a security key associated with the originating device to form encrypted downlink data, as indicated by block 1112. In some embodiments, this encryption may be performed by a cellular base station or other component of a cellular network. The security key may be associated with a device identifier of the originating device stored in a database of the cellular network operator, for example. The data may be encrypted with a variety of techniques, such as A5, A8, A9, F5, F8, F9, 128-EEA1, 128-EEA2, UEA1, or UEA2 ciphering algorithms for facilitate billing and security.

Next in the illustrated embodiment, the encrypted downlink data may be transmitted from a cellular base station to a cellular interface of a relaying cellular device, e.g., a gateway node, as indicated by block 1114. The relaying cellular device, in this embodiment, is a different wireless device from the originating wireless device. In some embodiments, the encrypted data may be encrypted again based on a security key associated with the relaying cellular device by the cellular base station prior to transmission.

In the present embodiment, the encrypted downlink data may be received with the cellular interface of the relaying cellular device, as indicated by block 1116. In embodiment some embodiments in which the transmitted data is encrypted twice, with the second encryption being performed with the security key associated with the relaying cellular device, the transmitted data may be decrypted once by the relaying cellular device, returning the data to the encoding that followed the first encryption based on the security key associated with the originating device.

Next, in the present embodiment, the relaying cellular device may transmit the encrypted downlink data from a non-cellular interface of the relaying cellular device to a non-cellular interface of the originating cellular device, as indicated by block 18. In some embodiments, the relaying cellular device may transmit the encrypted data to the originating cellular device via an intermediate node. The relaying cellular device may also be in the process of transmitting other that data is not encrypted for the originating device via its non-cellular interface, and the relaying cellular device, in some embodiments may treat these data flows differently. For example, the relaying cellular device may receive a data frame for transmission its non-cellular interface and determine whether the data is already encrypted by the cellular network. If the data is already encrypted, the relaying cellular device may transmit the data without further encryption in response. If the data is not already encrypted, the relaying cellular device may encrypt the data using, for example, WEP, WPA, or WPA2 encryption, prior to transmission on its non-cellular interface. Thus, in some embodiments, the relaying cellular device may conserver power by not re-encrypting the non-cellular data that is already encrypted, though not all embodiments use this technique or provide this benefit.

Next, the presently described embodiment of process 1110 proceeds to a step of decrypting, in the originating cellular device, the encrypted downlink data with the security key, as indicated by block 1120. Decrypting may include forming the security key based on values stored on a SIM card in the originating cellular device.

Finally, in this embodiment, the process 1110 includes a step of presenting at least a portion of the downlink data to a user of the originating device, as indicated by block 1122. Presenting the data may include converting the data into sound played through a speaker of the originating cellular device or images presented on a screen of the originating cellular device.

FIG. 12 illustrates an embodiment of a process 1200 for making uplink data conveyed on a multi-hop hybrid cellular non-cellular network appear to an cellular base station as if the uplink data is coming from an originating node, for example for purposes of security, billing, etc.

The illustrated embodiment of process 1200 begins with a step of obtaining, in an originating cellular device, a security key based on a cellular-security identifier associated with the originating cellular device, where the security key is received from a cellular network associated with a cellular base station, as indicated by block 1212. In some embodiments, the security key may be formed based on data stored in a SIM card of the originating cellular device.

Next in the present embodiment, uplink data for transmission to the cellular base station may be encrypted with the originating cellular device by using the security key to form encrypted data, as indicated by block 1214. The encryption may take a variety of forms, including those listed above. Next in the present embodiment, the encrypted data may be transmitted via a non-cellular interface of the originating cellular device to a non-cellular interface of a relaying cellular device, as indicated by block 1216. For example, the data may be transmitted via a WiFi interface or other non-cellular interface described above. Next in the present embodiment, the encrypted data may be transmitted via a cellular interface of the relaying cellular device to a cellular base station, as indicated by block 1218. In some embodiments, the transmitted encrypted data may be re-encrypted by the relaying cellular device using a security key associated with the relaying cellular device. In some embodiments, the cellular base station may receive the encrypted data transmitted by the relaying cellular device and decrypt the data based on the security key associated with the originating cellular device. In embodiments in which the relaying cellular device re-encrypts the data, the cellular base station may perform two decryption steps: a first decryption based on the security key associated with the relaying cellular device, and the second encryption based on the security key associated with the originating cellular device. A cellular network operator may respond to the decrypted data, in part, by increment billing data and usage data, for example a counter that is used to determine whether a user has exceeded a data cap for a given period, such as a month.

As with the previously described process for downlink data, in some embodiments, an intermediate node may determine whether data it transmits from its non-cellular interface is already encrypted for the cellular network. If the data is encrypted, in response, the intermediate node may save power by not-encrypting the data, though not all embodiments employ this technique.

Originating nodes, intermediate nodes, and gateway nodes may maintain additional direct and indirect routes to several cellular base stations at a given time. Additional direct routes are routes to base stations via a wireless device's cellular interface. Additional indirect routes are routes to base stations via a wireless device's non-cellular interface. Originating nodes, intermediate nodes, and gateway nodes may use the additional direct and/or indirect routes to communicate with the base stations when a primary route to a base station is deemed insufficient or broken. Additional direct and indirect routes may serve as backup routes. While direct backup routes are possible in some of the prior-art, these backup routes are not believed to provide indirect backup routes and a combination of indirect and direct backup routes, which is provided by some embodiments of the presently described hybrid multi-hop cellular architectures. Moreover, some embodiments cache and pre-calculate indirect and direct backup routes at the originating nodes, intermediate nodes, and gateway nodes, such that routes can be switched on the fly, or relatively quickly, e.g., within less than 10 milliseconds to prevent or reduce dropped calls and delay/jitter in other voice and video streaming applications. Thus, some embodiment of the present inventions are expected to mitigate several issues with certain existing cellular networks, though not all embodiments address these issues, and certain embodiments provide other benefits.

In some systems, backup routes may also provide route redundancy, which may be useful for enterprise and defense applications. Backup routes may also provide wireless signaling redundancy, in certain embodiments, potentially facilitating cellular service in areas where no other single-hop or multi-hop cellular architectures can provide cellular service. For example, on a train moving through countryside where the cellular coverage for any device is not enough to facilitate a single voice, by combining the bandwidths that can be allocated to a few devices using multi-hopping, embodiments may facilitate a single voice call where previously it was not possible to do so, though not all embodiments are so directed. Moreover, additional wireless signaling redundancy may further make the single voice call in this example even more robust. Principles of the present inventions may facilitate and use backup routes where the backup routes help the consumers by improving user experience by reducing dropped calls and improving seamless connectivity. When one or more prime routes fail, one or more backup routes can become the prime routes.

A wide variety of wireless devices are communicating with cellular base stations and the number of such devices is growing very quickly. Current and future single-hop cellular networks cannot support the increasing demand for better coverage and capacity. However, since the number of devices is growing so quickly, the plethora of devices may be able to use the cellular system more efficiently to satisfy their demand for better coverage and capacity. One of the ways for devices to make relatively efficient use of the cellular system resources is to employ embodiments of multi-hopping when seen as beneficial. In such embodiments, each device may be able to decide on its own about participating in multi-hopping for inter-device hopping to function properly.

Tight centralized control in a multi-hop cellular network, such as that described by examples in the prior art, reduces the performance of individual devices. This is because a centralized controller cannot know everything about all wireless devices at all times without incurring a tremendous amount of overhead. Overheads themselves consume wireless spectrum and resources of the cellular system. Thus tight centralized control on hopping decisions will adversely affect the performance of multi-hop cellular systems. On the contrary, certain embodiments of the present inventions facilitate a multi-hop cellular system where the tight centralized control only extends to the cellular interfaces of the devices that are communicating to a cellular base station via their cellular interfaces. Depending on their needs, situations and surroundings, the wireless devices themselves make inter-device hopping decisions in a decentralized manner. A wireless device may receive some assistance from the base station when making hopping decisions, but this is not necessary.

Additional techniques beyond those discussed above may be used to facilitate multi-hop cellular systems or for other purposes. Wireless spectrum is scarce, in part, because governments around the world own or allocate wireless spectrum. Typically the governments slowly auction wireless spectrum for use by cellular system networks. Multi-hop wireless technology helps devices make the most of the wireless spectrum that is used by the cellular base stations. Using certain embodiments of this technology, devices that have a good signal from the base stations may often be the ones that will be talking to the base stations using their cellular interfaces. Devices that have a good signal from the base stations may be able to use more complicated modulation schemes and will also need less error correction redundancy. In this way, the wireless spectrum employed by the base stations can be used more aggressively to send useful data.

The wireless spectrum is a shared resource and thus mechanisms are often needed to mediate access to the shared wireless channel. Wireless devices and base stations generally need to establish a media access schedule to minimize collisions and maximize system performance. In some traditional systems, the cellular interface of a wireless device is tightly controlled by a cellular base station. This tight control allows the base station to mediate access to the shared wireless spectrum by employing techniques such as frequency division multiple access, time division multiple access, code-division multiple access, orthogonal frequency division multiple access, etc. (which is not to suggest that the presently described embodiments are not capable of being used with these techniques). In some embodiments, wireless devices that see benefit in employing multi-hopping to indirectly talk to base stations via their non-cellular interfaces also may need media access control. Traditional multiple access techniques can also be used to mediate channel access for peer-to-peer or inter-device multi-hopping. However, some traditional multiple access techniques either need tight control from a centralized authority (e.g., a cellular base station) or need extra data exchange to establish the media access schedule between the devices.

As discussed above, a multi-hop cellular system that tightly controls all inter-device hopping decisions is not expected to be scalable and is not expected to be able to take into account all relevant information about the devices for which it is making the decisions. In contrast, in certain above-described embodiments of a hybrid cellular non-cellular multi-hop network the cellular base stations tightly control the cellular interfaces of the devices and the cellular base stations have only loose control, or no control, over the non-cellular interfaces of the other wireless devices. As an example of loose control, in some embodiments, the base stations may be able to optionally assist the non-cellular interfaces of the devices, which is not to suggest that any other feature or step described herein is not also optional. Nonetheless, in some of the presently described embodiments of hybrid multi-hop cellular non-cellular systems, the systems may employ some traditional multiple access techniques. The use of these traditional multiple access techniques may occur expense of causing some overhead to help the devices loosely co-ordinate media access with each other. However, techniques that can help co-ordinate media access without incurring excessive overhead are also disclosed herein.

Wireless networks benefit from parsimonious use of spectrum. Economy with spectrum is particularly helpful in multi-hop non-cellular wireless networks, as these networks are, all other things being equal, expected to consume more of the available spectrum available near a given location relative to non-cellular wireless networks that are not participating in the multi-hop exchanges of data, as such spectrum may be consumed both by conventional use-case scenarios and multi-hop uses. Careful use of spectrum is also becoming more important in traditional use-cases for non-cellular networks, e.g., in networks not carrying multi-hop non-cellular signals, as the number of devices using the available spectrum has tended to increase in recent years, particularly as cell phones have come frequently to include non-cellular interfaces. This trend is expected to continue, thereby making spectrum for non-cellular wireless communication even more scarce in the future.

Certain embodiments described herein are believed to use the available spectrum for non-cellular networks relatively efficiently by, among other things, scheduling the times at which the various wireless devices in a non-cellular wireless network transmit signals such that 1) in some embodiments, multiple devices in the network re-use the same or overlapping spectrum at approximately the same time by transmitting in parallel, and 2) in some embodiments, relatively little time is reserved between transmissions waiting for other devices to transmit on a given portion of the spectrum. Moreover, some embodiments schedule transmissions in a distributed fashion without a master device dictating the precise time at which each participant in the network will transmit, thereby potentially providing a network that is relatively robust to the failure or absence of any single device. The presently described techniques, however, are not limited to embodiments that provide each of these benefits, as some embodiments provide one of these benefits or none of these benefits. Indeed, multi-hop non-cellular systems can be implemented without use of the following techniques, though these techniques are believed to improve the performance of both multi-hop non-cellular networks and non-cellular networks generally.

Figure 13:
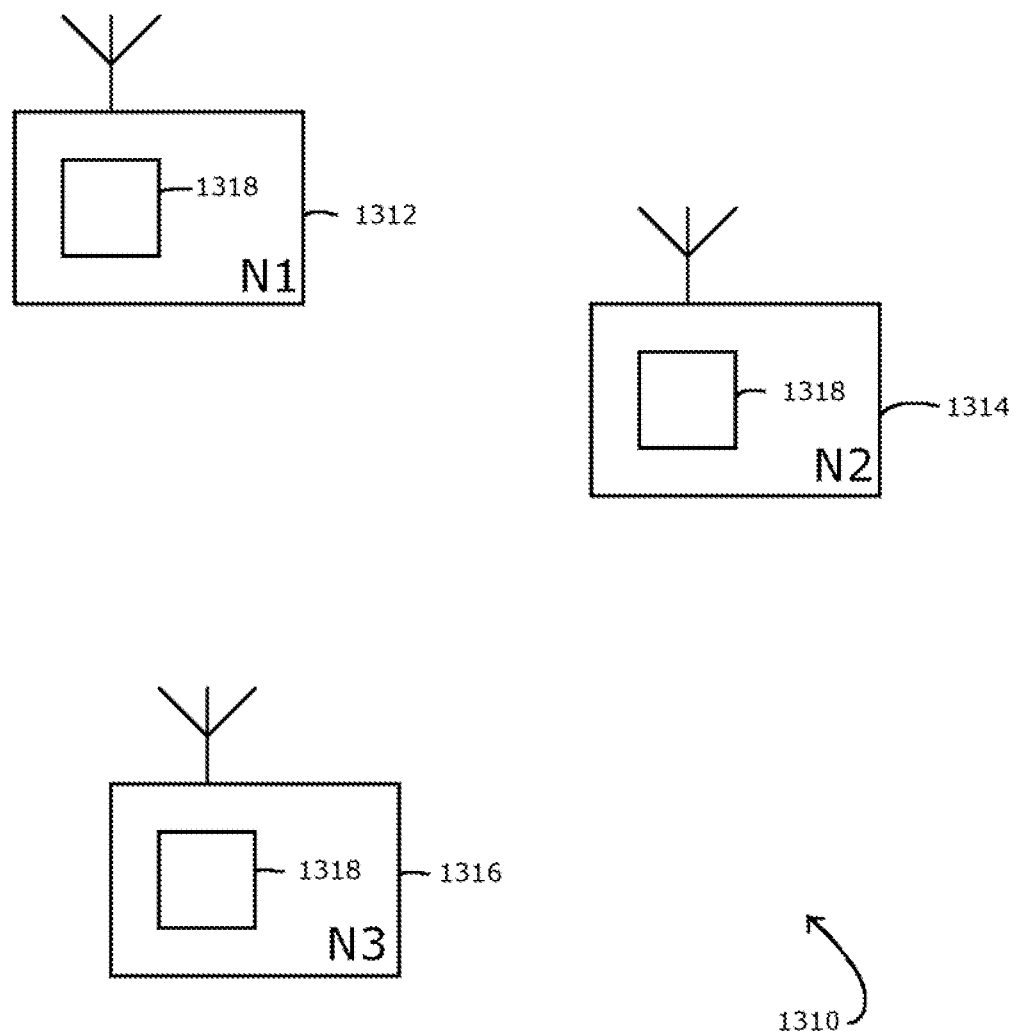
FIG. 13 is an example of a wireless network.

FIG. 13 depicts an example of a non-cellular wireless network 1310 carrying data between wireless devices 1312, 1314, and 1316. In this embodiment, each wireless device 1312, 1314, and 1316 have a scheduler 1318 that is believed to mitigate collisions with relatively little temporal overhead and without centralized coordination of the schedulers 1318. To this end, the schedulers 1318 may use the two techniques disclosed below, e.g., either in the alternative or in combination. First, as explained further below, the schedulers 1318 may, in some embodiments. coordinate with one another, e.g., by monitoring one another's transmissions or exchanging signals for purposes of scheduling, to determine 1) a number of time slots for transmission; 2) which devices will use which time slot; or 3) both the number of time slots and which device will use which time slot. Moreover, in some embodiments, such coordination may occur without a single master device assigning a schedule for each device 1312, 1314, and 1316 in the network 1310. Second, in some embodiments described below, the schedulers 1318 may use a different schedule for transmissions from certain devices relative to the schedule for transmissions to those devices, e.g., in a subset of the devices 1312, 1314, and 1316, transmission and reception may have asymmetrical schedules. For instance, some of these embodiments may implement schedules that favor transmissions in one direction or another based on use patters, e.g., large multi-media files moving in one direction versus relatively short requests for additional data moving in the other, and network topology, e.g., a single device, or relatively few devices, acting as a conduit for data flowing to a plurality of other devices. Further, some embodiments may dynamically adjust the degree to which transmissions in one direction or another are favored based on changes in network traffic and topology. By implementing these techniques, either in the alternative or in combination, embodiments are expected to make relatively efficient use of the available spectrum.

In operation, the wireless devices 1312, 1314, and 1316 may transmit data to one another and receive data from one another through wirelessly transmitted signals. The wireless devices 1312, 1314, and 1316 may be located within the same wireless space such that the transmissions from one device 1312, 1314, or 1316 are received at the other devices 1312, 1314, or 1316 at a transmission power chosen in accordance with a protocol for the wireless network 12, e.g., one of the 802.11 protocols, one of the Bluetooth protocols, one of the Zigbee protocols, etc. In the illustrated embodiment, the wireless devices 1312, 1314, and 1316 may share spectrum, e.g., simultaneous transmissions by two of the wireless devices. e.g., wireless devices 1312 and 1314, would interfere with one another and potentially impair the ability of a third device, e.g., wireless device 1316, to resolve the signals conveyed by those simultaneous transmissions. Accordingly, in some embodiments, the schedulers 18 within each of the wireless devices 1312, 1314, and 316 may time the transmissions from each of the wireless devices 1312, 1314, and 1316 to avoid simultaneous transmissions or to avoid simultaneous transmissions by pairs of devices 1312, 1314, and 1316 that are wirelessly close enough to one another that it is difficult to resolve the data conveyed by the transmissions at a third device. These simultaneous transmissions that render the signals difficult to resolve are referred to as "collisions," and in some embodiments, a function of the illustrated schedulers 1318 is to avoid or mitigate the effects of collisions.

The schedulers 1318 may be configured to coordinate with one another in a distributed fashion. In some embodiments, each of the schedulers 1318 may be configured to execute the same or approximately the same scheduling protocol, and each may employ the same or similar process to arrive at a schedule for transmission by the devices 1312, 1314, or 1316 associated with the scheduler 1318. Through coordination, examples of which are described below, a schedule for transmission within the network 1310 may emerge. For instance, each scheduler 1318 may be configured to obtain data about the operation of other schedulers 1318 within the same wireless network 1310 and select a schedule for the wireless device 1312, 1314, or 1316 or instruct the associated wireless device 1312, 1314, or 1316 to transmit a signal requesting the other schedulers 1318 modify their schedule for transmission, or both. Specific examples of schedule selection and requests for modification are described further below.

Some non-cellular wireless networks in accordance with the present techniques transmit data in frames, or collections of data, including metadata such as header information, that is sent in a burst of generally consecutive transmissions of bits and receipt of which is often assessed at the receiving device on a frame-by-frame basis. The frames may serve different functions, such as a management frame, a control frame, or a payload frame, and the frames may include header information and information about the associated command or payload, for instance.

After each frame is transmitted, or after certain frames are transmitted, the wireless devices 1312, 1314, and 1316 may pause transmitting for a period of time and sense whether another wireless device begins transmitting on the same or overlapping spectrum. The duration of the transmission pause may be defined by a wireless data communication protocol, such as one of the protocols mentioned above, or it may be selected in accordance with one of the techniques described below. If another device begins transmitting during the transmission pause, the first wireless device may let that other wireless finish transmitting before attempting to transmit a subsequent frame. The duration of the period after one frame is transmitted before a wireless devices transmits the next frame is referred to as an "inter-frame spacing" or "IFS."

The duration of the IFS, in some embodiments, can be divided into sub-periods that are reserved for various types of transmissions by devices in the wireless network 1310. In these embodiments, higher-priority or more latency sensitive types of transmissions are generally assigned a slot, or temporal window, that occurs earlier in the inter-frame spacing. If within a slot of the IFS, the spectrum is still available, i.e., another device is not transmitting on the same spectrum, then in response, if it has a signal to transmit, a wireless device may transmit its signal associated with that slot. For example, as shown in the embodiment of FIG. 2, a short-IFS (SIFS) duration separates control frames, e.g., RTS, CTS, and ACK frames, from the previously transmitted frame; a longer polling-IFS (PIFS) duration separates higher priority management frames from previously transmitted frames; a request frame-IFS (QIFS) separates request frames from the previous frame; and a distributed-IFS (DIFS) duration separates previously transmitted frames from subsequent data frames. Thus, in some embodiments, the wireless medium may be time-division multiplexed according to the function of the signals in the wireless network.

Figure 14:
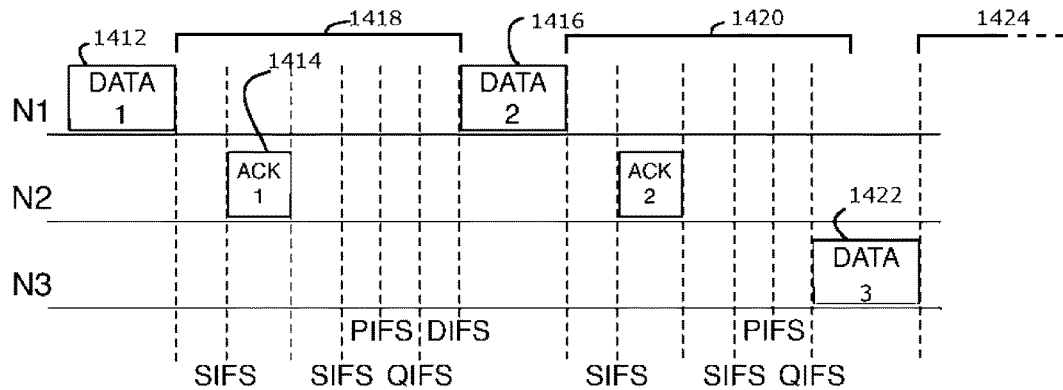
FIG. 14 is an example of a timing diagram of transmissions on the network of FIG. 13.

As shown in the timing diagram of FIG. 14, wireless device N1 may transmit to device N2 a data frame 1412, the end of which marks the start of an inter-frame spacing 1418. After the SIFS duration, wireless device N2 may transmit an acknowledgement signal (ACK) 1414 back to wireless device N1, indicating receipt of the data frame 1412. Then in this example, after the remaining portions of the IFS 1418 have elapsed, the wireless device N1 transmits the next data frame 1416. However, during the next IFS 1420, after the second data frame 1416, the wireless device N3 takes control of the medium by transmitting frame 1422, preempting transmission of a third data frame by wireless device N1 and marking the beginning of another IFS.

In some embodiments, the DIFS is the last part of the IFS, and the duration of the DIFS is different for each wireless device (or most of the wireless devices most of the time) in order to provide different slots for each of the wireless devices in the wireless network to use the available medium, e.g., to transmit a data frame. In certain systems, the duration of the DIFS may include both a base duration and a duration that varies according to a protocol. The variation in the DIFS may be quantized as an integer multiple of a unit of time referred to as the mini-slot time (MST), and the integer multiple may be selected according to a protocol that tends to cause each of the wireless devices in the wireless network to have a different integer multiple of MST. Thus, each device potentially has a unique (or rarely shared) slot at least one MST long within the DIFS in which to begin transmission and take control of the medium.

One protocol for selecting an integer multiple of MST to constitute part of the DIFS of a given device is referred to as an "exponential randomized-backoff schedule" or (ERB schedule). An example is shown in the timing diagram of FIG. 15. When a wireless device has a data frame to transmit, the ERB algorithm is used to choose a random or pseudo-random number. After the previous frame 1512 has finished being transmitted, e.g., by another wireless device, the wireless device with the frame to transmit waits until its DIFS base period 1514 ends and then begins counting down from the random or pseudo-random number, counting down by one as each MST 1516 elapses. If another wireless device begins transmitting and takes control of the media before the countdown is complete, the countdown continues during the next DIFS time. When the countdown reaches zero, the frame in waiting is transmitted. By assigning DIFS based on a random or pseudo-random number, it is relatively unlikely that two wireless devices will cause a collision by transmitting at the same time, assuming that the pool of random numbers is relatively large relative to the number of expected wireless devices sharing the medium, e.g., a ratio of more than 10, 50, or 100, as it is unlikely that the two devices would select the same number. And if a collision occurs, the colliding devices may select a new random or pseudo-random number from a larger pool of numbers and repeat the countdown described above. Systems in which the scheduler 1318 selects DIFS based a random or pseudo-random number are said to have non-deterministic schedules. Thus, in this example, without centralized control scheduling transmission times, collisions are mitigated with a non-deterministic schedule.

While ERB schedules can mitigate collisions without centralized control of schedules for the devices on the wireless network, these schedules have certain drawbacks. The ERB schedules leave wireless devices and the wireless medium idle, waiting for other devices to transmit during the DIFS. And this un-used time is potentially expanded in the event of a collision. Further, because the slots in the DIFS for each device to transmit are random or pseudo random, in some embodiments having non-deterministic schedules, opportunities to potentially transmit in parallel are lost. Parallel, or concurrent, transmission could be performed by wireless devices that are wirelessly far-enough apart from one another that their signals, while interfering to some degree, can be resolved at different receiving devices. However, this is difficult to coordinate when transmission times are selected based on a random or pseudo-random number, as it is unlikely that the devices with sufficient wireless distance from one another would select the same DIFS.

The schedulers 1318 of FIG. 13, in some embodiments, may be distributed deterministic schedulers, e.g., the schedulers 1318 may, without a centralized controller assigning aspects of their schedules, arrive at a schedule for wireless transmission in the network 1310 that assigns non-random (or non-pseudo-random) transmission time slots to each of the wireless devices 1312, 1314, and 1316. For instance, each of the schedulers 1318 may select an IFS for its associated wireless device 1312, 1314, and 1316, and that IFS may be 1) different the IFS of other wireless devices for wireless devices that are wirelessly close enough to one another that parallel transmission would cause un-resolvable collisions; 2) selected from among a small pool of slots relative to the number of wireless devices in the wireless network 1310, e.g., less than a ratio of 1.5 slots per device, 2 slots, per device, 4 slots per device, or 1310 slots per device; and 3) predictable to the other wireless devices, e.g., the same slot may be used by a scheduler 1318 indefinitely or until network traffic or topology changes.

Figure 15:
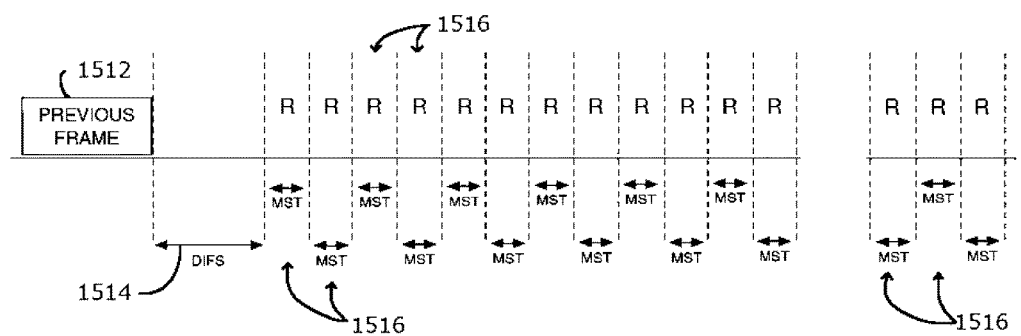
FIG. 15 is an example of a schedule for mediating access to a wireless medium.

FIG. 15 illustrates an example of a deterministic schedule for the network 1310 of FIG. 11. The illustrated schedule has four slots for different IFS durations, three of which are each selected by one of the schedulers 1318 of FIG. 13. For instance, the scheduler 1318 of wireless device 1312 may select the slot D1; wireless device 1314, slot D2; and wireless device 1316, slot D3. The slots D1-D4 may each be approximately the same duration, e.g., one MST, and in this example, the number of slots, four, is a relatively small multiple of the number of devices, i.e., less than two in this example. Thus, the average IFS is relatively small compared to a system using an ERB schedule, which typically has a relatively large number of slots to reduce the likelihood than any two devices will select the same slot. Other embodiments may have more or fewer slots, e.g., the ratio of wireless devices to slots may be less than four, eight, or ten. As with the previous examples, each scheduler 1318 may wait to transmit a data frame until its selected IFS slot D1-D4 after the DIFS base period 1514 following the end of transmission of the previous frame 1512, assuming that another wireless device with an earlier slot D1-D4 has not already started transmitting a data frame.

The schedulers 1318 of FIG. 13 may select among slots D1-D4 in the schedule of FIG. 15 without centralized control, e.g., in an ad-hoc fashion without anyone device dictating which device should be assigned which slot. To coordinate, and avoid devices selecting the same slot unintentionally, the wireless devices 1318 may either transmit signals encoded with information about which slot is selected, observe the IFS of other devices for a period before selecting a slot, or some combination thereof.

For instance, the wireless devices 1312, 1314, and 1316 may each broadcast a schedule-state signal, e.g., a beacon, indicating which slot the scheduler in that device has selected. The schedule-state signal may encode a slot-selection indicator, e.g., in the example of FIG. 4, a two-bit signal, with each permutation of the two bits-00, 01, 10, and 11—corresponding to one of the four illustrated slots. Other embodiments may have more bits for more slots. The schedule-state signal may be broadcast at a higher power, lower data rate, larger amount of error-correction bits, or a combination thereof, relative to other signals, e.g., data frames, to increase the likelihood of the information encoded in the schedule-state signal reaching relatively distant wireless devices. The schedulers 1318 may initiate the transmission of a schedule-state signal periodically, e.g., some period of less 100 milliseconds, less than 10 milliseconds, or less than 1 second, depending on the acceptable overhead and desired responsiveness of a newly introduced wireless device to the wireless network 1310 of FIG. 13. The timing of the schedule-state signals may include a random or pseudo random countdown to reduce the likelihood of repeatedly colliding wireless-state signals. Other information in the schedule-state signal may include the MAC address of the broadcasting device, the duration of the period between transmissions of the schedule-state signal, which may be used by other devices entering a power-save mode to know when to wake-up for subsequent beacons; a timestamp indicating the current time kept by the broadcasting wireless device, which may be used by other devices to adjust their clocks to match the time reflected in a received schedule-state signal; and information about the capabilities of the broadcasting equipment, such as support for encryption, supported data transmission or reception rates. The schedule-state signals may be broadcast relatively early in the IFS duration to increase the likelihood that their broadcast will not be preempted by other transmissions, e.g., the schedule-state signals may be transmitted during the PIFS, after the SIFS, and before the QIFS or DIFS. The schedulers 1318 in each of the wireless devices 1312, 1314, and 1316 may gather the information, or a subset of the information, encoded in the scheduler-state signal, and a non-cellular interface, such as one of those previously described, may broadcast the signal.

The other wireless devices 1312, 1314, or 1316 may receive the broadcast schedule-state signal through their non-cellular interface and record the encoded information in memory. In some embodiments, one or more of the other wireless devices 1312, 1314, or 1316 may be in a sleep mode, or low-power mode, in which portions of the device are disabled or prevented from drawing power. If these devices have previously received a schedule-state signal, they may have information about the period between schedule state signals from the broadcasting device stored in memory and may count-down from the previous schedule state signal to identify approximately when the next schedule-state signal will be broadcast, at which point, the receiving device may wake up, or enter a higher power mode, to receive the subsequent schedule-state signal. As described further below, each scheduler 18 may retrieve from memory in its associated device information conveyed by the schedule-state signals to select a IFS duration, e.g., one of the slots D1-D4, for the associated device.

In other embodiments, a wireless-state signal is not broadcast, and the schedulers 1318 in the wireless devices 1312, 1314, and 1316 infer the IFS of the devices. For instance, the wireless device 1312 may measure the duration between the end of a data frame transmitted by wireless device 1314 to wireless device 1316 and the beginning of the next data frame sent between the devices to identify the IFS of the wireless device 1312. A similar observation may be used to observe the IFS values of each of the wireless devices in the network 1310. In some embodiments, the observed IFS values may be stored in memory in the observing device.

In the illustrated embodiment, the schedulers 1318 in each wireless device may select an IFS duration for that wireless device based on the IFS durations observed from other devices or broadcast in a schedule-state signal from other devices. For example, to select an IFS duration, the schedulers 1318 may retrieve from memory the most recent IFS durations for each of the other wireless devices in the network 1310 and retrieve from memory the number of slots, e.g., D1-D4 in FIG. 15, for transmission of data frames. Then, the schedulers 1318 may compare the slots against the IFS values retrieved from memory and identify slots that are not used by other wireless devices in the wireless network 1310. Based on this comparison, the schedulers 18 may each select a slot for the wireless device 1312, 1314, or 1316 having that scheduler 1318, and the wireless device may wait an IFS duration that extends until the selected slot between transmission of data frames. In some embodiments, the schedulers 1318 may select the earliest unused slot. The schedulers 1318 may continue to re-use the selected slot indefinitely, e.g., until the network topology or traffic substantially changes. As a result, in certain embodiments, each scheduler 1318 may set a deterministic schedule for transmission of data frames, and each scheduler 1318 may have in memory the IFS values selected by the other schedulers 1318 in the wireless network 1310.

Figure 16:
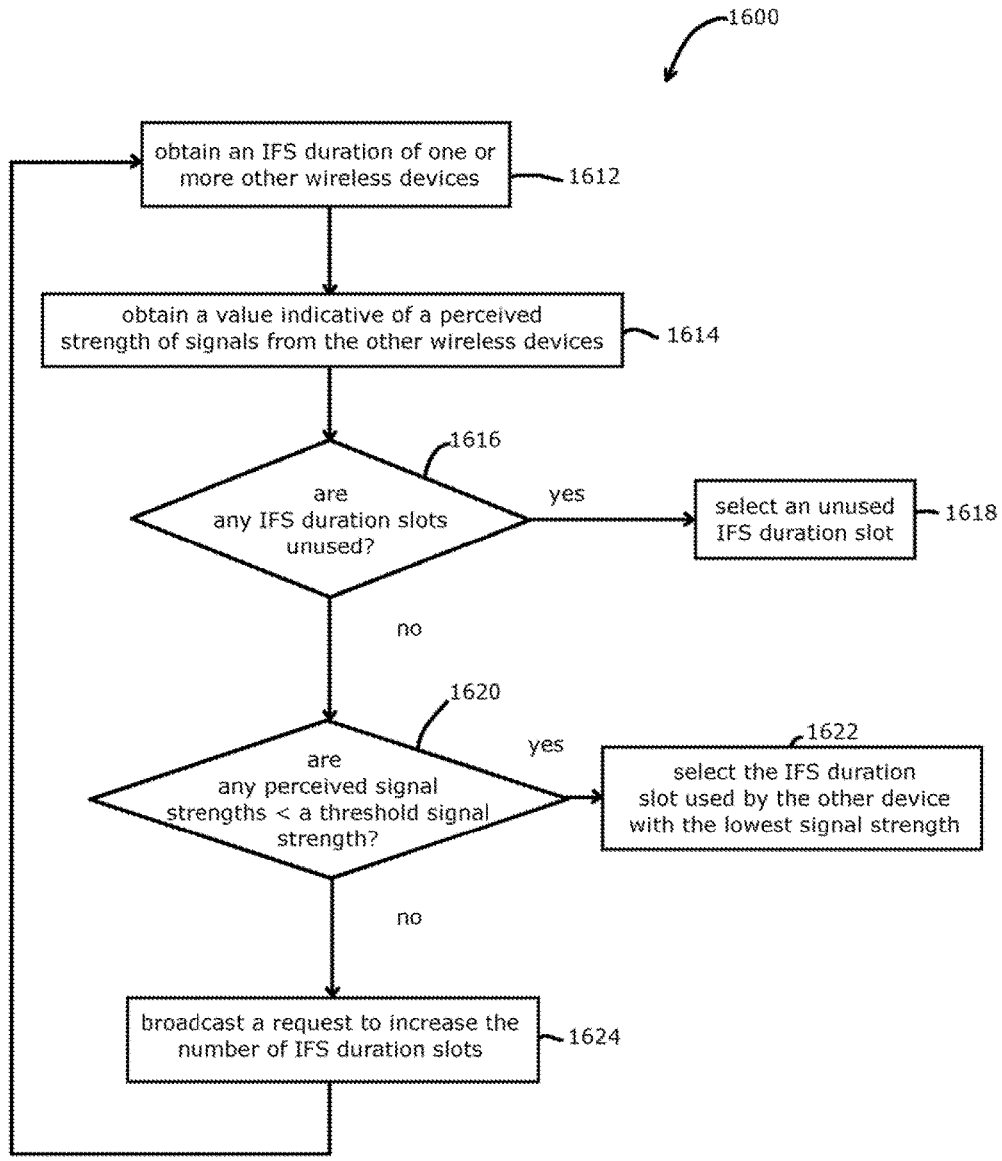
FIG. 16 is an example of a process for selecting a schedule.

In some embodiments, the schedulers 1318 may select a slot that is already in use by another wireless device 1312, 1314, or 1316, thereby potentially causing two devices to transmit data at the same time. The schedulers 1318 may, for example, select a slot that occupied by another wireless device that has a relatively large wireless distance, e.g., signals between the devices are attenuated by geometric distance or by intervening structures, such as walls. An example of a scheduling process 1610 that may cause wireless devices to share slots is depicted in FIG. 16, which illustrates an example of a method for selecting an IFS duration with a deterministic scheduler. The process 1610 may be performed by, or at the direction of, the previously described scheduler 1318 in a wireless device, for example, and each wireless device in a wireless network, e.g., a non-cellular network, may perform the process of FIG. 16.

As shown in step 1612 of FIG. 16, the scheduling process in this embodiment includes a step of obtaining the IFS duration, e.g., a value indicative of the IFS duration, of one or more other wireless devices. Obtaining the IFS durations may include receiving schedule-state signals from the other devices or observing the IFS duration used by the other devices. In some embodiments, the number of slots available may also be received in the scheduler-state signal or observed, e.g., by observing gaps between used IFS duration slots, and stored in memory. Each obtained IFS duration may be stored in memory and associated with an identifier of the wireless device using that IFS duration, e.g., in a row of a table or as attributes of an object.

As shown in step 1614, in some embodiments, each wireless devices 1312, 1314, and 1316 (of FIG. 13) may sense, e.g., through its non-cellular interface, the strength of non-cellular signals received from other wireless devices 1312, 1314, or 1316, and store a signal-strength value indicative of that perceived signal strength in memory such that the signal-strength value is associated with the IFS duration used by the device that is characterized by the signal-strength value, as shown in step 46. For instance, the scheduler 1318 in wireless device 1312 may store in a table or other database a as attributes of an object the MAC address, signal-strength value, and the IFS duration for each of wireless devices 1314 and 1316. The perceived signal strength is the strength of signals from other wireless devices at a wireless device performing the steps of process 1614.

Next in the present embodiment is a step 1616 of determining whether any IFS duration slots are unused by the other wireless devices. This step may include recalling the obtained IFS durations in use from memory and recalling from memory a number of available slots presently available. If an unused slot is available, in response, the process 1600 proceeds to the step labeled 1618, and one of the unused IFS duration slots is selected. If an unused slot is not available, in response, the process 1600 proceeds to the step labeled 1620. In some embodiments, the decision step 1616 may be performed before the step labeled 1614, and the step labeled 1614 may be inserted between the "no" output of the step labeled 1616 and the step labeled 1620.

In the step 1620, the process 1600 determines whether any of the obtained values indicative of a perceived signal strength indicate that any of the perceived signal strengths are less than a threshold. In some embodiments, the threshold may be an amplitude of signal strength. In other embodiments, the threshold and perceived values may be a signal to noise ratio or a combination of signal to noise ration and a signal strength, e.g., an aggregate value or each value may be compared against a different threshold to determine whether the value is below the corresponding threshold. If the response to step 1620 is yes, in response, the process 1600 proceeds to the step labeled 1622, and the IFS duration slot used by the other wireless device having the lowest perceived signal strength is selected, thereby causing both the device performing the process 1600 and the wireless device having the lowest perceived signal strength to share the same IFS duration slot.

In some embodiments, having wireless devices with weak perceived signal strengths share the same IFS duration slot may increase the throughput of a wireless network. The weak perceived signal strengths are believed to indicate that the devices can transmit in parallel, e.g., at the same time, or at overlapping times, and their transmitted signals will not interfere to such a degree that the transmitted signals are irresolvable at the receiving devices. For instance, if two wireless devices have a relatively large wireless distance, in the present embodiment, they may both transmit data frames at the same time, thereby potentially moving move data in a given amount of time across the medium than systems in which parallel transmission is prohibited.

If the response to the step labeled 1620 is "no," in response, the process proceeds to the step labeled 1624, and a request is broadcast to increase the number of IFS duration slots. For instance, request may ask that the number of slots may be increased by a multiple of two so that a single additional bit in a schedule-state signal can indicate which IFS duration slot is selected by a given wireless device in the new schedule with an increased number of slots. The request may be broadcast as part of the schedule-state signal of the device performing the process 1600 or as part of some other signal. e.g., some other management frame.

The wireless devices performing the process 1600 may use the selected IFS duration slots in accordance with the techniques described above to scheduler the transmission of data frames. For instance, each device may wait until after its selected IFS duration slot after a data frame has been transmitted before attempting to transmit a data frame.

In other embodiments, the schedules for traffic may be asymmetric between uplink and downlink traffic, as described below. For example, a first wireless device may use a first inter-frame spacing value when sending data to a second wireless device. And the second wireless device may a second inter-frame spacing value when sending data to the first wireless device. As described in greater detail above, an inter-frame spacing value is the time a wireless device waits after the current wireless frame has been transmitted before transmitting another wireless frame. The inter-frame spacing values may be different and the difference may be selected to prioritize uplink traffic over downlink traffic or vice versa.

As previously noted, embodiments of the previous techniques may be useful for conserving spectrum when the same wireless spectrum is used for wireless communication, e.g., communication in either direction, i.e. from the first device to the second device and from the second device to the first device. As explained, in certain embodiments, if the first device senses that the second device is sending it a wireless frame, the first device will defer transmitting a frame to the second device to prevent a wireless collision and facilitate inter-device communication. And in these embodiments, if the second device senses that the first device is sending it a wireless frame, the second device will defer transmitting a frame to the first device to prevent a wireless collision and facilitate inter-device communication. In this example, the first device is using the first inter-frame spacing value (i.e., an IFS duration slot) and the second device is using the second inter-frame spacing value. Therefore, in this example the first device may wait for the first inter-frame spacing value of time after the current interfering wireless frame has been transmitted before sending its wireless frame. Similarly, the second device may wait for the second inter-frame spacing value of time after the current interfering wireless frame has been transmitted before sending its wireless frame.

If the two inter-frame spacing values are the same, a collision may occur. However, the two inter-frame spacing values could be different, and in that case a collision will not occur. For example, if the first inter-frame spacing value is less than the second inter-frame spacing value, the first device will start transmitting its wireless frame before the second wireless device. In this example, the second wireless device will sense the channel as busy and can defer its own transmission to prevent a collision and facilitate inter-device communication. Thus, in some embodiments, media access contention may be resolved between the first and second device without any centralized control and without incurring any additional overhead. This technique may be applicable both to single-hop non-cellular networks and hybrid multi-hop cellular networks. For instance, asymmetric scheduling is believed to be very useful for certain hybrid multi-hop cellular system architectures because the technique takes advantage of the true nature of cellular network traffic.

Cellular network traffic can be classified as uplink and downlink traffic. Uplink traffic flows from a wireless device towards a base station. Downlink traffic flows from a base station towards a wireless device. In a multi-hop cellular network, such flows can consist of one or more hops. Examples of some possible uplink and downlink paths are shown in FIG. 17, though it should be kept in mind that embodiments of the present techniques are applicable in both single hop and multi-hop networks.

Figure 17:
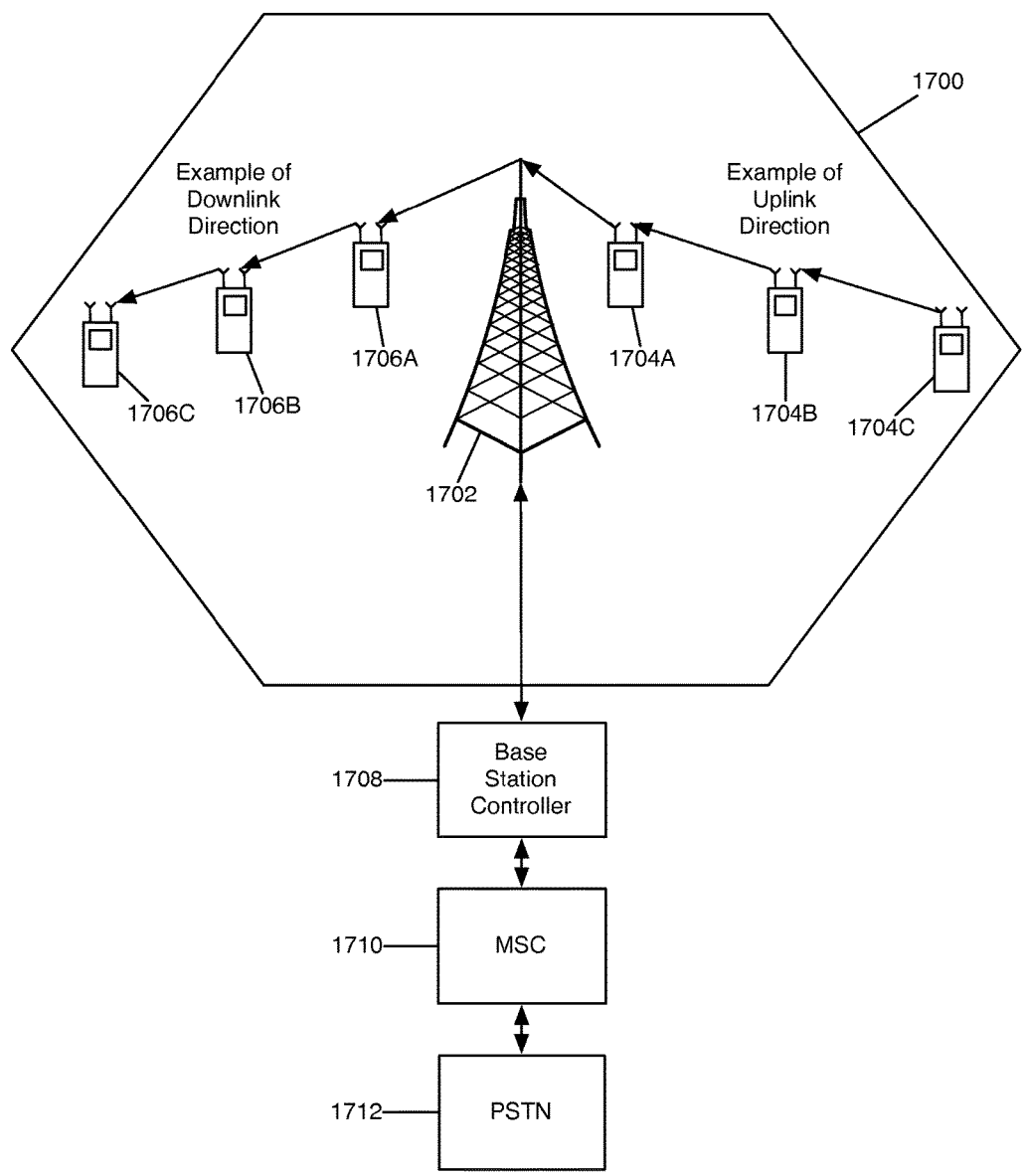
FIG. 17 is an example of a multi-hop network.

Referring to FIG. 17, FIG. 17 is a generalized diagrammatic view of a cell 1700 in a wireless cellular telephone network in accordance with a multi-hop embodiment. It is noted that only a single cell 1700 in a cellular network is depicted for ease of understanding. The principles of the presently described techniques are not limited to any particular number of cells in a particular cellular telephone network. Cell 1700 in a wireless cellular telephone network may be about ten (10) square miles in area. Each cell 1700 in a cellular telephone network may include a base station controller 1708 that has a tower 1702 for receiving/transmitting with wireless devices 1704A-C and 1706A-C (e.g., cellular phones, netbooks, personal digital assistants, laptop computers). In accordance with an embodiment, wireless devices 1704A-C and 1706A-C are configured to communicate with base station 1708 over "multiple hops," "Multi-hopping," as used in this example, refers to the process whereby a wireless device 1704 or 1706 is able to communicate with base station 1708 via one or more other wireless devices 1704A-C or 1706A-C. Referring again to FIG. 17, base station 1708 may be connected into the public land mobile network (PLMN) 1712 via a mobile switching center (MSC) 1710. Each carrier may have a mobile switching center (MSC) 1710 that controls all of the base station controllers 1708 in the city or region and controls all of the connections to the land based PLMN 1712.

FIG. 17 shows some possible uplink and downlink paths wireless traffic or wireless frames. As shown in FIG. 17, wireless devices 1704A, 1704B and 1704C may form a multi-hop uplink path. As shown in FIG. 17, wireless devices 1706A, 1706B and 1706C may form a multi-hop downlink path. Although the amount of uplink and downlink traffic can vary considerably depending on the deployment and usage scenarios, usually the amount of downlink traffic is expected to exceed the amount of uplink traffic in traditional consumer wireless networks. As described below, this traffic pattern may be exploited by using an asymmetric scheduler, e.g., first inter-frame spacing value for downlink traffic flow and a second inter-frame spacing value for uplink traffic flow.

In the illustrated exemplar network, the amount of uplink traffic is generally less than the amount of downlink traffic. In that case, if the first inter-frame spacing value is more than the second inter-frame spacing value, whenever devices have uplink traffic and downlink traffic to send to each other, the uplink traffic will win because it will use a lesser inter-frame spacing value. Under certain traffic patterns, the downlink traffic will mostly occupy the wireless channel. In embodiments in which uplink traffic is favored, when the occasional uplink traffic wireless frame needs to be transmitted, it will get priority over any competing downlink traffic wireless frames. In this example, the occasional uplink traffic wireless frame will be transmitted without causing a collision with a competing downlink traffic wireless frame. Moreover, in certain embodiments, no extra contention resolution transmissions are needed to co-ordinate uplink and downlink traffic flows. Other schemes, such as the randomized back-off algorithm, may be combined with this technique to further mediate access to the shared wireless channel, examples of which are described below.

It should be noted that a base station is also a kind of wireless device. And certain embodiments of the presently described technique may be applied to a base station driven wireless network. In a traditional base station driven wireless network, traffic flowing from the base station to a wireless device can be thought of as the downlink direction and traffic flowing from a wireless device to the base station can be thought of as the downlink direction. For simplicity to explain this embodiment, it can be assumed assume that the base station and other wireless devices use the same wireless spectrum for uplink and downlink traffic. For example, if the amount of downlink traffic is usually more than the amount of uplink traffic, the wireless devices in the network may use a first inter-frame spacing value for the downlink traffic that is higher than a second inter-frame spacing value for the uplink traffic. In this embodiment, the base station may send the more frequent downlink traffic wireless frames to the other wireless devices with reduced contention relative to a system with a symmetric schedule. When the other wireless devices need to send the occasional uplink traffic wireless frame to the base station, in this embodiment, the other devices may do so with higher priority than any competing downlink traffic wireless frames without a substantial increase in medium access contention.

Embodiments of the presently described technique may facilitate a decentralized contention resolution mechanism and may tend to increase opportunities for the base station to successively keep sending downlink wireless frames to the other wireless devices until the base station senses the wireless channel to be busy. The wireless channel could be sensed as busy when another wireless device may have started sending an uplink wireless frame to the base station.

Certain real-world scenarios could get more complicated where more than one base station could be operating in the same spectrum. Some embodiments may make use of a common wired network connecting the base stations. In this embodiment, the base stations may communicate and co-ordinate over this common network, and the base stations may agree to media access schedules and do contention resolution amongst themselves over this common network.

In this way, the downlink traffic could be coordinated amongst interfering base stations. As an example, the uplink traffic from wireless devices may use a lower inter-frame spacing value than the downlink traffic. Uplink traffic could further facilitate contention resolution using a randomized back-off algorithm, e.g., such as the technique described above using random or pseudo random countdowns. In this example, since the downlink traffic rate is typically higher than the uplink traffic rate, embodiments using base station coordination may facilitate relatively efficient scheduling for the heavy downlink traffic. Moreover, in this embodiment, the light uplink traffic may be scheduled in between transmissions of downlink traffic without any, or with relatively little, centralized control or extra overhead. Furthermore, multi-hopping could allow only devices that have good signal from a base station to communicate directly with the base station. In this embodiment, the other wireless devices may indirectly communicate with the base station by hopping onto nearby wireless devices. Thus this example shows how the presently described embodiment could improve the performance of wireless networks in general and multi-hop cellular networks in particular. Though it should be noted that not all embodiments described herein use this technique or provide these benefits.

This approach may be further be combined with other common multiple access and contention resolution approaches to reduce the need for centralized scheduling or decentralized co-ordination overhead. Additionally, in some embodiments, wireless devices could transmit downlink wireless frames continuously for a longer amount of time than uplink wireless frames. The opposite may also be implemented depending on the situation. Moreover, when this approach is combined with the randomized back-off algorithm, downlink traffic may be scheduled with lower contention windows than uplink traffic. The opposite may also be implemented depending on the situation.

In some systems, it may be desirable to prioritize downlink data. For instance, as noted above, network traffic through certain wireless devices is heavily skewed toward downlink traffic relative to uplink traffic through those wireless devices. For instance, it is common for an access point in a non-cellular wireless network to transmit relatively large media files retrieved over a wired internet connection as downlink data to a client wireless device. The client wireless device may transmit relatively sparse uplink traffic including ACK frames and frames requesting additional data. A symmetric scheduler, e.g., some ERB schedulers, may provide, on average, similar IFS durations to both uplink and downlink transmissions. However, this may be sub-optimal in some scenarios because the uplink transmitting client device may use relatively few of its IFS duration slots, causing the downlink transmitting access point to wait unnecessarily for unused IFS duration slots for the client wireless device.

This issue may be mitigated in certain embodiments described below, which may use a distributed non-deterministic scheduler that schedules uplink and downlink traffic asymmetrically. In certain embodiments described below, a subset of the IFS duration slots may be reserved for downlink traffic or the algorithm used to select a random number may be weighted to favor earlier IFS durations slots for downlink traffic.

Figure 18:
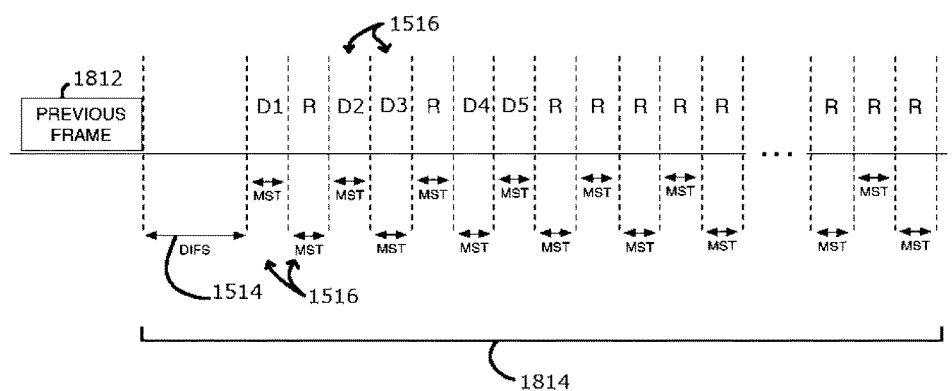
FIGS. 18 and 19 are more examples of schedules for mediating access to a wireless medium.

FIG. 18 is a timing diagram that illustrates an example of a scheduling method in which IFS duration slots are randomly or pseudo randomly selected and certain slots are reserved for downlink traffic. The illustrated example is similar to that of FIG. 15 except that slots labeled D1-D5 are reserved for downlink traffic. As with the example of FIG. 15, an IFS duration includes a DIFS base period 1514 after a previous data frame 1812 plus some variable portion 1814 that varies from device to device referred to as a contention window, examples of which are described by the IEEE 801.11n standard. The variable portion 1814 may be quantized into slots 1516 that are one MST long, and a scheduler may select among these slots 1516 to reduce the likelihood of a collision when transmitting data frames.

As noted above, in this example, certain slots D1-D5 are reserved for downlink traffic. A wireless device may determine whether it is an access point or whether a substantial portion of the network traffic, e.g., more than 80%, more than 95%, or more than 99%, is flowing from it to other devices. Based on this determination, the schedulers in the wireless network may reserve certain slots D1-D5 for downlink traffic. To select a slot, a scheduler may first calculate a random or pseudo random number, e.g., with a liner shift register or with network noise. Then the scheduler may determine whether slots are reserved for downlink traffic. If slots are reserved for downlink traffic, the scheduler may determine whether data frames to be transmitted, e.g., in a buffer of the wireless device, are downlink data or uplink data. If the data frames are downlink data, the scheduler may map the random number or pseudo-random number to the reserved slots D1-D5, e.g., D1 may map to a random number of 1 and D5 may map to a random number of 5. If the data frames are uplink data, the scheduler may map the random number or pseudo random number to one of the other IFS duration slots not reserved for downlink data using a similar mapping. Then the scheduler may countdown through the uplink or reserved downlink slots with the same technique described above with reference to FIG. 15 and when the countdown is complete, the wireless device may transmit the data frame.

The illustrated example includes five slots reserved for downlink data. Other embodiments may include more or fewer. The distribution of reserved downlink slots D1-D5 is generally earlier than the distribution of non-downlink-reserved slots in this embodiment, e.g., the median and average IFS duration of the downlink reserved slots is less than the median and the average IFS duration of the non-downlink reserved slots. Consequently, the downlink transmitting wireless device is expected to spend less time waiting for unused IFS duration slots for uplink client wireless devices. In this embodiment, the downlink reserved slots D1-D5 are interrupted by occasional non-downlink reserved slots, e.g., between D1 and D2 and between D3 and D4. The interruptions are believed to permit uplink transmissions to eventually be transmitted, even if downlink data transmissions are favored, e.g., assigned higher priority. In some embodiments, the first slot may be unreserved.

Further, in this embodiment, the schedules are still formed without centralized control. Each scheduler, e.g., the schedulers 1318 of FIG. 13, may select an IFS duration in accordance with this technique prior to the transmission of data frames or after transmitting a number of data frames.

Other embodiments may have asymmetric distributed schedulers that do not use reserved slots. For instance, the output of a random number generator or pseudo-random number generator may scaled, e.g., multiplied by a weighting coefficient, to make the numbers for uplink data generally larger or the numbers for downlink data generally smaller. In another example, for downlink data, the random or pseudo-random number may be mapped to an output with a function that generally decreases monotonically. In other embodiments, e.g., in embodiments in which uplink data is more voluminous, uplink data may be favored in the manner described above.

Some embodiments may change the degree to which traffic in one direction is favored dynamically. For instance, some embodiments may select a number of reserved slots for downlink traffic or a timing of those slots, e.g., generally earlier, in response to an increase in the ratio of downlink traffic to uplink traffic. Similarly, some embodiments may favor uplink traffic over downlink traffic in response to an inversion of the ratio of uplink traffic to downlink traffic. To this end, the scheduler in certain embodiments may count the number of uplink transmissions and the number of downlink transmissions occurring over a trailing period of time, e.g., over the previous 1 second, 10 seconds, or 10 minutes, and select a degree of asymmetry based on a ratio of these uplink and downlink counts.

In other embodiments, the above described scheduling techniques may be combined. For instance, the wireless terminal, e.g., through the operation of a scheduler, may choose a deterministic schedule for transmitting the first type of data and a randomized schedule for transmitting the second type of data, wherein the choice of schedule could be based on at least one of the following factors: schedules of nearby devices, queue-lengths, quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, and surrounding wireless environment.

In one embodiment, the wireless terminal may choose a deterministic schedule for transmitting the first type of data and a randomized schedule for transmitting the second type of data, wherein the type of data is based on at least one of the following factors: direction, quantity, importance, desired quality-of-service, surrounding wireless environment, network congestion, network condition, queue-lengths, and throughput. For example, each of, or a subset of, these factors may be compared against respective threshold values or categories and if a factor satisfies the threshold or falls in the category, the device may select a deterministic schedule and if the threshold is not met or the category is not applicable, the device may choose a random schedule. Depending on the application, the direction could be either uplink or downlink. Quantity may be defined in terms of bandwidth utilized, bandwidth needed, and queue-lengths, of example. Quality-of-service may depends on the application being supported. For example, delay sensitive applications such as voice could benefit from a more deterministic schedule and file transfers could use a randomized schedule when not too many deterministic slots are available. Surrounding wireless environment could include the topology, prevalent traffic patterns, activity factors, schedules, numbers, needs, and capabilities of nearby nodes. The surrounding wireless environment could also include network factors, such as the amount of congestion in the network and the condition of the network in terms of latency, delay, and jitter.

In the above embodiment, the wireless terminal could choose a deterministic schedule and a first inter-frame spacing for transmitting the first type of data. The wireless terminal could also choose a randomized schedule and a second inter-frame spacing for transmitting the second type of data. As noted above, inter-frame spacing is the delay between the previous frame and the next transmission. For example, the IEEE 802.11n standard defines examples of inter-frame spacing (IFS) in detail.

In the above embodiment, the wireless terminal may choose a deterministic schedule and a first contention window for transmitting the first type of data. The wireless terminal could choose a randomized schedule and a second contention window for transmitting the second type of data. Contention window is an interval of numbers from which counters can be chosen to resolve contentions and collisions between wireless devices. As noted above, the IEEE 802.11n standard describes examples of contention window in detail.

In the above embodiment, the wireless terminal, e.g., a scheduler in the wireless terminal, may choose a deterministic schedule and a first transmit opportunity for transmitting the first type of data. The wireless terminal may choose a randomized schedule, e.g., an ERB schedule, and a second transmit opportunity for transmitting the second type of data. Transmit opportunity is the time for which a wireless device gets to access the wireless channel and transmit frames. Transmit opportunity could also be measured in bits and bytes instead of units of time. The IEEE 802.11n standard describes examples of transmit opportunity in detail.

Figure 19:
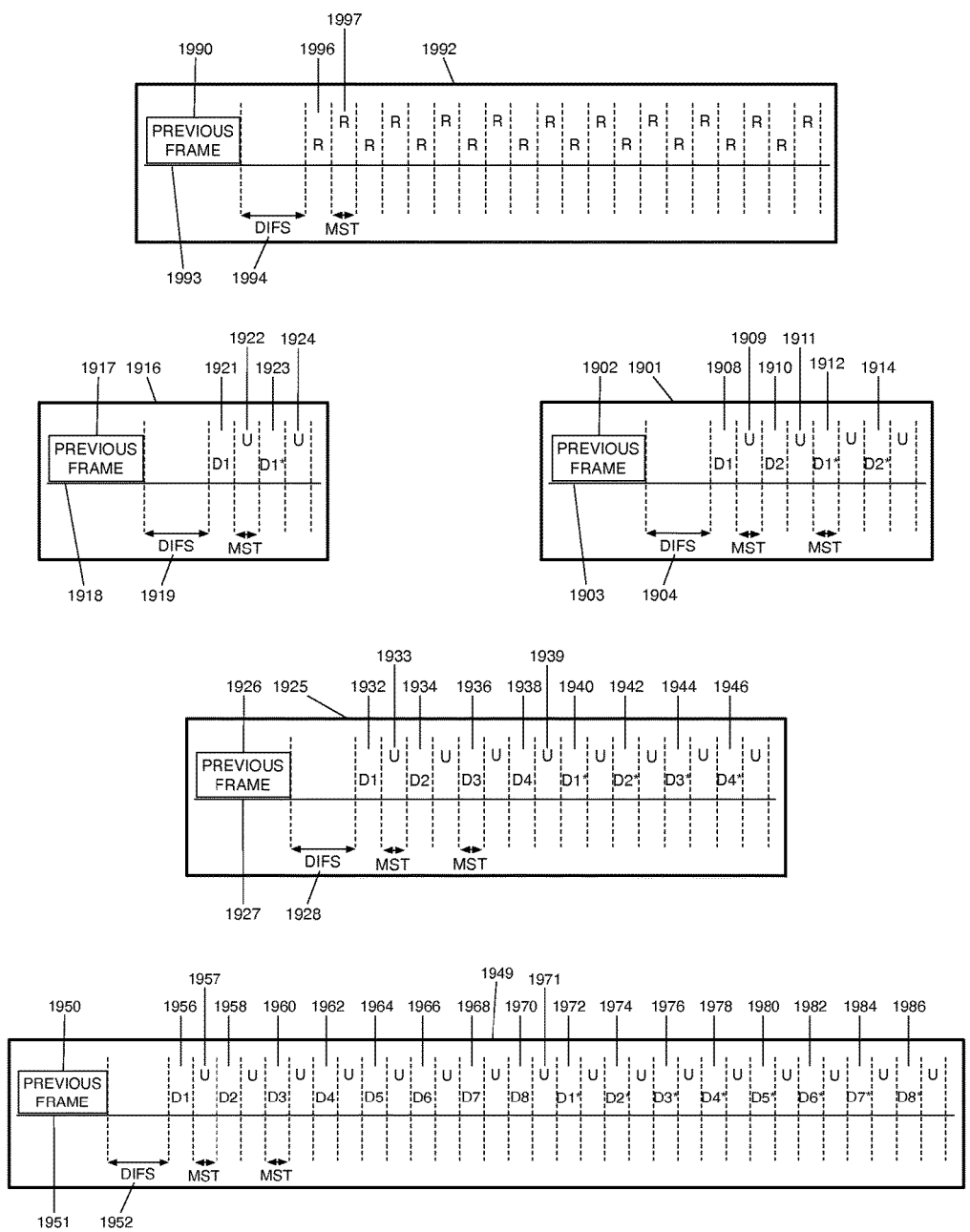
Figure 20A:
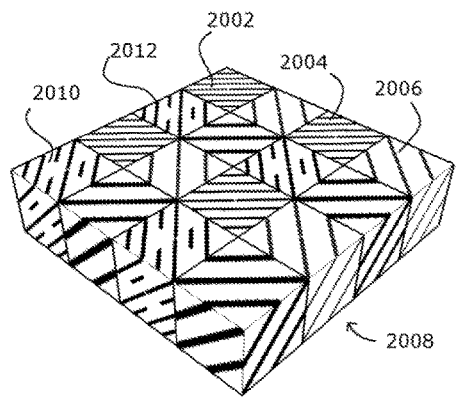
FIGS. 20A-D are examples of a schedule selections for various network topologies.
Figure 20B:
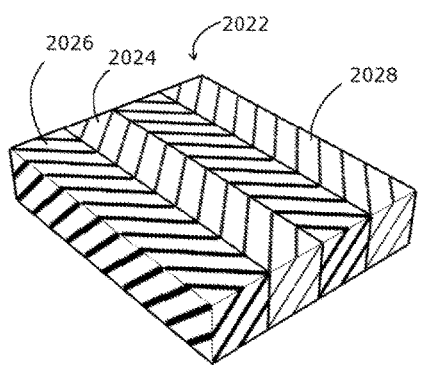
Figure 20C:
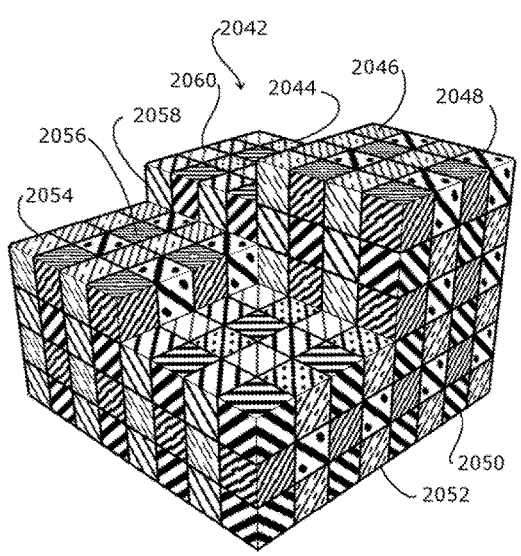
Figure 20D:
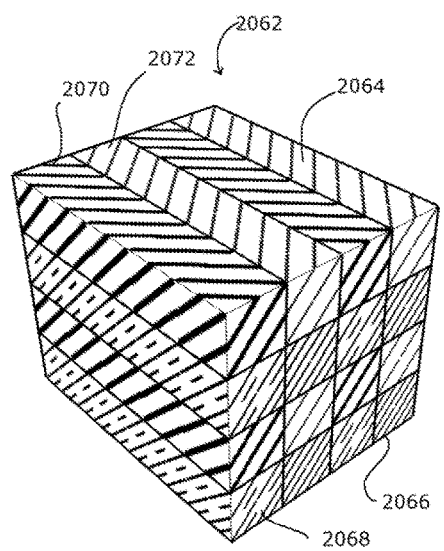

FIG. 19 is a generalized diagrammatic view of an example of schedules for wireless transmissions by wireless terminals in accordance with an embodiment of the presently described technique. In this embodiment, schedule 1992 is based on a contention resolution mechanism known as exponential randomized back-off (ERB) that was described in part above. Timeline 1993 shows the progression of time. Previous frame 1990 could be a data, control, or management frame. A distributed-IFS (DIFS) 1994 may separate the previous frame and the first mini-slot 1996 in this example. Further, in this embodiment, each mini-slot is mini-slot-time (MST) long. When a wireless device needs to transmit a frame on the wireless channel, in accordance with the schedule 1992, it may choose a random (e.g., a pseudo-random function) counter and counts it down each time MST elapses. In some embodiments, a wireless device may only count down its counter when it perceives the wireless channel to be available or clear. The illustrated schedule 1992 is symmetric between downlink and uplink, as the distribution of potential IFS duration slots is generally equal between the two directions, e.g., there is an equal chance that any one of the IFS duration slots will be selected for uplink or downlink traffic.

In contrast to schedule 1992, schedule 1949 of FIG. 19 is asymmetric and may be used, e.g., by a scheduler, to schedule different data in different ways. First mini-slot 1956 may be reserved for a first downlink transmitter, e.g., an access point or relay in a multi-hop network. Second mini-slot 1957 may be available for any wireless device to use. Thus, in this example, every odd mini-slot is reserved for one or more transmitters of downlink frames. This is believed to allow for various transmitters of downlink frames to use a more deterministic schedule, as explained further below. However, in some systems, any wireless device can access the channel in every even mini-slot. To resolve contentions and collisions, wireless devices could use ERB to select among the even IFS duration slots. This, in certain applications, this is believed to make wireless devices transmitting in even mini-slots to have a randomized or pseudo random schedule. For instance, wireless devices could use the even mini-slots to transmit uplink frames. In other embodiments, instead of differentiating traffic based on uplink and downlink directions, traffic may be differentiated based quantity, importance, desired quality-of-service, surrounding wireless environment, network congestion, network condition, queue-lengths, and throughput.

It should be noted that mini-slot 1956 is labeled D1 and mini-slot 1972 is labeled D1*. In this embodiment, the * indicates that D1* is an extra slot for the downlink transmitter that uses D1. One way to facilitate fairness between transmitters of downlink frames is to require the following allocation of traffic between D1 and D1* (or Dx and Dx*, where x is an integer). After using mini-slot D1, the first downlink transmitter may either wait for the current round of downlink transmitters to finish or use D1*. Since D1* comes after D8, the downlink transmitter corresponding to D8 is able to get access to the wireless in a fair manner, e.g., the wireless device using D1 does not always have an opportunity to preempt those using D2-D8. Moreover, in this embodiment, the overhead of a few MSTs to facilitate this fairness coexistence is not expected to hurt the performance much. If in this embodiment the first downlink transmitter uses D1*, that first wireless device may not use D1 in the next round for downlink transmitters. Thus, in this example, the first downlink transmitter is relatively fair to other downlink transmitter. Once an extra downlink slot (marked with a *) is used by a wireless device, other wireless devices can assume that the current round of downlink transmitters is over and the next round is about to begin. In the next round, wireless devices can use their normal downlink slots (i.e. slots without a *) to transmit frames.

Schedules 1901 and 1925 are other asymmetric schedules that can also be used. The schedules 1901 and 1935 differ from schedule 1949 in the number of slots available for downlink transmissions is reduced. These schedules 1901 and 1925 may, for example, be used when relatively few wireless devices are transmitting downlink data.

FIG. 20 is a generalized diagrammatic view of examples of wireless network topologies in accordance with an embodiment. Topology 2002 is an example of a 2-dimensional single-hop topology. Each cube, such as cube 2012, represents a base station and the wireless network surrounding it. If base stations in adjacent cubes use the same network resources at the same time, they may interfere with each other due to clashes. To achieve a certain level of performance, adjacent base stations can be orthogonalized in time, frequency, code, space, etc. Topology 2002 shows that 4 orthogonalizations could provide a certain level of performance and keep the cross-interference between nearby base stations under an acceptable threshold limit. Orthogonalizations 2004, 2006, 2008, and 2010 are shown in different colors to reflect their use of different network resources. Topology 2022 is an example of a 2-dimensional multi-hop topology. Each parallelepiped, such as parallelepiped 2028, represents a linear multi-hop network consisting of three or more wireless terminals. If wireless terminals in adjacent parallelepiped use the same network resources at the same time, they may interfere with each other due to clashes. To achieve a certain level of performance, adjacent base stations can be orthogonalized in time, frequency, code, space, etc. Topology 2022 shows that 2 orthogonalizations could provide reasonable performance and keep the cross-interference between nearby wireless terminals under a reasonable limit. Orthogonalizations 2024 and 2026 are shown in different colors because to indicate that the use of different network resources, e.g., time slots or channels. Topology 2042 is a common 3-dimensional single-hop topology and uses 8 different orthogonalizations. Topology 2062 is a common 3-dimensional multi-hop topology and uses 4 different orthogonalizations. In wireless networks, spectrum is often limited. Thus, excessive orthogonalizations may hurt the overall capacity and spectral efficiency of the wireless network. However, too few orthogonalizations may lead to excessive interference and clashes and thus hurt performance. FIG. 20 represents one way to strike a balance and achieve reasonable performance. The asymmetric schedules shown in FIG. 19 have 2, 4, or 8 orthogonal downlink slots and thus can be used for the common topologies shown in FIG. 20 to facilitate cooperation and coexistence between wireless terminals. When downlink slots of schedules in FIG. 19 are assigned to segments of the topologies shown in FIG. 20, one may take into account the relative positions of the segments and assign downlink accordingly. For example, segments of topologies that will be prone to cell-edge user problems or hidden node problems can be separated further apart in the asymmetric downlink schedule. This can allow enough control frames (such as IEEE 802.11 RTS/CTS frames) to be exchanged to mitigate the cell-edge user and hidden node problems.

FIG. 21 is a generalized diagrammatic view of wireless transmissions by wireless terminals in accordance with an embodiment. Schedules 2101, 2125, and 2149 are some other examples of asymmetric schedules. These differ from asymmetric schedules shown in FIG. 19 in that they do not rely extra downlink slots (* marked) to facilitate fairness. These schedules could be more suitable in certain situations, for instance, when it is desired that certain access points or relaying devices are consistently prioritized over others.

FIG. 22 is a generalized diagrammatic view of wireless transmissions by wireless terminals in accordance with an embodiment. Schedules 2201, 2225, and 2249 are some other examples of asymmetric schedules. These can be thought of as a hybrid of schedules shown in FIG. 19 and FIG. 21. These schedules could be more suitable in certain situations.

FIG. 23 is a generalized diagrammatic view of wireless transmissions by wireless terminals in accordance with an embodiment. Schedules 2301, 2325, and 2349 are some other examples of asymmetric schedules. Schedule 2301 is an example in which downlink and uplink mini-slots are not interleaved like the schedules in FIG. 19. However, to exploit asymmetry in topologies and traffic patterns, downlink and uplink may be decoupled in the way shown in schedule 1901. Moreover, in some embodiments, uplink mini-slots may have a lower inter-frame spacing in schedules such as 2325. Lastly, in some embodiments, downlink schedules may not be deterministic in order to get reasonable performance. For instance, in some systems, as long as they are decoupled, both uplink and downlink transmissions could be randomized as is shown in schedule 2349. Schedules shown in FIG. 23 could be more suitable in certain situations.

Using the above examples, wireless terminals could adaptively switch from one schedule to another schedule depending on topology, number, schedules, needs, activity, and traffic patterns of other nearby wireless terminals. Beacons, control frames, management frame, data frames, or other wireless communicating signaling, such as the previously described schedule-state signal, may be used to emanate topology, number, schedules, needs, activity, and traffic patterns of nearby wireless terminals to other wireless terminals. Moreover, wireless terminals may cooperate and coordinate to converge to one or more schedules based on at least one of the following factors: quality of nearby sinks and relays, quantity of nearby sinks and relays, battery life, source of power, average throughput, bandwidth usage, bandwidth needs, bandwidth availability, type of device, level of mobility, time of day, subscription fees, user profile, non-cellular signal strength and quality, cellular signal strength and quality, level of wireless interference seen by non-cellular interface, level of wireless interference seen by cellular interface, number of hops to a sink, current state of the second device, current state of the first device, participation policy being used by the second wireless device, participation policy being used by the first wireless device, and surrounding wireless environment.

In some embodiments, request (REQ) frames may use a different inter-frame-spacing than other frames, e.g., a shorter inter-frame spacing. An example of a REQ frame is depicted in FIG. 32. REQ frames may be used by nearby nodes, e.g., wireless devices, to get a node to use ERB scheduling or use a less aggressive schedule, e.g., to request a transition from the schedule 1901 to schedule 1949 of FIG. 19. In some embodiments, crowdsourcing of REQ frames and various requests from nearby nodes could be used before acting on requests, e.g., each scheduler may change the schedule in response to a majority of wireless devices requesting a transition to a more aggressive or less aggressive schedule. This, in some systems, is expected to increase robustness, performance, and cooperation.

When asymmetric scheduling does not lead to good performance and throughput, e.g., when even the lease aggressive schedule does not provide enough IFS duration slots for downlink-transmitting wireless devices, wireless terminals may adaptively fall back to using exponential randomized back-off scheduling. Depending on their needs and current network conditions, wireless terminals in some embodiments may adaptively switch to normal, conservative, and/or aggressive schedules. Schedule 1901 could be considered more aggressive than schedule 1949 in FIG. 19 because wireless terminals could potentially get deterministic slots to transmit more frequently in this embodiment, as the schedule provides for more slots among which to select. Moreover, higher transmit opportunities (TXOP) may be provided to nodes that need more bandwidth. In this way, nodes using deterministic IFS duration slots could get different priorities by using different TXOPs. TXOP uses a cyclic-redundancy-check for each fragment even if continuously burst out or with reduced inter-frame spacing (RIFS), which may be less than SIFS, e.g., RIFS may approximately equal 9 us and SIFS may approximately equal 16 us. This could improve robustness, especially for higher rates because more bytes are sent through while using the same number of symbols (or TXOP time). In some embodiments, when interfering deterministic flows are allowed to happen in parallel, flows using higher physical-layer rates may transmit more number of bytes in the same amount of time than flows using lower physical-layer rates. Thus, more frame aggregation could be needed for flows using higher physical-layer rates when employing TXOP. Thus, having more frequent CRC checks for flows using higher physical-layer rates could be useful.

The above described embodiment may benefit from decoupling of the first type of data and the second type of data, e.g., downlink an uplink data. For example, wireless networks that are used to access the Internet could have two types of data or traffic: downlink traffic and uplink traffic. Often, transmitters of downlink traffic are fewer in number than transmitters of uplink traffic. For example, one wireless base station could be serving several wireless devices. In this example, the downlink direction is from the wireless base station to the wireless devices and the uplink direction is from the wireless devices to the wireless base station.

Although there are often fewer transmitters of downlink traffic, downlink Internet traffic often tends to be heavier than uplink Internet traffic.

The above-described embodiment may allow nodes in the wireless network to decouple the plane of competition for IFS duration slots between uplink and downlink traffic. As a result, in some systems, uplink traffic competes with other uplink traffic and downlink traffic competes with other downlink traffic for access to the wireless channel. Moreover, the few downlink transmitters can then coordinate and cooperate with each other to coexist on the same wireless channel. Furthermore, adding determinism to scheduling of downlink frames is expected to reduce contentions and collisions between transmitters of downlink frames. Also, determinism is expected to further reduce the penalties and overheads associated with retransmissions. Lastly, in some systems, determinism may allow more downlink flows to happen in parallel, allowing downlink transmitters to use the available network resources more aggressively and efficiently.

Uplink Internet traffic is often less heavier than downlink Internet traffic. Moreover, the number of transmitters for uplink traffic is often more than the number of transmitters for downlink traffic. Thus, it is often harder to coordinate the several transmitters of uplink traffic in a distributed manner with low overhead. ERB may be used to resolve contentions and collisions between transmitters of uplink traffic in a simple and distributed manner. Moreover, since uplink traffic flows will often be less heavy, wireless devices will not suffer from the disadvantages of ERB that occur during high traffic congestion. Thus, the above-described embodiment could be useful in wireless networks that are used to access the Internet, such as single-hop broadband networks and multi-hop cellular networks.

As mentioned before, when heavier flows are scheduled more deterministically, better coordination and cooperation can be achieved between transmitters of downlink frames. This coordination and cooperation could then be used to allow multiple interfering transmissions to happen in parallel to improve the performance of wireless networks. However, the above invention could be used to mitigate hidden node problems (an example of which is described below) by exploiting the determinism of heavier flows.

Figure 24:
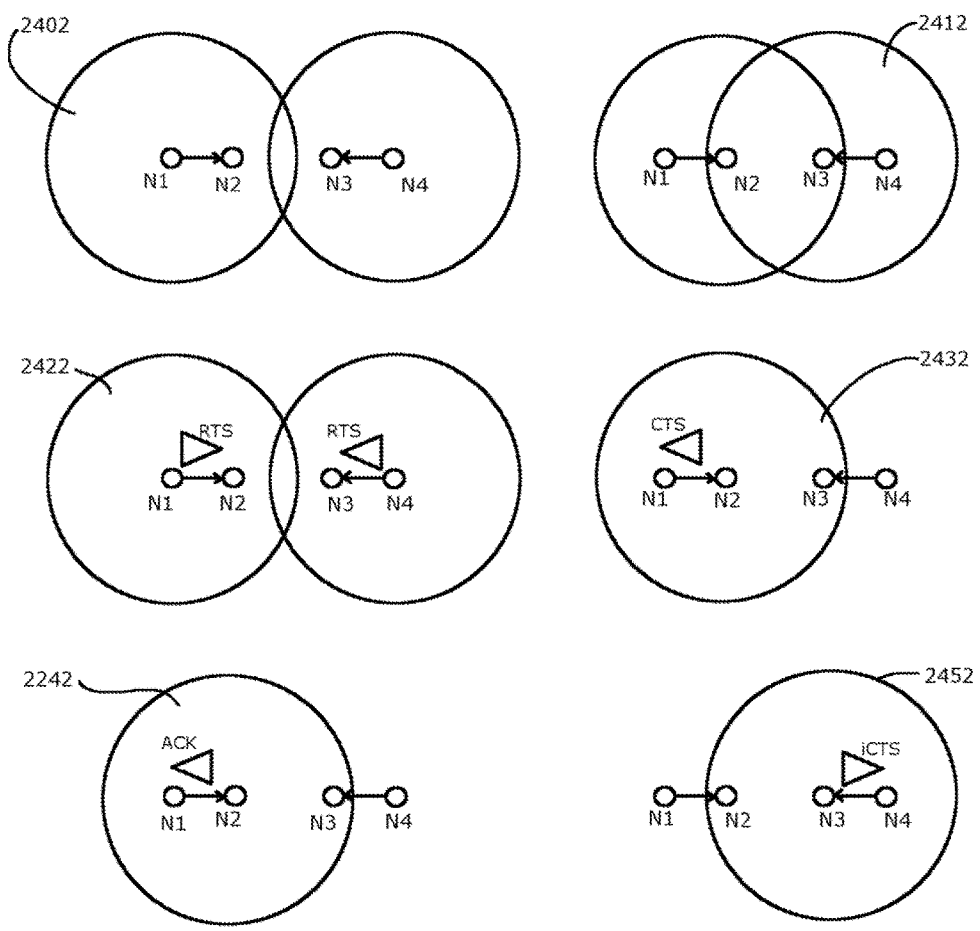
FIG. 24 is an exemplary illustration of a topology with a hidden node.

FIG. 24 is a generalized diagrammatic view of wireless transmissions by wireless terminals in accordance with an embodiment. In particular, the figures describe the hidden node problem and how it could be mitigated. FIG. 24 only depicts an example scenario; however, the described techniques could easily be applied to other scenarios with the guidance of the present description. Event 2402 shows that wireless device N1 can, in the illustrated example, only be heard by wireless device N2 and wireless device N4 can only be heard by wireless device N3. Event 2412 shows that wireless device N2 can be heard by wireless device N1 and wireless device N3. Event 2412 also shows that wireless device N3 can be heard by wireless device N2 and wireless device N4. In one example, that N1 and N4 are transmitters of downlink traffic (depicted by direction of arrows) and N2 and N3 are transmitters of uplink traffic. And in this example. N1 uses the asymmetric schedule 2462 and has chosen the downlink mini-slot D1 to transmit downlink frames. Also in this example, N4 uses the asymmetric schedule 2462 and has chosen the downlink mini-slot D2 to transmit downlink frames. A request-to-send (RTS) notifies a receiver that a transmitter wants to send something to it in the near future. If the receiver thinks that it can receive subsequent transmissions from the transmitter, the receiver send out a clear-to-send (CTS) to the transmitter. The transmitter may then send data frames to the receiver. If the receiver receives the subsequent data frames correctly, it may send an acknowledgment (ACK) to the transmitter. This procedure is widely used by the popular WiFi or IEEE 802.11n standard. Event 2422 shows that N1 sends an RTS to N2 in mini-slot D1 and N4 sends an RTS to N3 in mini-slot D2. Event 2032 shows that N2 sends a CTS to N1 after receiving the RTS. Note that N2 is able to send a CTS to N1 before N3 can send a CTS to N4 because N2 receives its RTS before N3 receives its RTS. Moreover, N3 defers transmission of its CTS to N4 because it does not want to interfere with the transaction happening between N1 and N2. N3's cooperation allows N1 to send data frames to N2. Event 2442 shows that N2 sends an ACK back to N1 after receiving data correctly from N1. N3 takes its cue from this ACK and intelligently transmits a CTS back to N4 in deterministic downlink mini-slot D2 in event 2452. This intelligently timed delayed CTS is labeled as iCTS in event 2452 of FIG. 24. N4 receives this delayed CTS and resumes transmission of data frames that it had lined up for N3. Since N1 used D1, in this example, the node N1 must use downlink mini-slot D1* for any further downlink transmissions. Even if N1 sends out an RTS in D1*, N2 in this embodiment may intelligently delay its CTS to N1 in order to cooperate with N3 and prevent interfering with the transaction between N4 and N3. This is similar to the cooperation from N3 in event 2432. Thus, the example of FIG. 24 shows one exemplary scenario in which the intelligent CTS helps mitigate hidden node problems. Please note that N1 is hidden from N3 and N4. Moreover, N4 is hidden from N2 and N1. Nonetheless, N1, N2, N3 and N4 are able to cooperate and coordinate using the intelligent CTS mechanism in this example. Though it should be noted that other embodiments do not necessarily use this or other intelligent CTS mechanisms. Another thing to note is that the intelligent CTS mechanism, in some embodiments, benefits from the deterministic schedule being used for downlink frames by N1 and N4. When these downlink flows are heavy, hidden node problems are mitigated for the flows that need more protection. Intelligent CTS like frames may not always be delayed. Sometimes they may be sent without delay but with an indication (such as busy bit that is set) that shows that currently the receiver cannot receive subsequent data frames. When a wireless terminal receives a CTS-like frame with such an indication, it could in some embodiments try again later, without getting penalized by ERB. Severe hidden node problems may exist even when only one flow is heavy. When the heavy flow is deterministically scheduled, intelligently timed CTS like frames along with carrier sensing could be used to mitigate hidden node problems. Moreover, flows that could potentially suffer from hidden node problems could converge to a more deterministic schedule. Initially RTS and CTS frames could help understanding the wireless environment and beacons could help in estimating the topologies of nearby nodes. Once a more deterministic scheduling strategy is formed, use of RTS and CTS frames could be adaptively reduced. Wireless terminals could be allowed to cooperate, coordinate, and coexist with each other using the above invention. Such cooperation could help the wireless terminals to converge to a scheduling strategy over time.

In wireless networks used to access the Internet, often uplink transmissions consist of small frames, such as TCP ACKs. Aggregating small frames, such as TCP ACKs, before transmitting can reduce the number of uplink transmissions considerably. Such aggregation may be performed, for instance, by the above described scheduler. This is expected to help in reducing contentions and collisions between transmitters of uplink traffic even during times of heavy usage. Such frame aggregation could have a size cap and/or timeout. For example, size cap may be decided to keep the probability of frame corruption below a certain threshold. For example, timeouts may need to be carefully implemented when aggregating small frames, such as TCP ACKs, to prevent TCP's congestion control from kicking in.

In some embodiments, a transmitter of heavy traffic relative to other wireless devices in a wireless network may receive more deterministic IFS duration mini-slots depending on queue-lengths, bandwidth needs, average throughput, and peak throughput. RTS and CTS frames help mitigate the hidden node problem in random access wireless networks. However, it often takes much longer than a mini-slot-time to receive and act upon an RTS. This may lead to a reduction in benefits of using RTS and CTS frames. The above-described technique may be used to design asymmetric schedules that increase the benefits of control frames, such as RTS and CTS frames. For example, one way to design and use such schedules is too keep transmitters of heavy traffic that are wirelessly near each other to also be near each other in terms of the assigned downlink mini-slots in the asymmetric schedule being used. Two wireless devices are wirelessly near each other if transmissions from one wireless device can often be heard with high signal-to-interference-and-noise-ratio (SINR) by the other wireless device. Referring to schedule 1949 in FIG. 19, two transmitters of downlink frames that are wirelessly near each other could use adjacent downlink mini-slots D1 and D2. Since they are wirelessly near each other, their corresponding networks may suffer from fewer hidden node and cell-edge user interference problems because of each other. Moreover, two other transmitters of downlink frames that are wirelessly far from each other could use downlink mini-slots that are far away from each other in time, such as D1 and D8. Corresponding networks of downlink transmitters that are wirelessly far from each other may suffer from more hidden node and cell-edge user interference problems. Such large separation in time of downlink mini-slots allows control frames, such as RTS and CTS, to be used more effectively. Another way to separate the deterministic mini-slots in time of transmitters that are wirelessly far is to fill several random access slots in between.

An example of a particular implementation of a partially-deterministic asymmetric scheduler is described below with reference to three modules that may be executed, e.g., on a CPU of a wireless device, to instantiate a scheduler or may be embodied in hardware form, e.g., as application specific integrated circuits, to form a scheduler. The exemplary modules are a main scheduler (MS), a special downlink scheduler (SDS), and a downlink schedule finder (DSF). The MS may coordinate schedules for both downlink and uplink frames. The SDS, in this example, may be called by the MS and provides an IFS duration slot to schedule the transmission of a downlink frame (e.g., a data frame). The DSF of this embodiment may be called by the SDS and may select the downlink schedule, as described below. Each of these modules may in hardware form or may be stored in the form of code stored on a tangible machine readable media, e.g., flash memory, and when this code is executed, it may cause a CPU of a wireless device to perform the processes described below and attributed to the MS, the SDS, and the DSF.

The following pseudo-code is an example of a process that may be performed by the MS module of a scheduler in accordance with the present embodiment.

```
DAS_Schedule_Frame(frame)
  error=0
  If Frame_Type(frame) == DOWNLINK then
    If NoDLTXFlag < = 0 then
      ifsDL == SDS_Get_DL_IFS(NO_COLLISION);
      while error <MAX_DL_FAILURES do
        if DL_TX_Frame{frame, ifsDL) == FAILURE
        then
          error = error + 1;
        else
          return SUCCESS;
        end if
        ifsDL == SDS_Get_DL_IFS(COLLISION);
      end while
      NoDLTX Flag = DL_RECOVERY_TIME;
    else
      NoDLTXFlag = NoDLTXFlag -1;
    end if
  end if
  error = 0
  while error <MAX_UL_FAILURES do
    if UL_TX_Frame(frame) == FAILURE then
      error =error + 1;
    else
      return SUCCESS;
    end if.
  end while
  return FAILURE;
```

The MS of the present embodiment schedules uplink and downlink frames. The process above is an overview of an example of this process. As shown in the pseudocode above, if a frame is a downlink frame, then in response, the scheduler of this embodiment uses the IFS durations named ifsDL, which is provided by the SDS described below. The IFS duration ifsDL may be a deterministic downlink slot, e.g., a IFS duration slot reserved for downlink traffic, e.g., in the schedule 1901 of FIG. 19. This deterministic downlink slot may be the window reserved on the wireless network for transmissions by the wireless device executing the presently described process. The MS may try to transmit the downlink frame in the IFS duration designated by the ifsDL value. If the scheduler succeeds, e.g., there is no collision and an ACK frame is received from the device to which the frame was addressed, the process above moves to the next frame. Otherwise, in this example, the MS module of the scheduler may request the ifsDL value again from the SDS and try to transmit the frame again.

In some instances, retransmissions may keep failing because of relatively heavy uplink traffic exists (e.g., carrier-sensing often senses the wireless channel to be busy) or relatively heavy downlink traffic exists (e.g., carrier-sensing often senses the wireless channel to be busy or collisions occur with downlink transmissions). The MS module may keep a count of the number of failed transmissions, e.g., the number of failures within a given time period, such as over the previous 30 seconds, for instance. As shown in the pseudocode for the MS module, after a threshold number of failures, labeled MAX_DL_FAILURES, is exceeded, the MS module may enter a recovery mode, designated in this embodiment by setting the variable NoDLTXFlag to DL_RECOVERY_TIME. In response to this change, the failed frame may then be scheduled using ERB, which may be handled by a UL_TX_Frame module, which is an example of an 802.11 random access scheduler. In this example, for every successful downlink transmission in the recovery mode, the MS module may ececrement the NoDLTXFlag counter. In response to this counter falling below a threshold, e.g., 0, the MS module may leave recovery mode and continue to operate with a partially deterministic asymmetric schedule, such as schedule 1901 or 1949 of FIG. 19.

Below is an example of an SDA module of the present embodiment. Again the pseudo-code shown below describes a process that may be performed by hardware, such as an application specific integrated circuit, or by executing code stored in a tangible machine read able media.

```
SDS_Get_DL_IFS(txState)
    if txState == COLLISION then
        SDSCollisions = SDSCollisions + 1;
    else
        SDSCollisions = SDSCollisions-1;
    end if
    if DL_Schedule_Fresh( CurrSchedule) == FALSE
    then
        CurrSchedule =
DSF_GetSchedule(NORMAL);
    else if SDSCollisions >= MAX-COLLISIONS
    then
        CurrSchedule =
DSF_Get_Schedule(NORMAL);
    else if Request_Table_Use_ERB( ) == TRUE
    then
        Curr-Schedule = SCHEDULE_ERB;
    else if Request_Table_Less_Aggressive== TRUE
    then
        CurrSchedule =
        DSF_Get_Schedule( CONSERVATIVE);
    else If SDSCollisions <= MIN_COLLISIONS
    then
        CurrSchedule =
        DSF _Get_Schedule(AGGRESSIVE):
    else if DL_TX_Round_Complete) == TRUE
    then
        DL_Schedule_Refresh( CurrSchedule);
        return DL_IFS_BASE;
    else
        DL_Schedule_Refresh( CurrSchedule);
        Return (DL_IFS_BASE + DL_IFS_OFFSET);
    end if.
    D L_Schedule_Initialize( CurrSchedule);
    return Extra_DL_IFS( CurrSchedule);
```

In this embodiment, the process above performed by the SDS module may be initiated by the MS module calling the SDS module, and in response, the SDS module may provide an IFS duration slot to the MS module. The SDS module receives as an input the value labeled txState from the MS module, which in this embodiment indicates whether a collision occurred while using an IFS duration slot previously provided by the SDS. The value labeled SDSCollisions may be a static variable that tracks the occurrence of such collisions, e.g., if a collision did occur, the SDSCollisions value may be incremented and if a collision did not occur, the SDSCollisions value may be decremented. The MAX_COLLISIONS and MIN_COLLISIONS values of this embodiment are thresholds for maximum and minimum collisions respectively, thresholds which if exceed cause the SDS to request a shift to a more or less aggressive schedule, as described further below. A wireless device may, in some embodiments, be in a sleep state during the transmission of subsequent frames. In the event that this duration is relatively long (e.g., longer than 30 seconds, or some other duration that is adaptively determined based on the circumstances), as determined by the function labeled DL_Schedule_Fresh returning a value of false, the SDS may form a new schedule using the DSF module described below. In the event that DL_Schedule_Fresh returns a value of false or in the event that SDSCollisions exceeds the MAX_COLLISIONS threshold, the SDS module may request a schedule from DSF and pass value of NORMAL to indicate the level of requested aggressiveness.

Otherwise, in this embodiment, the SDS module proceeds to query memory for a values stored in a data structure labeled Request_Table for any requests from other nearby wireless devices. These requests may be in the form of REQ frames and may express requests from other wireless devices for more or less aggressive schedules or for ERB scheduling. The Request_Table may be updated each time a REQ frame is received. If the same type of request, e.g., requesting a more aggressive schedule, is received from a threshold number of wireless devices, e.g., a majority, the request may be granted. For instance, the SDS may transition to ERB scheduling in response to the receipt of a sufficient number of requests, e.g., more than some threshold, such as a majority, from other wireless devices to move to ERB scheduling. Similarly, in this embodiment, the SDS module may call the DSF module with a request having the string "CONSERVATIVE" as a parameter to request a more conservative schedule if enough requests have been received for such a change. Additionally, in this embodiment, the value of SDSCollision may be decremented below the MIN_COLLISIONS threshold, e.g., when there is relatively few other active wireless devices in the wireless network, and in response, the SDS module may call the DSF module and pass the string "AGGRESSIVE" as a parameter to request a more aggressive schedule. Thus, in this embodiment, the scheduler may dynamically adjust the number of deterministic IFS duration slots or transition to or from non-deterministic ERB scheduling in response to the existing network traffic, e.g., a high collision frequency or requests from other wireless devices.

Alternatively, in this embodiment, if none of the above conditions hold, the SDS may continue using the established schedule. To facilitate fairness, the SDS module may wait for a complete round of downlink transmissions before reusing is selected IFS duration slot, e.g., as described above with reference to slots D1 and D1* in FIG. 16. This extra IFS duration is expressed in the SDS module with the label DL_IFS_OFFSET. Thus, in this example, a wireless device waiting through the current round of downlink transmission to complete may use wait for a duration of DL_IFS_OFFSET+DL_IFS_BASE, with the latter value corresponding to the wireless devices slot in the cycle.

In this embodiment, the DSF module may be called by the SDS module to find a downlink schedule. An example of a process that may be performed by the DSF module is shown below. Again the pseudo-code shown below describes a process that may be performed by hardware, such as an application specific integrated circuit, or by executing code stored in a tangible machine read able media.

```
DSF_Get_Schedule( threshold)
    if SCHEDULE_IN_BEACON then
    Query_Beacon_Table( schedule[ ], topology[ ]);
    if Channel_Crowded(schedule[ ], topology[ ]) ==
    TRUE then
        Request_ Channel_ Change( );
        else if ERB_present(schedule[ ]) ==TRUE then
            Request_ERB_Switch( );
        else
            Query_Wireless_Env_Monitor(traffic[ ]);
            newSchedule = Calculate_Schedule(schedule[ ],
            Topology[ ], traffic[ ], threshold);
        end if
```

```
        else
            Query_Beacon_Table(topology[ ]);
            if Channel_Crowded(topology[ ]) ==TRUE then
                Request_Channel_Change( );
            else
                Query_Wireless_Env _Monitor( traffic[ ]);
                newSchedule = Calculate_Schedule(topology[ ],
                traffic[ ], threshold);
            end if
        end if
    return newSchedule;
```

In this example, the DSF module may maintain a data structure in memory labeled Beacon_Table in which information from received schedule-state signals, e.g., certain types of beacons from other wireless devices, is recorded. For instance, the Beacon_Table may associate an identifier of other wireless devices with a value indicative of a downlink IFS duration slot used by those other wireless devices. The IFS duration slot used by the other devices may be encoded in the schedule-state signal or the IFS duration slot may be observed by measuring the time between frames transmitted by other wireless devices. Further, the received schedule-state signals may encode an identifier of the type of schedule being used by the other wireless devices, e.g., ERB or the number of deterministic downlink slots. The type of schedule in use may also be recorded in the Beacon_Table and associated with a device identifier.

The DSF module in this embodiment may query the Beacon_Table to retrieve the schedule and topology information about nearby wireless devices. If the schedule is too crowded, e.g., if all IFS duration slots are taken by devices that are relatively close, the DSF module may respond by requesting a change of wireless channel. Or if the query indicates that other wireless devices are using ERB scheduling, the DSF module may transmit a request to switch to ERB scheduling. Otherwise, in this embodiment, the DSF module may use the function labeled Wireless_Env_Monitor to retrieve information about existing traffic patterns, e.g., which downlink IFS duration slots are unused.

Then, in the process described by the above pseudo-code, the DSF may call a function labeled Calculate_Schedule to populate the variable labeled new-Schedule based on the number, schedules, topologies, and traffic patterns of nearby nodes, e.g., according to one or more of the above described deterministic or asymmetric scheduling techniques. The Calculate_Schedule function may select the schedule also based on an input labeled threshold, which may be a signal strength and quality score that indicates which wireless devices should be considered sufficiently wirelessly distant for purposes of parallel transmissions, e.g., sharing IFS duration slots. The value of threshold may be modulated in response to a request for a more or less aggressive schedule. For instance, in a more aggressive mode, wireless devices may be excluded from consideration for sharing an IFS duration slot only if they appear to have a relatively high signal strength an signal quality.

The DSF module of the present embodiment thus returns a schedule that, in some use cases, schedules downlink and uplink traffic asymmetrically, with uplink traffic being scheduled based on a random or pseudo-random schedule component and downlink traffic being scheduled based on the ability of the network to support parallel transmission and the availability of deterministic IFS duration slots.

From the above examples, it should be apparent that some of the presently disclosed techniques are applicable to many kinds of wireless networks: single-hop cellular, multi-hop cellular, peer-to-peer single-hop, peer-to-peer multi-hop, etc. However, while media access contention overhead is expected to facilitate the operation of wireless networks, other techniques may be used to further improve the operation of such networks. For instance, some multi-hop hybrid cellular non-cellular systems may use other techniques to use wireless spectrum even more aggressively. In such systems, it is expected that there will be a lot more wireless traffic relative to non-multi-hop systems because of additional hops and wireless links; thus aggressive use of spectrum may be particularly desirable in some of these embodiments, though the present techniques are not limited to systems that use spectrum aggressively.

Two ways of using wireless spectrum more aggressively are reducing idle time of the wireless system and getting more spatial reuse in the wireless network. While tightly controlled wireless networks do a reasonable job of reducing the idle time of the wireless system, there is a need in the art for reducing the idle time of the wireless networks that are more decentralized and may have only little or no assistance from a centralized authority. However, reducing the idle time of such wireless systems may lead to more collisions amongst wireless frames that are transmitted simultaneously by different devices. Moreover, getting more spatial reuse out of the wireless network, in some systems, is facilitated if cellular base stations and wireless devices detect collisions and adjust their transmission rates and powers accordingly.

When wireless devices share the same IFS-slot or otherwise transmit in parallel, it is helpful if each wireless device is capable of determining whether its transmission prevents the other wireless device's transmissions from being received, e.g., due to a collision. Certain embodiments may detect collisions based on snooping (e.g., receiving a frame transmitted to another wireless device) acknowledgement frames (ACK) transmitted between other wireless devices. In particular, collisions may be detected based on changes or the absence of changes in sequence identifiers (e.g., numbers), e.g., the sequence identifier may be incremented by a transmitting device when an acknowledgement frame is sent to indicate the successful receipt of the transmitted data frame, or as another example, the sequence identifier may be incremented by the receiving device in the acknowledgement frame. The snooping wireless device may monitor the sequence identifier (e.g., from the data frame or from the acknowledgement frame) before, after, or during parallel transmissions and determine whether the snooping wireless device caused a collision in a transmission between other wireless devices. In response to a detected collision, the snooping wireless device may change an attribute of its transmissions, e.g., by a decrease a power level of transmission, use a lower data rate of transmission, change an inter-frame spacing duration slot. In some embodiment, in response, the snooping wireless device may request a change in the attributes of transmissions of other wireless devices, e.g., by requesting a change in schedule.

Figure 28:
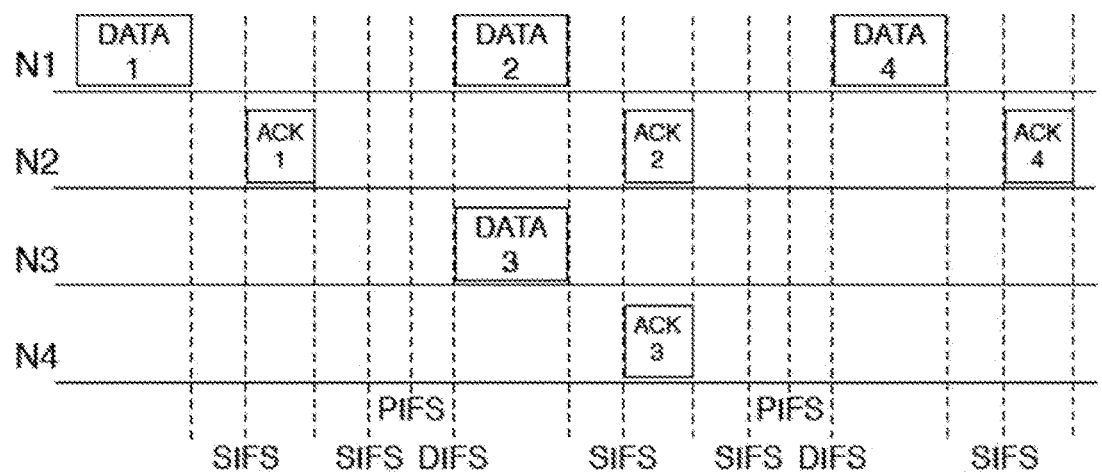

As an example, FIG. 28 is a timing diagram depicting transmissions between wireless devices N1 and N2 and transmissions between wireless devices N3 and N4. The illustrated scenario is exemplary of a sequence of transmissions in which a collision may occur. The transmissions may be via a non-cellular interface. N1 and N3 may transmit in parallel, as shown by the Data 2 and Data 3 frames, and N3 may include a collision detector that performs a process for determining whether the transmission of frame Data 3 causes a collision with the transmission of frame Data 2 to N2. To this end, the collision detector of N3, e.g., a module operating as part of its non-cellular interface, may snoop exchanges between N1 and N2. If N2 successfully receives frame Data 1, N2 transmits and acknowledgement frame (ACK) to N1. The ACK signal may include a sequence identifier from the frame Data 1, and N1 may increment the sequence identifier in response to the ACK signal indicating successful receipt. If the ACK signal is not received, N1, in this embodiment, does not increment the sequence identifier, and the same sequence identifier is used to re-transmit the frame Data 1. N1 may use the same procedure to transmit Data 2. N3, by monitoring the sequence identifiers or the ACK signals (e.g., ACK1 and ACK4), may determine whether it has caused a collision that prevented the receipt of signals from N1 to N2, e.g., of frame Data 2.

In some instances, however, N3 may not successfully snoop ACK2 from N2 to N1 because N3 receives an acknowledgement ACK3 from N4 at approximately the same time. Indeed, N3 may miss several consecutive acknowledgement signals (or the absence thereof) between N1 and N2. In this embodiment, N3 may be capable of inferring a collision even when it misses an acknowledgement frame or fails to detect the absence of such a frame, e.g., due to its receipt of an ACK frame at the same time or due to transmission of a data frame at the same time.

The collision detector of N3 may be configured to snoop the signal ACK1, store the sequence identifier of ACK1 in memory, and use this value to determine whether the transmission of frame Data 3 caused a collision even if N3 misses ACK2. For instance, the collision detector of N3 may snoop a subsequent acknowledgement frame ACK4 between the other wireless devices N1 and N2 and infer, based on a difference between the sequence identifiers of ACK1 and ACK4 whether frame Data2 was received by N2 or whether the transmission by N3 caused a collision and prevented the reception of frame Data2. The comparison may be performed pursuant to the collision-detection processes described below.

In order to use the scarce wireless spectrum more aggressively, some embodiments may reduce the number of collisions and detect collisions relatively reliably using some of the techniques described herein. In one embodiment, a process for sensing collisions in a wireless network is provided. The process may include a first wireless device sending a first data frame to a second wireless device in a first time slot, wherein the first data frame may also include a sequence number. The second wireless device may send a second data frame (e.g., an acknowledgment, ACK, signal) to the first wireless device in the first time slot to acknowledge successful receipt of the first data frame, where the second data frame may also include the sequence number from the first data frame. In this embodiment, the sequence number may be changed by the first wireless device if transmission of the first data frame to the second wireless device in the first time slot is successful. However, the sequence number is not changed by the first wireless device if transmission of the first data frame to the second wireless device in the first time slot is unsuccessful. Moreover, a third wireless device may listen to the sequence number in the first time slot from the first wireless device or the second wireless device, e.g., the third wireless device may receive the associated transmissions between the first and second wireless devices. The process further includes the first wireless device sending a third data frame to the second wireless device in a second time slot, wherein the third data frame may also include the sequence number. The second wireless device may send a fourth data frame to the first wireless device in the second time slot to acknowledge successful receipt of the third data frame, where the fourth data frame may also include the sequence number from the third data frame. In this embodiment, the sequence number is changed by the first wireless device if transmission of the third data frame to the second wireless device in the second time slot is successful. However, the sequence number is not changed by the first wireless device if transmission of the third data frame to the second wireless device in the second time slot is unsuccessful. In this example, the third wireless device does not listen to, e.g., receive, the sequence number in the second time slot from the first wireless device or the second wireless device. Next, in the presently exemplary process, the first wireless device may send a fifth data frame to the second wireless device in a third time slot, where the fifth data frame may also include the sequence number. The second wireless device may send a sixth data frame to the first wireless device in the third time slot to acknowledge successful receipt of the fifth data frame, where the sixth data frame may also include the sequence number from the fifth data frame. The sequence number is changed by the first wireless device if transmission of the fifth data frame to the second wireless device in the third time slot is successful. However, the sequence number is not changed by the first wireless device if transmission of the fifth data frame to the second wireless device in the third time slot is unsuccessful. In this exemplary process, the third wireless device listens to the sequence number in the third time slot from the first wireless device or the second wireless device. Lastly, the process includes the third wireless device deciding whether the third data frame was successfully sent by the first wireless device to the second wireless device in the second time slot based on the value of the sequence number in the first time slot and the value of the sequence number in the third time slot.

Using the above-described process, even though the third wireless device was not listening during the second time slot, it may still detect any collisions between the first wireless device and the second wireless device. In the second time slot, the third wireless device may send a seventh data frame to a fourth wireless device. Then in the third time slot, the third wireless device may listen to the transmission between the first wireless device and the second wireless device and may determine whether the third wireless device had caused a collision in the second time slot, e.g., whether a collision was caused by transmitting a signal from the third wireless device that interfered with the exchange between the first and second wireless devices.

If the third device determines that it did not cause a collision in the second timeslot, then in response, third wireless device may continue to transmit in parallel with the first wireless device at the power and rate of transmission with which the third wireless device was currently transmitting data. If the third wireless devices did cause a collision, the third wireless device may adjust its rate and power to find a suitable match that would allow both wireless flows to go on in parallel, e.g., the third wireless device may decrease the rate at which it transmits data or the power with which it transmits data in response to a determination that a previous transmission potentially caused a collision with a transmission between the first and second wireless devices. In some embodiments, the third wireless device may also cause the first wireless device to adjust its rate and power to facilitate co-existence, e.g., by transmitting a signal, such as a REQ frame, requesting such an adjustment to the first wireless device. Moreover, in some embodiments, in response to the collision, the wireless devices may try to establish a new media access schedule if concurrent access is not feasible, e.g., the signal transmitted by the third wireless device in response to the detection of a collision may be received by the other wireless devices, and each of the wireless devices may adjust the media access schedule in response. In some embodiments, this technique may be used to improve spatial reuse of the wireless channel, though not all applications necessarily provide this benefit. Principles of the present embodiment may also be particularly useful in scenarios where the same wireless spectrum is used for uplink and downlink traffic. It may also be useful for devices that can either transmit wireless frames or receive wireless frames at a given time.

The sequence number could be only one bit in length. It could also be a positive integer that wraps around cyclically, e.g., a number that is reset to zero when incremented after it hits its maximum value. Existing literature sometimes classifies wireless frames into data, control and management frames, as discussed above. In this document, we use the phrase data frames to include all types of wireless frames. In some embodiments, nearby wireless devices may use listening and collision-detection mechanisms, e.g., versions of the embodiment described above, to gauge the presence and absence of expected wireless frames on the wireless channel, e.g., to infer that a collision has occurred based on the absence of an expected frame or that a collision did not occur based on the presence of a frame. The wireless devices may then use this information about the presence and absence of wireless frames to decide whether to transmit and/or allow transmissions in the successive time slots.

A version of the present technique is illustrated by the following example. In an exemplary transmission process, the sequence number is changed sequentially by the first wireless device each time a transmission to the second wireless device in a time slot is successful, e.g., in response to the receipt of an acknowledgement signal from the second wireless device. Further, the sequence number is not changed sequentially by the first wireless device each time a transmission to the second wireless device in a time slot is unsuccessful, e.g., in response to the absence of an acknowledgement signal from the second wireless device within a period of time. The third wireless device may decide whether a data frame, e.g., the third data frame in the above description, was successfully sent by the first wireless device to the second wireless device in the second time slot based on the value of the sequence number in the first time slot and the value of the sequence number in the third time slot. In this example, since the first wireless device sequentially increments the sequence number, the third wireless device may decide that the third data frame was unsuccessful in the second time slot if the value of the sequence number in the first time slot and the value of the sequence number in the third time slot cyclically differ by one. The third wireless device may also decide that the third data frame was successful in the second time slot if the value of the sequence number in the first time slot and the value of the sequence number in the third time slot cyclically differ by two.

In some embodiments, N3, the snooping device, may include a collision detector that performs a process shown by the pseudo-code below to detect collisions. The pseudo-code may be encoded as a computer program product on a tangible machine readable medium of a wireless device or, for example, hard wired into an integrated circuit, such as a non-cellular interface, of a wireless device. The pseudo-code includes a module named Channel_Measurement that is configured to snoop acknowledgment signals from exchanges between other wireless devices and infer the sequence numbers from missed exchanges or exchanges that were not monitored, e.g., because the other wireless devices are exchanging acknowledgement frames at approximately the same time as the wireless device with the Channel_Measurement module receives an acknowledgement frame. Using the Channel_Measurement module, in some embodiments, the wireless device may snoop, transmit, then snoop again to determine whether the transmission caused a collision.

```
Channel_Measurement (Tour,*Pour)
    oldSEQBit = Get_Next_SEQ_Bit( ):
    while 1 do
        ourFlow = TX_Frame(Tour,*Pour) ;
        newSEQBit = Get_Next_SEQ_Bit( );
        if oldSEQBit == - 1 || newSEQBit == -1 || newSEQBit ==
        oldSEQBit then
            if our Flow == NO_ACK then
                if *Pour == MAX_POWER then
                    return ( );
                end if
                *Pour = *Pour + 1;
            else
                return 1;
            end if
        else
            return ( )
        end if
        oldSEQBit = newSEQBit
    end while
```

In one embodiment, the oldSEQBit may store a sequence identifier from a previously snooped frame, e.g., from ACK 1 or Data 1. In one embodiment, the sequence identifier is a single bit, though it may include more bits in other embodiments. The module may than call module TX_Frame to transmit a frame, e.g., Data 3 in FIG. 28. After transmission, the module of this embodiment may snoop a another sequence identifier, e.g., from Data 4 or ACK 4, and store in newSEQBit. The module may then determine whether a collision was caused by comparing newSEQBit to oldSEQBit. If the values indicate a collision, then the module may adjust an attribute of transmission from the wireless device, such as those above, including the schedule, the data rate, or the transmission power. For instance, in the scenario of FIG. 28, with a 1-bit sequence identifier, the module may determine whether newSEQBit is equal to oldSEQBit and infer that a collision did not occur, as the sequence identifier completed a cycle from 1 to 0 to 1 or from 0 to 1 to 0, for instance. In other embodiments, the sequence number may have more digits, e.g., 2 or more bits, and the module may determine whether newSEQBit is equal to oldSEQBit plus one increment to detect whether a collision did occur.

In other embodiments, the sequence identifier may be increased in length to increase the robustness of the collision detection. Also, in some embodiments, the snooping techniques may be variations of those described above to make collision detections more robust. For example, the techniques depicted in FIGS. 29-31 may offer more robust collision detection in certain depicted topologies.

The number of wireless devices is exploding. As the number of wireless devices grows, the number of types of wireless devices is also growing. There are several different types of wireless devices that are participating in wireless networks. Each device has its own limitations and capabilities. For example, some wireless devices may be plugged into an electrical outlet, while others may be powered by batteries. Some wireless devices may be powered by a battery of higher capacity and some may be powered by batteries of a lower capacity. Some wireless devices may usually be carried by human beings while others may usually not be carried by human beings. Some wireless devices may be installed in vehicles, while others may not. Embodiments of the present techniques may differentiate between types of wireless devices.

In another embodiment, a process for differentiating between wireless devices is provided. The process may include a first wireless device sending, e.g., transmitting or broadcasting via its cellular or non-cellular interface, a data frame, where the data frame includes a type field. A second wireless device receives the data frame and concludes the device type of the first wireless device based on the type field included in the data. As mentioned before, by a data frame we mean any type of wireless frame. As an example, the wireless frame could be a beacon that is broadcasted by wireless devices using a distributed beaconing mechanism. As an example, the type field could represent the following device types: wireless device carried by a human being, wireless device not carried by a human being, wireless device carried by an animal, wireless device not carried by an animal, wireless device embedded in a vehicle, wireless device not embedded in a vehicle, wireless device currently plugged into power, and wireless device currently not plugged into power. In a wireless network with different types of wireless devices, device type information will be useful. In multi-hop cellular networks, such information is particularly useful because hopping decisions could be based on such information, as discussed above, though not all embodiments perform the presently described process. For example, a wireless device powered by a larger battery may be a better hopping choice as opposed to a wireless device with smaller battery. As is evident in this example, this will benefit both the device that is hopping and the device that is being hopped on. Additionally, one of our previously mentioned related embodiments of the present invention empower wireless devices to individually allow or disallow hopping based on certain factors and the current state of the device.

In some embodiments, the device type field may indicate whether the device is of the sort that would be carried by a human, e.g., a cell phone or laptop, and this field may be used for hopping decisions. For example, a wireless device may determine that its device type is a human-borne device type and adjust the above-mentioned threshold factors for determining whether to hop off another device to make it more likely that the wireless device will hop off another device. In some embodiments, this may tend to reduce the amount of electro-magnetic radiation the person operating the wireless device is exposed to, as wireless devices are expected to transmit at lower power when hopping of an intermediate device relative to a direct connection to a cellular base station.

Figure 25A:
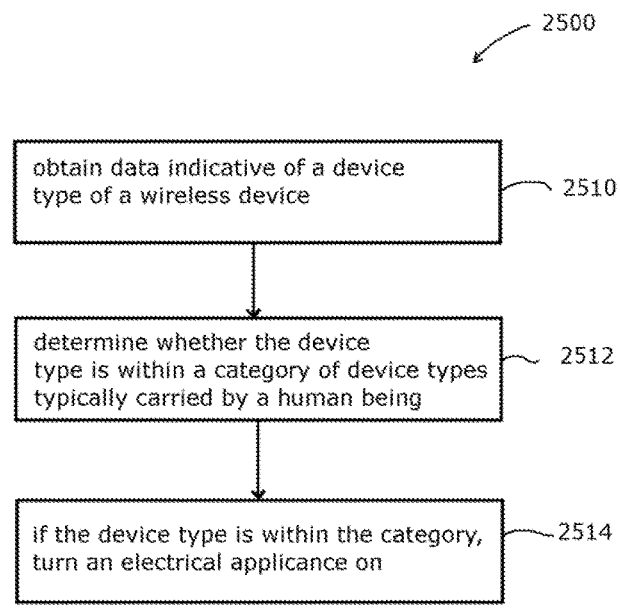
FIGS. 25A and B are illustrations of a process and apparatus for controlling an electrical appliance.
Figure 25B:
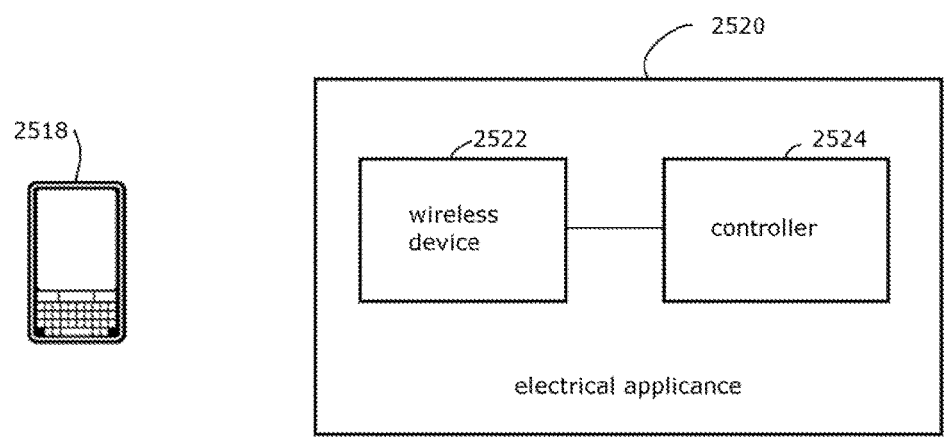

Principles of the present inventions could be used for several applications, such as conserving energy, facilitating vehicular traffic flow at a traffic intersection, etc. An exemplary process 2500 is depicted in FIG. 25A and an exemplary embodiment of a wirelessly controlled appliance 2520 having a wireless device 2522 and a controller 2554 is shown in FIG. 25B. For instance, the wireless device 2522 may be coupled to electrical appliance controller 2524, where the wireless device 2522 that receives a frame indicating device type may detect the device type of a first wireless device 2518 based on the type field included in the frame, as shown in step 2510. The frame indicating device type may be a beacon, such as a node-state signal, which may be received via non-cellular interface of the wireless device 2522. The second wireless device 2522 may then, in response, turn electrical appliance 2520 on or off based on the detected device type of the first wireless device 2518, as shown in steps 2512 and 2514. For example, if the first wireless 2518 is a wireless device that is usually carried by a human being. e.g., a cell phone, and recently became wirelessly visible to the electrical appliance controller, the electrical appliance controller could turn on the lights, HVAC, adjust a thermostat, unlock a door, etc. The electrical appliance controller 2524 may continue to monitor transmissions by the first wireless device 2518, e.g., periodically, e.g., every 100 milliseconds, and if the electrical appliance controller continues to detect the presence of the first wireless device, it may take no action, in some embodiments. Similarly when the wireless detection mechanism times out, e.g., the electrical appliance controller ceases to receive transmissions from the first wireless device, and is not renewed, the electrical appliance controller may turn off the lights, HVAC, adjust the thermostat, or lock a door, etc. In some embodiments, the electrical appliance controller may ignore other wireless devices that are usually not carried by human beings that are present nearby. Some embodiments are expected to help conserve electricity. Manual switches in some of these embodiments may be used to overcome false alarms.

Figure 26A:
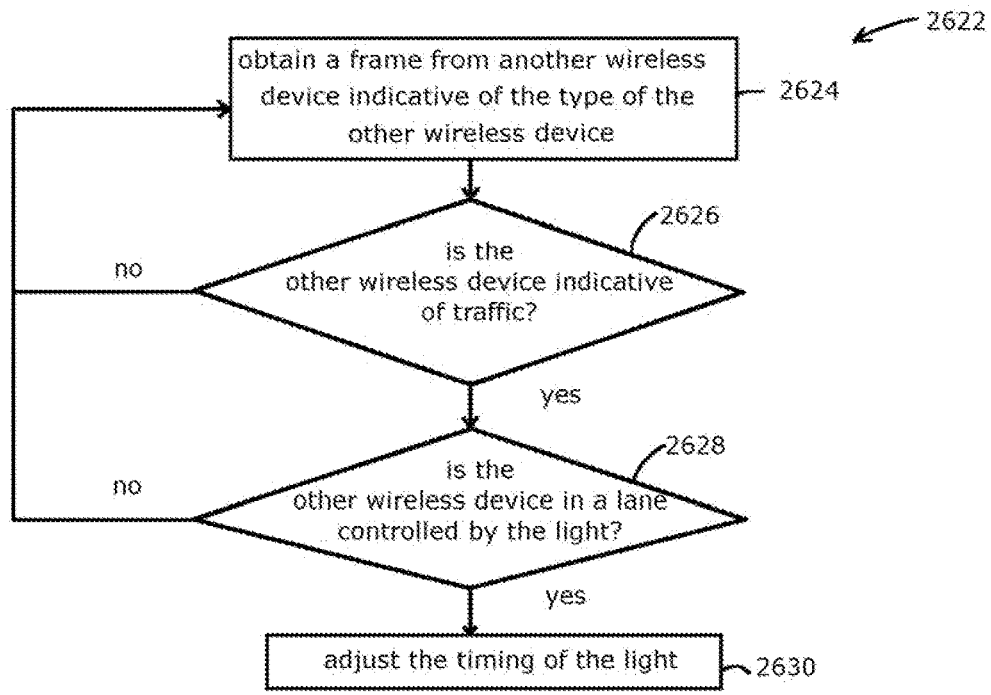
FIGS. 26A and B and 27 are illustrations of processes and systems for controlling traffic.

In another embodiment, depicted in FIGS. 26A and B a traffic light 2602 has lights 2604 and a wireless device 2610 that is coupled a traffic light controller 2612 and that has multiple receive antennas 2614, 2616, 2618. The illustrated wireless device 2610 is capable of detecting, e.g., estimating, the distance to and the direction of a nearby wireless device 2620. The traffic light controller 2612 may receive from the wireless, device 2610 the frame indicating type broadcast from first wireless device 2620, as shown in step 2624 of process 2622, and detect the device type of the first wireless device based on the type field included in the frame, as shown in step 2626. If the first wireless device type indicates that the wireless device is a vehicle or a pedestrian (e.g., is associated with the same), the traffic light controller 2612 may detect the direction of the first wireless device 2620 based on the direction from which the data frame was received using certain techniques, and the controller 2612 may determine whether the wireless device 2620 is in a lane of traffic managed by the light 2604, as shown in step 2628. For instance the traffic light controller 2612 may determine the direction from which the data frame was received by comparing the signals received from each of the antennas of the second wireless device or using heading information encoded in the beacon from the first wireless device 2620, as described below. The traffic light controller may also detect, e.g., estimate, the nearness of the first wireless device based on the signal strength, signal quality, or a quality of service metric with which the frame was received. The traffic light controller may then, in response, use the nearness, direction, and device type information to control the corresponding traffic lights accordingly, as shown in step 2630, e.g., the traffic light controller may increment a counter for each wireless device detected as indicating a vehicle waiting at the traffic light on a particular cross street facing a particular direction, such as toward the light, and the traffic light controller may adjust the time of a red light or green light in response to the count, for instance by increasing the time of a green light for traffic on a street where a high count occurred and decreasing the time of a green light on a street where little traffic is detected. Principles of the present inventions may also be very useful in regulating the flow of traffic at traffic intersections. Moreover, principles of the present inventions could be particularly useful during the early morning and late night hours.

In other embodiments, the process may include a first wireless device transmitting a beacon and a second wireless terminal receiving the beacon and forwarding data encoded by, or otherwise conveyed by, the beacon to a traffic-light controller. The traffic-light controller may receive the forwarded portion (or all) of the beacon, and use the forwarded data, to do at least one of the following: monitor vehicles, regulate vehicles, route vehicles, control vehicles, monitor people, regulate people, route people, control people, and control traffic lights. For instance, the traffic light controller may respond to receipt of the forwarded data by incrementing a counter in memory associated with a vehicle count for monitoring traffic. Or the traffic light controller may respond to the beacon by adjusting the timing of the light, as mentioned above. In some embodiments, the traffic light controller may log the presence of a particular wireless device by storing an identifier of the device in memory to monitor people, or the traffic light controller may change the state of a road sign to route traffic from an overused road to an underused road. In some embodiments, the first wireless device is associated with one of the following: a vehicle, a device embedded in a vehicle, a person, and a device carried by a person. Furthermore, the second wireless device may be co-located, e.g., in fixed proximity and proximate to, with the traffic-light controller. Also, the traffic-light controller may communicate with other traffic-light controllers to better manage vehicular traffic. For instance, a first traffic light controller may count a number of vehicles passing in a particular direction in a unit of time to estimate a traffic flow rate, and the first traffic light controller may transmit a value indicative of the traffic flow rate to an upstream traffic light controller, which may receive the value and respond by adjusting the timing of a signal controlled by the second traffic light controller such that the high-flow rate traffic is more likely to experience a green light. In addition, the beacon (e.g., in the device type field) may include information about at least one of the following: type of the first wireless terminal, intention (e.g., expected route entered into a map application or a turn signal state [i.e., whether the turn signal is blinking left or right] of the vehicle, heading of the vehicle [e.g., north, south, east, or west] of the first wireless terminal, and number of wireless terminals near the first wireless terminal. Instead of beacons, in other embodiments, the first wireless terminal may use other means of wireless communication to communicate with the second wireless terminal and the traffic-light controller. For instance, the traffic light controller may change based on a combination of fields encoded in the beacon, e.g., the traffic signal may change the timing of a light based on a combination of the position, orientation, and turn-signal state or GPS destination to account for a drivers' expressed intent to turn left or right or go straight at an intersection.

Figure 26B:
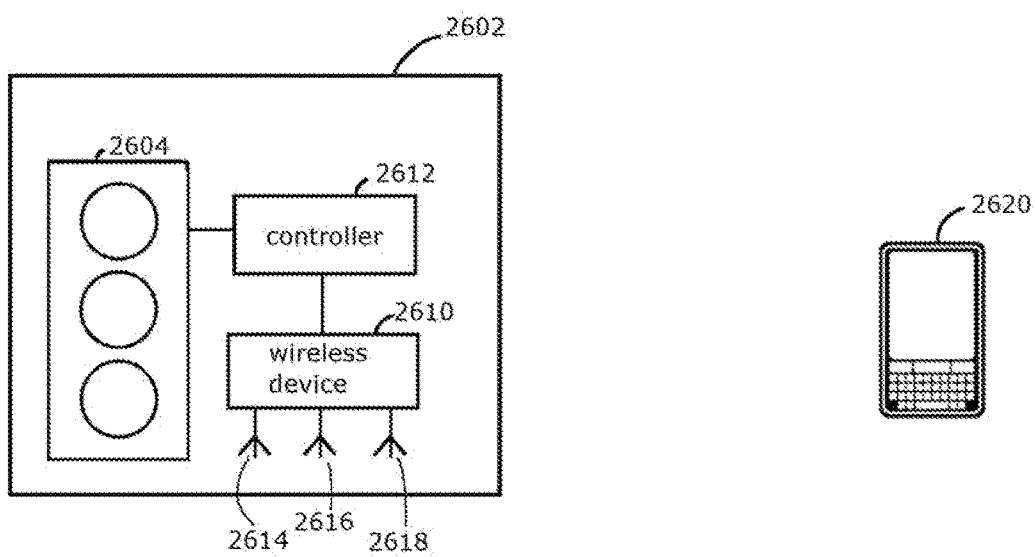
Figure 27:
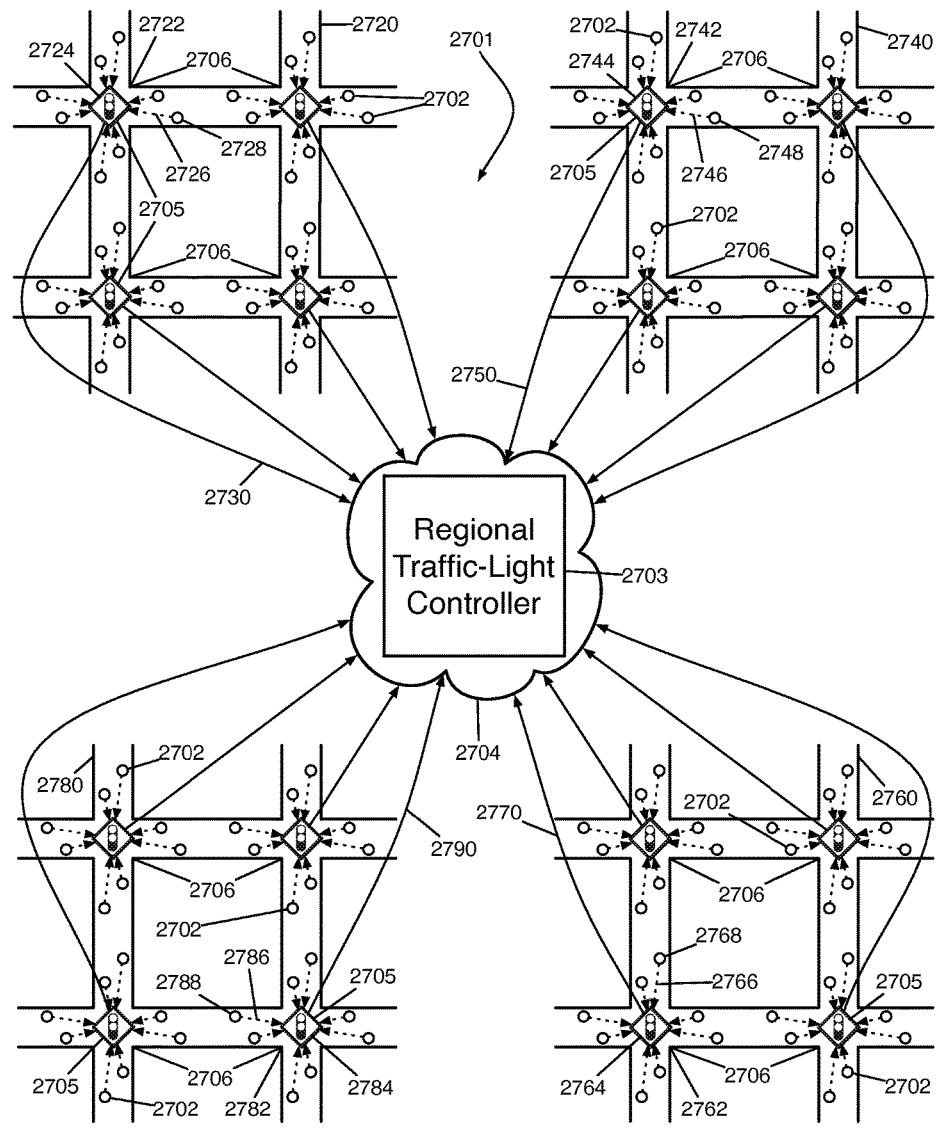

FIG. 27 is a generalized diagrammatic view of an embodiment of a transportation system 2701 where the transportation system has the ability to detect the presence of vehicles 2702, each of which having a wireless terminal, such as the wireless terminal discussed above in reference to FIG. 26. In this embodiment, the transportation system 2701 includes a regional traffic-light controller 2703 that has either a wired or wireless network connection 2704 with several traffic-lights 2705 and traffic-light intersections 2706. The wired or wireless network connection 2704 may be used to exchange data between the regional traffic-light controller and the traffic-lights 2705, such as the traffic lights 2602 of FIG. 26. The data may be used to monitor, regulate, control, and route vehicular and pedestrian traffic, e.g., in the manner described by process 2622 of FIG. 26. Traffic-light intersection 2722 is one of several in the region of transportation system 2701. Traffic-lights 2724 (individual ones of the traffic lights 2705) regulate traffic at traffic-light intersection 2722 (individual ones of the intersections 2706). Traffic-lights 1024 and traffic-light intersection 1022, in this embodiment, are connected over a wired or wireless link 1030 to the regional traffic-light controller 2704 via the network connection 2704 or directly. The wireless link 2730 could be a cellular connection, for example. Vehicle (or pedestrian) 2728 occasionally transmits beacons 2726. The beacons 2726 may be received by the traffic-lights 2724. Traffic-lights 2724 may collect beacons from other nearby vehicles and pedestrians as well. Vehicles may be installed with wireless subsystems, and pedestrians may be carrying mobile wireless devices. Beacons transmitted by vehicles and pedestrians may be used to monitor, regulate, control, and route vehicles, automobiles, pedestrians, animals, and machines. Beacons could also include intention of a vehicle or pedestrian, such as turn left, turn right, compass heading, urgency, emergency, and other special situations. Wireless terminals that have overlapping functionality with the first wireless terminal may aggregate information about nearby vehicles or pedestrians and include that information in the beacons that they transmit. Wireless terminals that have overlapping functionality with the first wireless terminal may aggregate information about nearby vehicles or pedestrians in a specific direction and include that information in the beacons that they transmit. Moreover, traffic-lights may use crowd-sourcing techniques when collecting information from beacons to reduce errors, e.g., if a plurality of cars indicate some anomaly, only then in response, in this example, the traffic light may take action, such as by changing a timing of the light. Traffic-lights may also include confidence values and sample sizes for the gathered information to indicate reliability information. After collecting and aggregating the information received via beacons and other wireless communication from nearby vehicles and pedestrians, traffic-lights and traffic-light intersections may send the information to the regional traffic-light controller. In some embodiments, they may retain and send only certain parts of beacons and use dimensionality reduction techniques without causing loss of useful information. While sending entire chunks of information gathered from the various vehicles and pedestrians to the regional traffic-light controller may be useful, choosing useful parts may help save network bandwidth. The regional traffic-light controller may receive localized real-time information from vehicles and pedestrians as described above over wired and wireless links. The regional traffic-light controller may then. in response, use the conveyed information to communicate with other traffic-light controllers to calculate a better (relative to conventional systems) traffic routing schedule given the current levels of congestion, needs of vehicles and pedestrians, time of day, complexity of solution, safety of implementation and deployment of new routing schedule, and reliability of information gathered. If a better traffic and pedestrian routing schedule is established for a localized region or a large-scale region, the schedule may then be sent to the traffic-lights via the wired or wireless link. Traffic-lights may then work according to the new routing schedule. Embodiments of the present technique are expected to reduce traffic congestion on the roads relative to other systems. Moreover, embodiments may be repeated occasionally, e.g., periodically, such as every 10 minutes, to adapt the traffic routing schedule to the changing conditions.

Although the method, wireless device and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims.

We claim:

1. A method of conveying data on a multi-hop communications network, the method comprising:
   receiving, with a first communications interface of a first communications device, a first node-state signal from a second communications device, wherein receiving, with the first communications interface of the first communications device, the first node-state signal from the second communications device further comprises:
      entering a lower-power mode of operating the first communications device for a first duration of time;
      entering a higher-power mode of operating the first communications device for a second duration of time that corresponds to a node-state signal interval of the first node-state signal; and
      entering the lower-power mode of operating the first communications device for a third duration of time;
   ascertaining, with the first communications device, in response to the first node-state signal, that the first communications device will make itself available as a relay for other communications devices in the multi-hop communications network via the second communications device;
   in response to ascertaining that the first communications device will make itself available as a relay for other communications devices in the multi-hop communications network via the second communications device, transmitting, from a second communications interface of the first communications device, a second node-state signal indicating the availability of the first communications device as a relay for other communications devices in the multi-hop communications network; and
   receiving, at the first communications device:
      uplink data from a third communications device and transmitting the uplink data to the second communications device; or
      downlink data from the second communications device and transmitting the downlink data to a third communications device.

2. The method of claim 1, wherein:
   entering the lower-power mode of operating the first communications device comprises turning off a receiver of the first communications interface; and
   entering the higher-power mode of operating the first communications device comprises turning on the receiver of the first communications interface.

3. The method of claim 1, wherein transmitting, from the second communications interface of the first communications device, the second node-state signal further comprises:
   entering a lower-power mode of operating the first communications device for a fourth duration of time;
   entering a higher-power mode of operating the first communications device for a fifth duration of time that corresponds to a node-state signal interval of the second node-state signal; and
   entering the lower-power mode of operating the first communications device for a sixth duration of time.

4. The method of claim 3, wherein:
   entering the lower-power mode of operating the first communications device comprises turning off the receiver of the second communications interface; and
   entering the higher-power mode of operating the first communications device comprises turning on the receiver of the second communications interface.

5. The method of claim 1, wherein at least one of the following is broadcast periodically as a beacon frame:
   the first node-state signal; and
   the second node-state signal.

6. The method of claim 1, wherein the first communications interface and the second communications interface are the same.

7. The method of claim 1, wherein transmitting or receiving comprises transmitting or receiving in accordance with IEEE 802.15.4.

8. The method of claim 1, wherein transmitting or receiving comprises transmitting or receiving in accordance with at least one of the following protocols: IEEE 802.11, Bluetooth, Zigbee, and FlashlinQ.

9. The method of claim 1, wherein ascertaining, with the first communications device, in response to the first node-state signal, that the first communications device will make itself available as a relay for other communications devices in the multi-hop communications network via the second communications device further comprises the first communications device determining to make itself available as a relay based on at least three of the following:
   a value indicative of a cellular signal strength of cellular signals from a base-station at the first communications device;
   a value indicative of a cellular signal quality of cellular signals from the base-station at the first communications device;
   node-state signals received from other communications devices in the multi-hop communications network at the first communications device;
   a value indicative of a non-cellular signal strength of non-cellular signals from the second communications device at the first communications device;
   a value indicative of a non-cellular signal quality of non-cellular signals from the second communications device at the first communications device;
   a value indicative of a price for cellular service paid by a user associated with the first communications device;
   a value indicative of an amount of energy stored by the first communications device;
   a type of power source of the first communications device;
   a number of antennas coupled to a cellular-interface of the first communications device;
   a value indicative of movement of the first communications device;
   a value indicative of the time of day;
   a value indicative of a number of hops between the second communications device and the first communications device; and
   a value indicative of an amount of available bandwidth for communication via the second communications device from the first communications device.

10. The method of claim 1 wherein the first node-state signal comprises data indicative of at least two of the following:
   the availability of the second communications device as a sink;

a signal strength of cellular signals from a base-station at the second communications device;
a signal quality of cellular signals from the base-station at the second communications device;
an identity of a cellular network carrier operating the base-station;
a number of antennas coupled to a cellular-interface of the second communications device;
a number of hops;
an amount of available bandwidth for communication via the second communications device;
movement of the second communications device;
a type of power source of the second communications device; and
a non-cellular transmit power of the second communications device.

11. The method of claim 1, wherein the second node-state signal comprises data indicative of at least two of the following:
the availability of the first communications device as a relay;
a signal strength of cellular signals from a base-station at the second communications device;
a signal quality of cellular signals from the base-station at the second communications device;
an identity of a cellular network carrier operating the base-station;
a number of antennas coupled to a third communications interface of the second communications device;
a number of hops between the second communications device and the first communications device;
an amount of available bandwidth for communication via the second communications device from the first communications device;
movement of the first communications device;
a type of power source of the first communications device; and
a non-cellular transmit power of the first communications device.

12. The method of claim 1, wherein the first communication device comprises:
a processor;
memory;
a display screen;
an operating system; and
a cellular radio configured with access to a cellular network.

13. The method of claim 1, wherein the second communications device comprises a sink communications device or a relay communications device.

14. A first communications device, comprising:
a processor;
a first communications interface;
a second communications interface;
memory storing instructions that when executed effectuate operations comprising:
receiving, with the first communications interface of the first communications device, a first node-state signal from a second communications device;
ascertaining, with the first communications device, in response to the first node-state signal, that the first communications device will make itself available as a relay for other communications devices in the multi-hop communications network via the second communications device;
in response to ascertaining that the first communications device will make itself available as a relay for other communications devices in the multi-hop communications network via the second communications device, transmitting, from the second communications interface of the first communications device, a second node-state signal indicating the availability of the first communications device as a relay for other communications devices in the multi-hop communications network, wherein transmitting, from the second communications interface of the first communications device, the second node-state signal comprises:
entering a lower-power mode of operating the first communications device for a first duration of time;
entering a higher-power mode of operating the first communications device for a second duration of time that corresponds to a node-state signal interval of the second node-state signal; and
entering the lower-power mode of operating the first communications device for a third duration of time; and
receiving, at the first communications device:
uplink data from a third communications device and transmitting the uplink data to the second communications device; or
downlink data from the second communications device and transmitting the downlink data to a third communications device.

15. The device of claim 14, wherein:
entering the lower-power mode of operating the first communications device comprises turning off the receiver of the second communications interface; and
entering the higher-power mode of operating the first communications device comprises turning on the receiver of the second communications interface.

16. The device of claim 14, wherein receiving, with the first communications interface of the first communications device, the first node-state signal from the second communications device further comprises:
entering a lower-power mode of operating the first communications device for a fourth duration of time;
entering a higher-power mode of operating the first communications device for a fifth duration of time that corresponds to a node-state signal interval of the first node-state signal; and
entering the lower-power mode of operating the first communications device for a sixth duration of time.

17. The device of claim 16, wherein:
entering the lower-power mode of operating the first communications device comprises turning off a receiver of the first communications interface; and
entering the higher-power mode of operating the first communications device comprises turning on the receiver of the first communications interface.

18. The device of claim 14, wherein transmitting or receiving comprises transmitting or receiving in accordance with IEEE 802.15.4.

19. The device of claim 14, wherein transmitting or receiving comprises transmitting or receiving in accordance with at least one of the following protocols: IEEE 802.11, Bluetooth, Zigbee, and FlashlinQ.

20. The device of claim 14, wherein ascertaining, with the first communications device, in response to the first node-state signal, that the first communications device will make itself available as a relay for other communications devices in the multi-hop communications network via the second communications device further comprises the first communications device determining to make itself available as a relay based on at least two of the following:
- a value indicative of a cellular signal strength of cellular signals from a base-station at the first communications device;
- a value indicative of a cellular signal quality of cellular signals from the base-station at the first communications device;
- node-state signals received from other communications devices in the multi-hop communications network at the first communications device;
- a value indicative of a non-cellular signal strength of non-cellular signals from the second communications device at the first communications device;
- a value indicative of a non-cellular signal quality of non-cellular signals from the second communications device at the first communications device;
- a value indicative of a price for cellular service paid by a user associated with the first communications device;
- a value indicative of an amount of energy stored by the first communications device;
- a type of power source of the first communications device;
- a number of antennas coupled to a cellular-interface of the first communications device;
- a value indicative of movement of the first communications device;
- a value indicative of the time of day;
- a value indicative of a number of hops between the second communications device and the first communications device; and
- a value indicative of an amount of available bandwidth for communication via the second communications device from the first communications device.

21. The device of claim 14, wherein the first node-state signal comprises data indicative of at least two of the following:
- the availability of the second communications device as a sink;
- a signal strength of cellular signals from a base-station at the second communications device;
- a signal quality of cellular signals from the base-station at the second communications device;
- an identity of a cellular network carrier operating the base-station;
- a number of antennas coupled to a cellular-interface of the second communications device;
- a number of hops;
- an amount of available bandwidth for communication via the second communications device;
- movement of the second communications device;
- a type of power source of the second communications device; and
- a non-cellular transmit power of the second communications device.

22. The device of claim 14, wherein the second node-state signal comprises data indicative of at least two of the following:
- the availability of the first communications device as a relay;
- a signal strength of cellular signals from a base-station at the second communications device;
- a signal quality of cellular signals from the base-station at the second communications device;
- an identity of a cellular network carrier operating the base-station;
- a number of antennas coupled to a third communications interface of the second communications device;
- a number of hops between the second communications device and the first communications device;
- an amount of available bandwidth for communication via the second communications device from the first communications device;
- movement of the first communications device;
- a type of power source of the first communications device; and
- a non-cellular transmit power of the first communications device.

* * * * *